United States Patent
Lang et al.

(10) Patent No.: US 12,467,486 B2
(45) Date of Patent: Nov. 11, 2025

(54) TELESCOPING SHEAR THICKENING FLUID BASED OBJECT CONTROL MECHANISM

(71) Applicant: Moshun, LLC, Oak Brook, IL (US)

(72) Inventors: Richard Michael Lang, Howey In The Hills, FL (US); David Schuda, Wheaton, IL (US); Jason K. Resch, Warwick, RI (US); John Edward Buchalo, South Barrington, IL (US); Gary W. Grube, Barrington Hills, IL (US)

(73) Assignee: Moshun, LLC, Oak Brook, IL (US)

( * ) Notice: Subject to any disclaimer, the term of this patent is extended or adjusted under 35 U.S.C. 154(b) by 282 days.

(21) Appl. No.: 18/071,671

(22) Filed: Nov. 30, 2022

(65) Prior Publication Data
US 2024/0175476 A1     May 30, 2024

Related U.S. Application Data

(60) Provisional application No. 63/427,949, filed on Nov. 25, 2022.

(51) Int. Cl.
| | |
|---|---|
| F16F 9/53 | (2006.01) |
| F15B 15/28 | (2006.01) |
| F15B 21/06 | (2006.01) |
| F16F 9/19 | (2006.01) |
| F16F 9/34 | (2006.01) |

(52) U.S. Cl.
CPC .......... *F15B 21/06* (2013.01); *F15B 15/2815* (2013.01); *F16F 9/19* (2013.01); *F16F 9/3405* (2013.01); *F16F 9/53* (2013.01); *F16F 2224/041* (2013.01); *F16F 2224/048* (2013.01); *F16F 2230/08* (2013.01); *F16F 2230/18* (2013.01); *F16F 2236/103* (2013.01)

(58) Field of Classification Search
CPC ......... F15B 21/06; F15B 15/2815; F16F 9/19; F16F 9/3405; F16F 9/53; F16F 2224/041; F16F 2224/048; F16F 2230/08; F16F 2230/18; F16F 2236/103
See application file for complete search history.

(56) References Cited

U.S. PATENT DOCUMENTS

| | | | |
|---|---|---|---|
| 1,704,217 | A | 3/1929 | Rosenthal |
| 1,736,175 | A | 11/1929 | Rosenthal |

(Continued)

FOREIGN PATENT DOCUMENTS

| | | | |
|---|---|---|---|
| DE | 202006006422 U1 | 8/2006 | |
| DE | 202006011846 U1 | 12/2007 | |

(Continued)

*Primary Examiner* — Thomas W Irvin
(74) *Attorney, Agent, or Firm* — Gary W. Grube

(57) ABSTRACT

A head unit system for controlling an object includes a head unit device that include shear thickening fluid (STF) and a chamber configured to contain the STF. The chamber further includes a gate between a front channel and a back channel. The gate includes a set of bypass openings. The head unit device further includes a piston housed at least partially radially within the chamber. The gate is configured to control flow of the STF between the front channel and the back channel to control contraction of the chamber to provide the controlling of the object.

10 Claims, 22 Drawing Sheets

(56) References Cited

U.S. PATENT DOCUMENTS

| | | | |
|---|---|---|---|
| 1,965,806 A | 7/1934 | Riggins | |
| 2,740,308 A | 4/1956 | Blanchard | |
| 3,284,841 A | 11/1966 | Patriquin | |
| 3,442,501 A * | 5/1969 | Soderberg | F16F 9/303 267/64.28 |
| 3,487,494 A | 1/1970 | De Baan | |
| 3,489,087 A | 1/1970 | Soderberg | |
| 3,979,790 A | 9/1976 | Chiarappa | |
| 4,452,437 A | 6/1984 | Lochner | |
| 4,590,639 A | 5/1986 | Fritsche | |
| 4,711,435 A * | 12/1987 | Harris | F16F 9/512 267/221 |
| 5,078,552 A | 1/1992 | Albel | |
| 5,924,714 A | 7/1999 | Farris | |
| 7,628,257 B1 | 12/2009 | Lu | |
| 7,825,045 B1 | 11/2010 | Wagner | |
| 7,918,167 B2 | 4/2011 | Tanielian et al. | |
| 8,276,497 B2 | 10/2012 | Hunn | |
| 8,499,908 B2 | 8/2013 | Barker et al. | |
| 8,943,652 B2 | 2/2015 | Bacchetti | |
| 9,303,709 B2 * | 4/2016 | Manes | F16F 9/10 |
| 9,453,550 B2 * | 9/2016 | Smith | F16F 9/53 |
| 9,498,690 B2 | 11/2016 | Carlson et al. | |
| 9,970,831 B2 | 5/2018 | Shih | |
| 10,017,082 B2 | 7/2018 | Zwaan | |
| 10,161,173 B2 | 12/2018 | Kruedener et al. | |
| 10,207,665 B2 * | 2/2019 | Gandhi | C08K 3/36 |
| 10,371,097 B2 | 8/2019 | Sellinger et al. | |
| 10,443,678 B2 | 10/2019 | Galindo Rosales et al. | |
| 10,462,578 B2 | 10/2019 | Hoskins et al. | |
| 10,480,281 B2 | 11/2019 | Al-Olayan et al. | |
| 10,580,231 B2 | 3/2020 | Lin | |
| 10,633,905 B2 | 4/2020 | Feng | |
| 10,687,946 B2 * | 6/2020 | Bichler | F16F 9/516 |
| 10,920,474 B2 | 2/2021 | Shinmura | |
| 11,828,308 B1 * | 11/2023 | Lang | F16F 9/469 |
| 11,828,309 B1 * | 11/2023 | Lang | F15B 15/2815 |
| 12,286,060 B2 * | 4/2025 | Lang | E05F 3/108 |
| 12,286,829 B2 * | 4/2025 | Lang | E05F 3/12 |
| 12,287,024 B2 * | 4/2025 | Lang | F16F 9/537 |
| 2002/0010977 A1 | 1/2002 | Salice | |
| 2003/0155196 A1 | 8/2003 | Nishiyama | |
| 2003/0213663 A1 | 11/2003 | Salice | |
| 2004/0068833 A1 | 4/2004 | Sawa | |
| 2005/0034269 A1 | 2/2005 | Jinbo | |
| 2009/0119873 A1 | 5/2009 | Bassi | |
| 2009/0241287 A1 | 10/2009 | Reid | |
| 2010/0162521 A1 | 7/2010 | Pyo | |
| 2010/0170062 A1 | 7/2010 | Kim | |
| 2010/0221521 A1 * | 9/2010 | Wagner | C09K 23/00 428/323 |
| 2010/0287729 A1 | 11/2010 | Jin | |
| 2010/0319260 A1 | 12/2010 | Sawa | |
| 2013/0097805 A1 | 4/2013 | Bland | |
| 2014/0352111 A1 | 12/2014 | Ng | |
| 2014/0353938 A1 * | 12/2014 | Marble | F16F 9/065 188/269 |
| 2015/0040998 A1 | 2/2015 | Gilstad | |
| 2016/0040740 A1 * | 2/2016 | Manes | F16F 9/10 188/280 |
| 2016/0215552 A1 | 7/2016 | Lohken et al. | |
| 2017/0096850 A1 | 4/2017 | Hopkins | |
| 2017/0210458 A1 | 7/2017 | Tothill et al. | |
| 2017/0226682 A1 | 8/2017 | Duckworth | |
| 2017/0304057 A1 * | 10/2017 | Bichler | F16F 9/512 |
| 2018/0266512 A1 | 9/2018 | Zimmer | |
| 2019/0040667 A1 | 2/2019 | Feng | |
| 2019/0128362 A1 | 5/2019 | Naserimojarad | |
| 2019/0371090 A1 | 12/2019 | Lin et al. | |
| 2020/0011110 A1 | 1/2020 | Boundy | |
| 2020/0240190 A1 | 7/2020 | Held | |
| 2022/0015934 A1 * | 1/2022 | Bichler | F16F 9/516 |
| 2022/0220788 A1 | 7/2022 | Boundy | |
| 2022/0221019 A1 | 7/2022 | Boundy | |
| 2022/0221020 A1 | 7/2022 | Boundy | |
| 2022/0403905 A1 * | 12/2022 | Bichler | F16F 9/19 |
| 2024/0175476 A1 * | 5/2024 | Lang | F16F 9/53 |
| 2024/0175477 A1 * | 5/2024 | Lang | F16F 9/537 |
| 2024/0229534 A1 * | 7/2024 | Lang | E05F 1/00 |
| 2024/0300420 A1 * | 9/2024 | Lang | E05F 1/004 |

FOREIGN PATENT DOCUMENTS

| | | |
|---|---|---|
| DE | 102008014329 A1 | 9/2009 |
| EP | 0063635 B1 | 2/1985 |
| JP | 2003266222 A | 9/2003 |
| JP | 2004353712 A | 12/2004 |
| JP | 2009531631 A | 9/2009 |
| JP | 2014118303 A | 6/2014 |
| KR | 2020040018600 | 6/2006 |
| WO | 2007116273 A1 | 10/2007 |
| WO | 2020103458 A1 | 5/2020 |

* cited by examiner

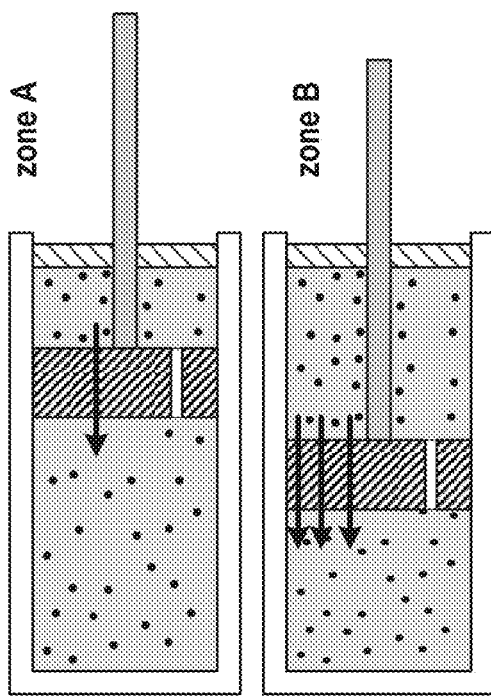
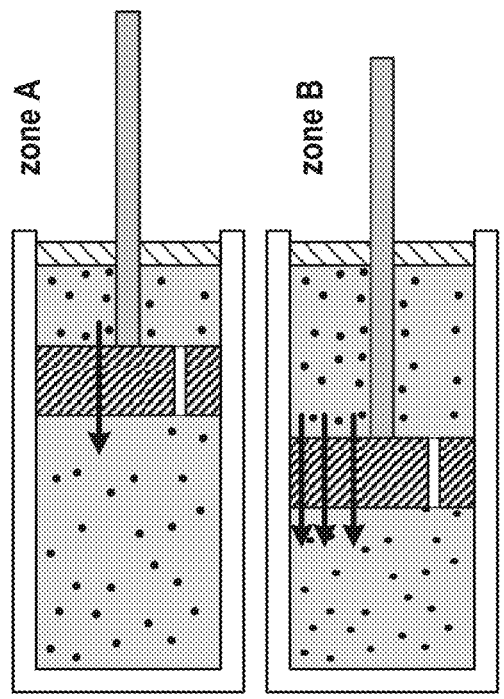
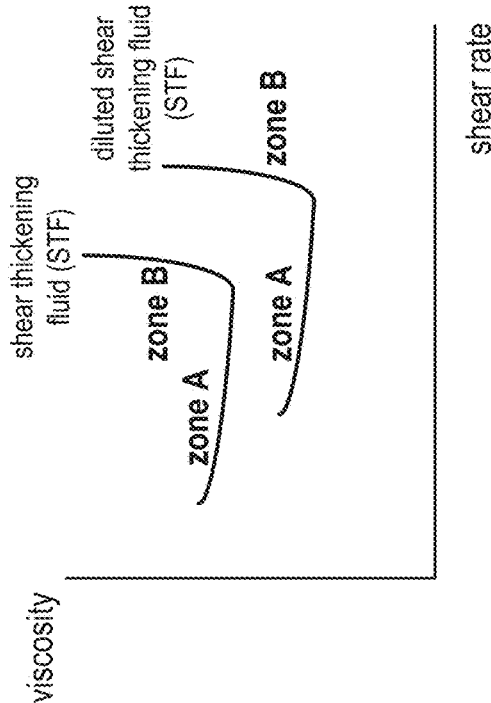
FIG. 1B
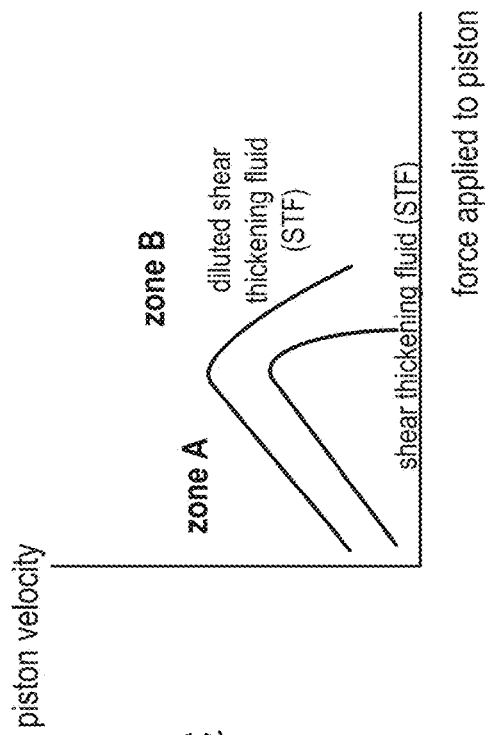
FIG. 1C

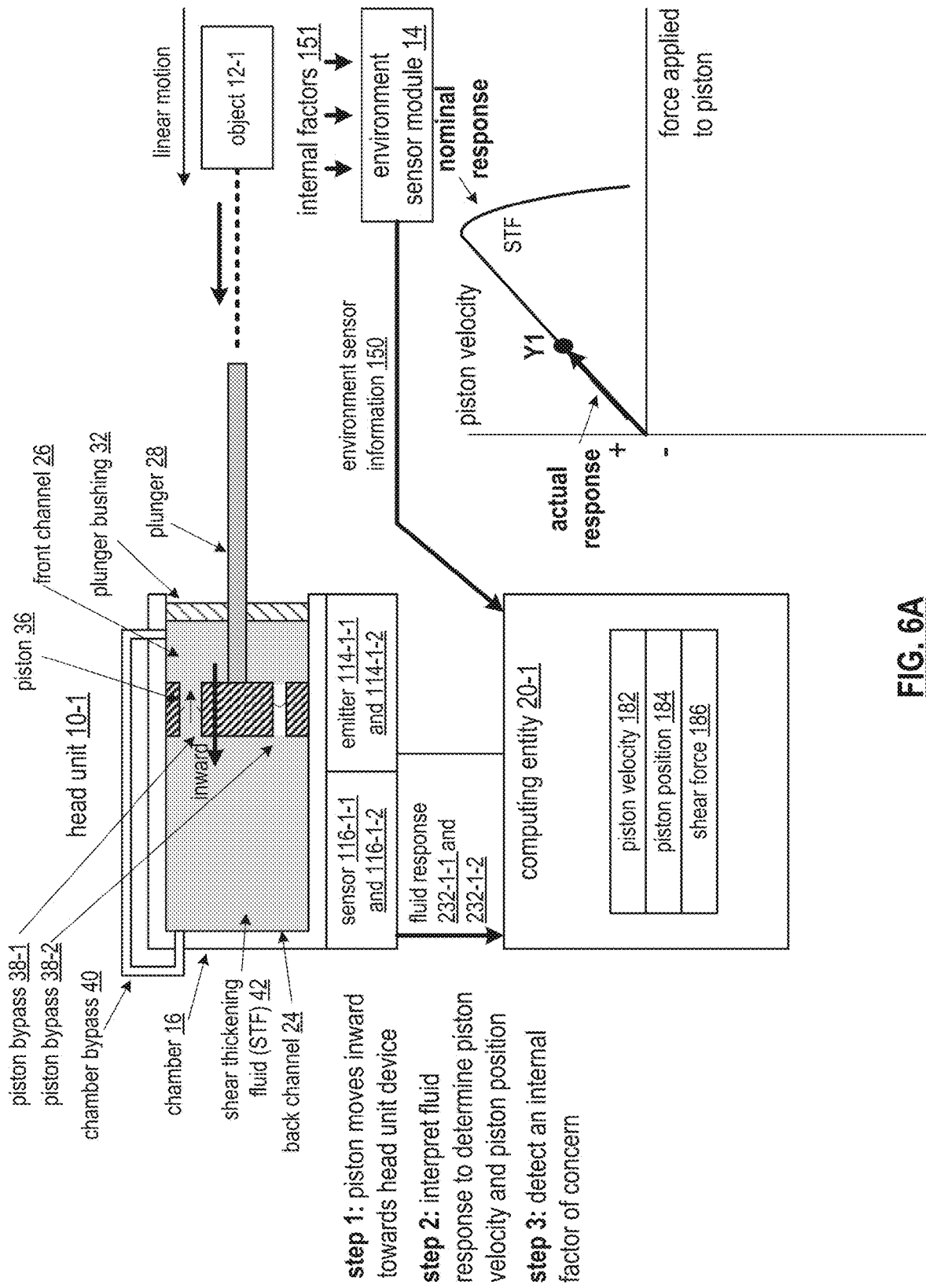

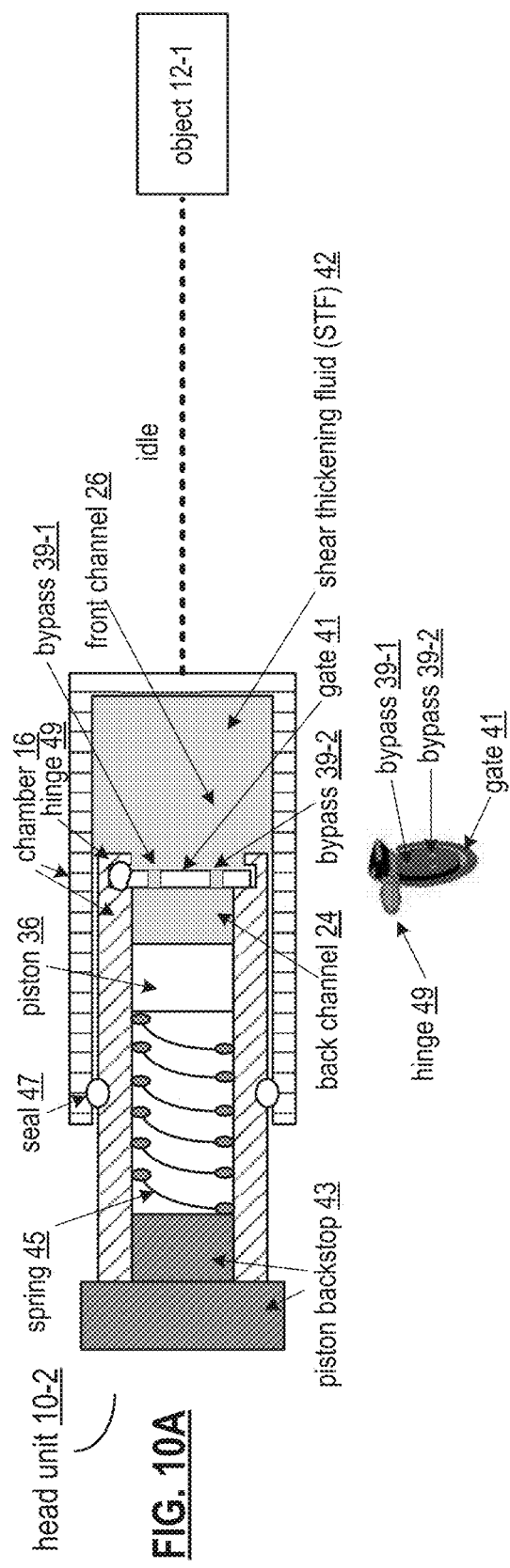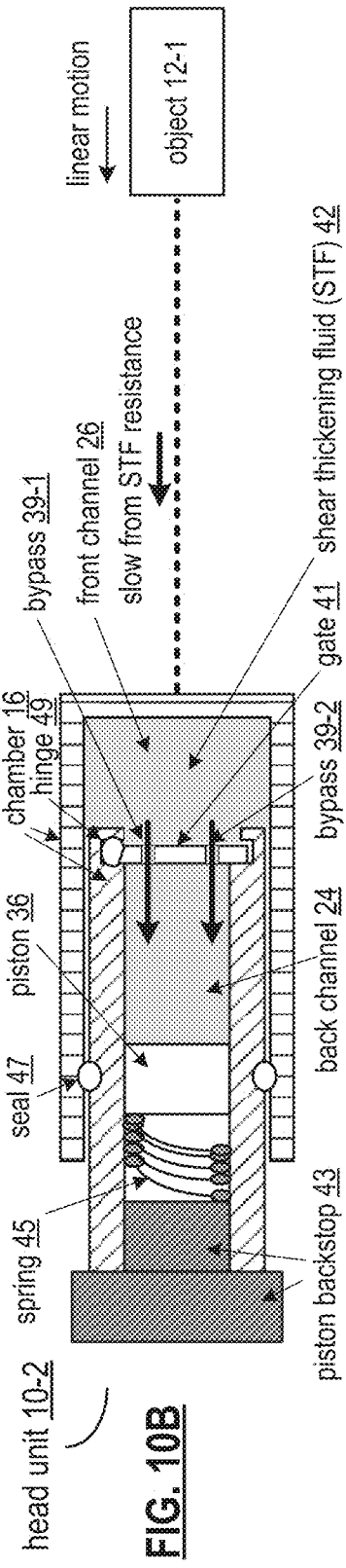

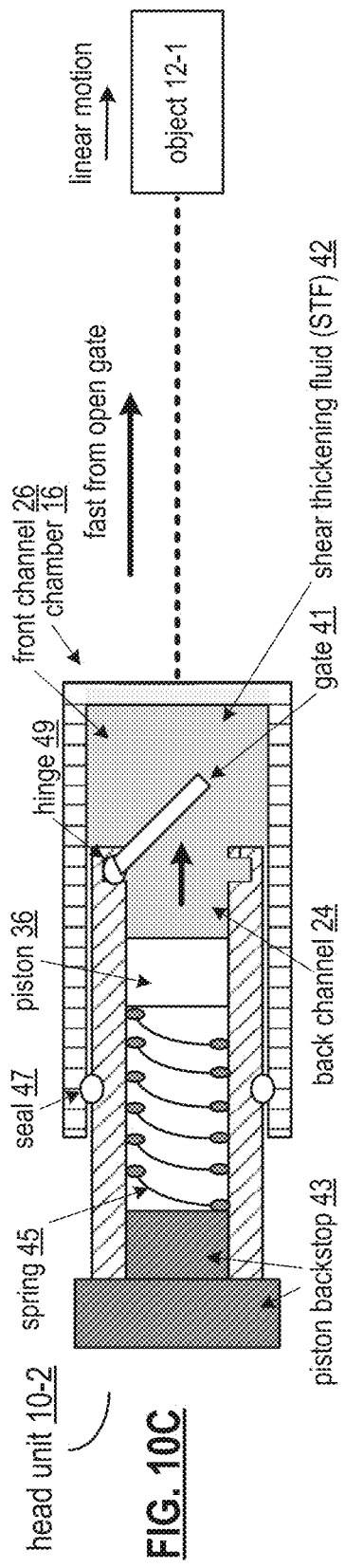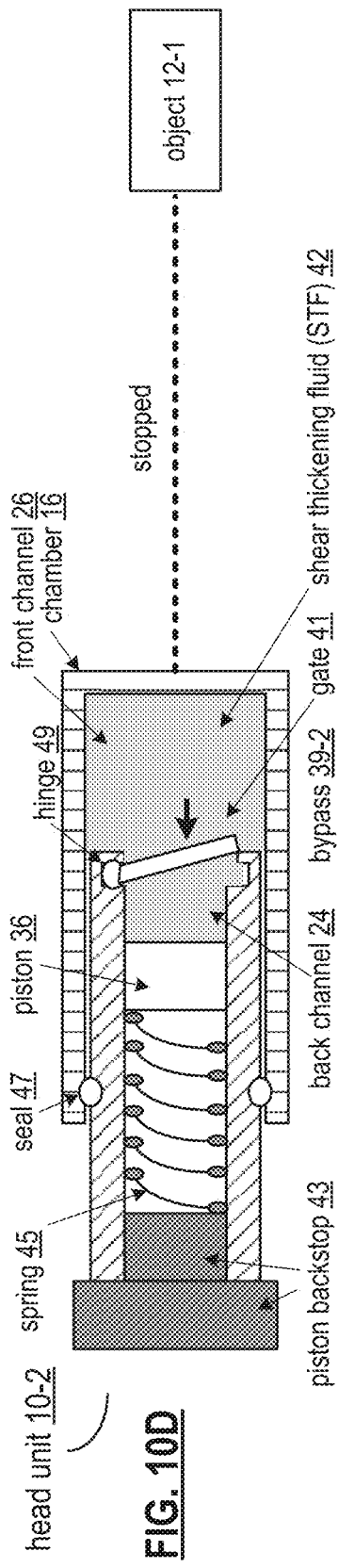

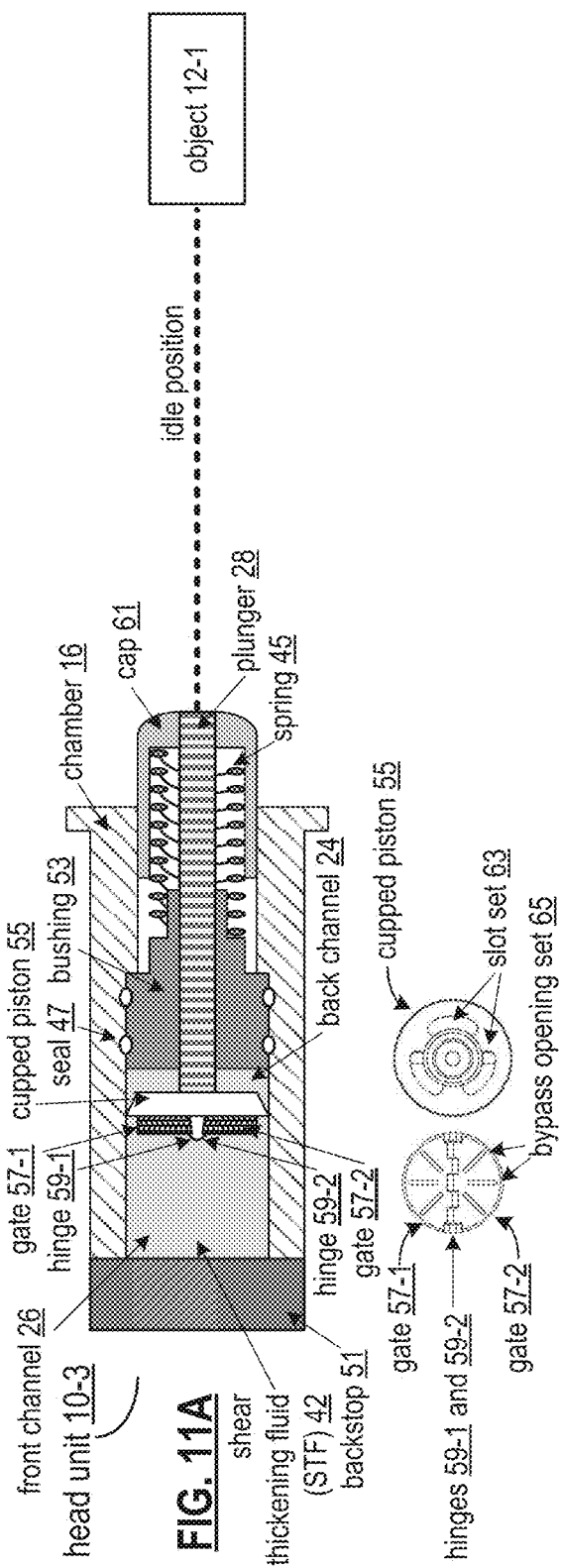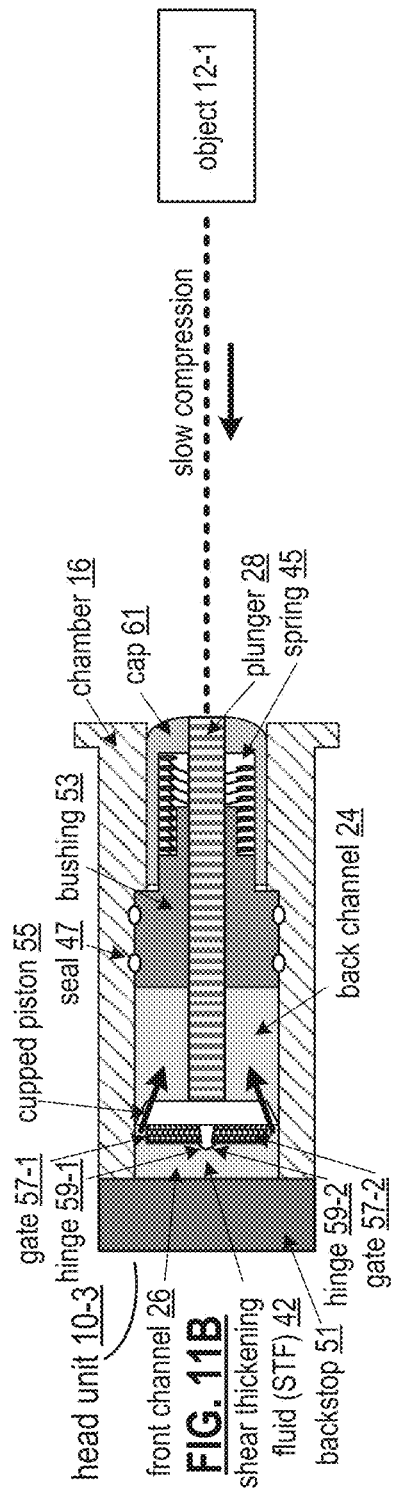

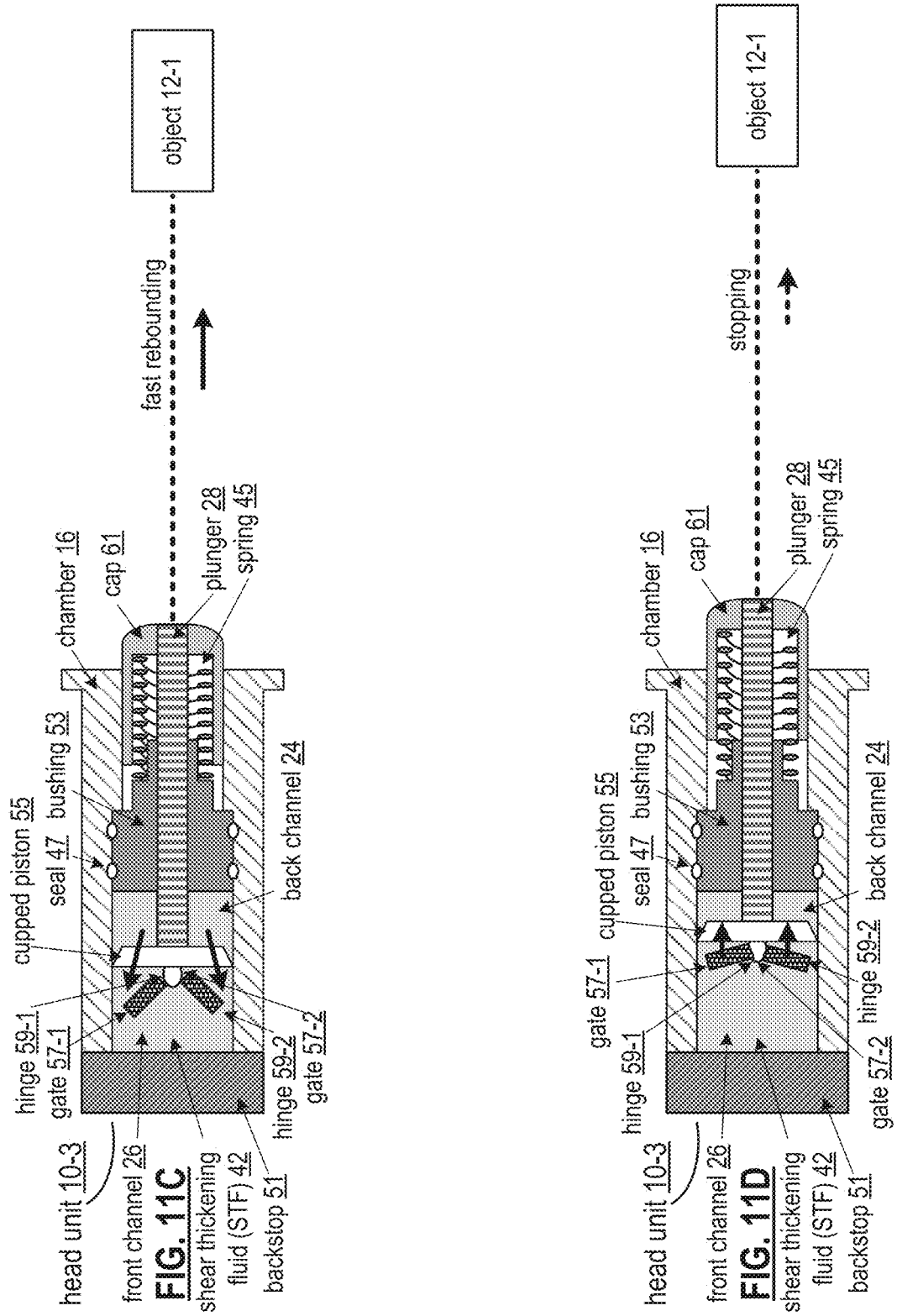

TELESCOPING SHEAR THICKENING FLUID BASED OBJECT CONTROL MECHANISM

CROSS-REFERENCE TO RELATED APPLICATIONS

The present U.S. Utility Patent application claims priority pursuant to 35 U.S.C. § 119(e) to U.S. Provisional Application No. 63/427,949, entitled "SHEAR THICKENING FLUID BASED OBJECT CONTROL MECHANISM", filed Nov. 25, 2022, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to systems that measure and control mechanical movement and more particularly to sensing and controlling of a linear and/or rotary movement mechanism that includes a chamber with dilatant fluid (e.g., a shear thickening fluid).

Description of Related Art

Many mechanical mechanisms are subject to undesired movement that can lead to annoying sounds, property damage and/or loss, and personal injury and even death. Desired and undesired movements of the mechanical mechanisms may involve a wide range of forces. A need exists to control the wide range of forces to solve these problems.

BRIEF DESCRIPTION OF THE SEVERAL VIEWS OF THE DRAWING(S)

FIG. 1B is a graph of viscosity vs. shear rate for an aspect of an embodiment of a mechanical and computing system in accordance with the present invention;

FIG. 1C is a graph of plunger velocity vs. force applied to the plunger for an aspect of an embodiment of a mechanical and computing system in accordance with the present invention;

FIGS. 6A-6B are schematic block diagrams of another embodiment of a mechanical and computing system illustrating an example of controlling operational aspects in accordance with the present invention;

FIGS. 10A-10D are schematic block diagrams of an embodiment of a mechanical system to control an object in accordance with the present invention;

FIGS. 11A-11D are schematic block diagrams of another embodiment of a mechanical system to control an object in accordance with the present invention.

DETAILED DESCRIPTION OF THE INVENTION

Figure 1A:
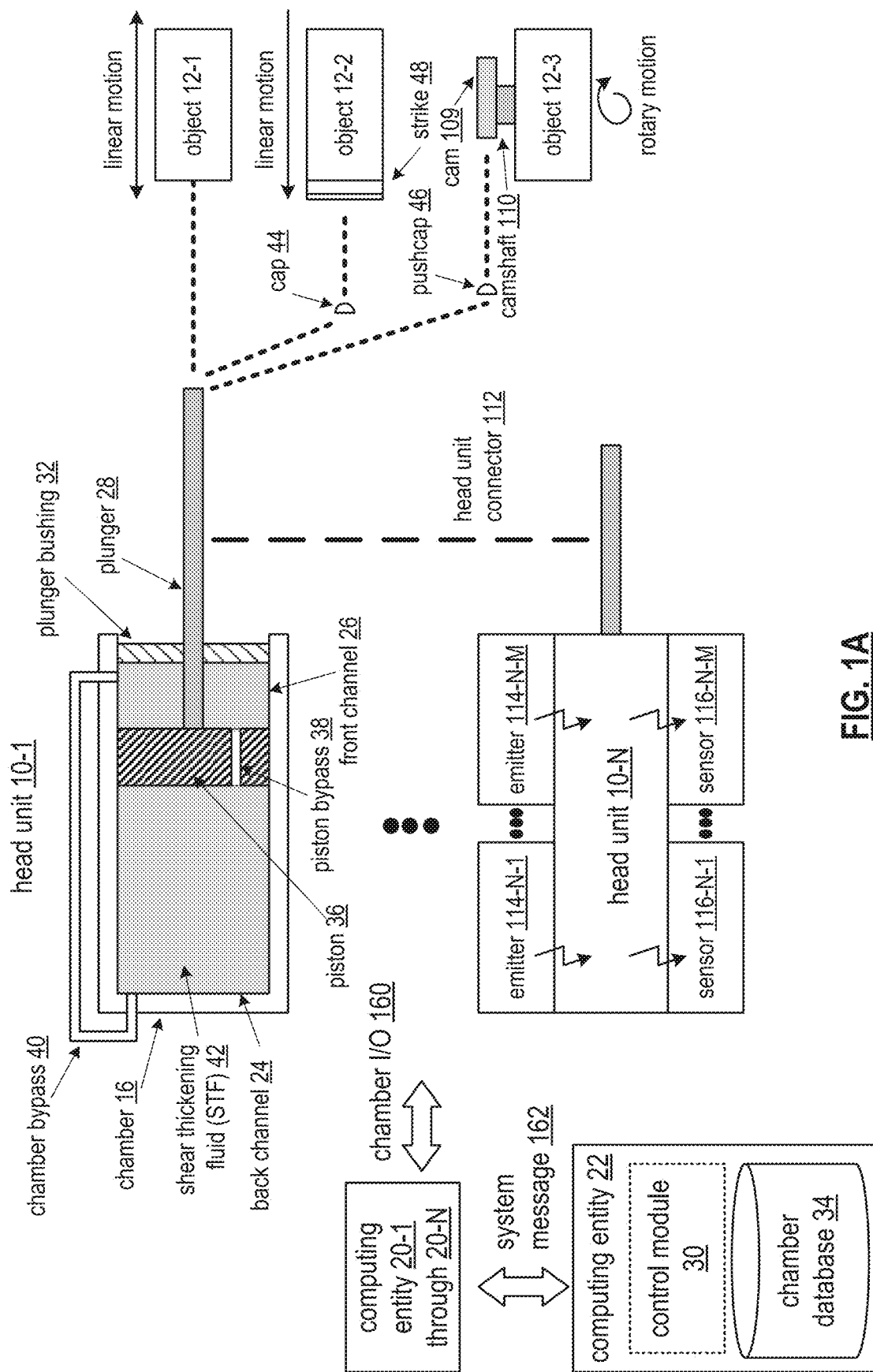
FIG. 1A is a schematic block diagram of an embodiment of a mechanical and computing system in accordance with the present invention.

FIG. 1A is a schematic block diagram of an embodiment of a mechanical and computing system that includes a set of head units 10-1 through 10-N, objects 12-1 through 12-3, computing entities 20-1 through 20-N associated with the head units 10-1 through 10-N, and a computing entity 22. The objects include any object that has mass and moves. Examples of an object include a door, an aircraft wing, a portion of a building support mechanism, and a particular drivetrain, etc.

The cross-sectional view of FIG. 1A illustrates a head unit that includes a chamber 16, a piston 36, a plunger 28, a plunger bushing 32, and a chamber bypass 40. The chamber 16 contains a shear thickening fluid (STF) 42. The chamber 16 includes a back channel 24 and a front channel 26, where the piston partitions the back channel 24 and the front channel 26. The piston 36 travels axially within the chamber 16. The chamber 16 may be a cylinder or any other shape that enables movement of the piston 36 and compression of the STF 42. The STF 42 is discussed in greater detail with reference to FIGS. 1B and 1C.

The plunger bushing 32 guides the plunger 28 into the chamber 16 in response to force from the object 12-1. The plunger bushing 32 facilitates containment of the STF within the chamber 16. The plunger bushing 32 remains in a fixed position relative to the chamber 16 when the force from the object moves the piston 36 within the chamber 16. In an embodiment the plunger bushing 32 includes an O-ring between the plunger bushing 32 and the chamber 16. In another embodiment the plunger bushing 32 includes an O-ring between the plunger bushing 32 and the plunger 28.

The piston 36 includes a piston bypass 38 between opposite sides of the piston to facilitate flow of a portion the STF between the opposite sides of the piston (e.g., between the back channel 24 and the front channel 26) when the piston travels through the chamber in an inward or an outward direction.

Alternatively, or in addition to, the chamber bypass 40 is configured between opposite ends of the chamber 16, wherein the chamber bypass 40 facilitates flow of a portion of the STF between the opposite ends of the chamber when the piston travels through the chamber in the inward or outward direction (e.g., between the back channel 24 and the front channel 26).

In alternative embodiments, the piston bypass 38 and the chamber bypass 40 includes mechanisms to enable STF flow in one direction and not an opposite direction. In further alternative embodiments, a control valve within the piston bypass 38 and/or the chamber bypass 40 controls the STF flow between the back channel 24 and the front channel 26. Each bypass includes one or more of a one-way check valve and a variable flow valve.

The plunger 28 is operably coupled to a corresponding object by one of a variety of approaches. A first approach includes a direct connection of the plunger 28 to the object 12-1 such that linear motion in any direction couples from the object 12-1 to the plunger 28. A second approach includes the plunger 28 coupled to a cap 44 which receives a one way force from a strike 48 attached to the object 12-2. A third approach includes a pushcap 46 that receives a force from a rotary-to-linear motion conversion component that is attached to the object 12-3. In an example, the object 12-3 is connected to a camshaft 110 which turns a cam 109 to strike the pushcap 46.

In an embodiment, two or more of the head units are coupled by a head unit connector 112. When so connected, actuation of a piston in a first head unit is essentially replicated in a piston of a second head unit. The head unit connector 112 includes a mechanical element between plungers of the two or more head units and/or direct connection of two or more plungers to a common object. For example, plunger 28 of head unit 10-1 and plunger 28 of head unit 10-2 are directly connected to object 12-1 when utilizing a direct connection.

Further associated with each head unit is a set of emitters and a set of sensors. For example, head unit 10-N includes a set of emitters 114-N-1 through 114-N-M and a set of sensors 116-N-1 through 116-N-M. Emitters includes any type of energy and or field emitting device to affect the STF, either directly or indirectly via other nanoparticles suspended in the STF. Examples of emitter categories include light, audio, electric field, magnetic field, wireless field, etc. Specific examples of fluid manipulation emitters include a variable flow valve associated with a bypass or injector or similar, a mechanical vibration generator, an image generator, a light emitter, an audio transducer, a speaker, an ultrasonic sound transducer, an electric field generator, a magnetic field generator, and a radio frequency wireless field transmitter. Specific examples of magnetic field emitters include a Helmholtz coil, a Maxwell coil, a permanent magnet, a solenoid, a superconducting electromagnet, and a radio frequency transmitting coil.

Sensors include any type of energy and/or field sensing device to output a signal that represents a reaction, motion or position of the STF. Examples of sensor categories include bypass valve position, mechanical position, image, light, audio, electric field, magnetic field, wireless field, etc. Specific examples of fluid flow sensors include a valve opening detector associated with the chamber 16 or any type of bypass (e.g., piston bypass 38, chamber bypass 40, a reservoir injector, or similar), a mechanical position sensor, an image sensor, a light sensor, an audio sensor, a microphone, an ultrasonic sound sensor, an electric field sensor, a magnetic field sensor, and a radio frequency wireless field sensor. Specific examples of magnetic field sensors include a Hall effect sensor, a magnetic coil, a rotating coil magnetometer, an inductive pickup coil, an optical magnetometry sensor, a nuclear magnetic resonance sensor, and a caesium vapor magnetometer.

The computing entities 20-1 through 20-N are discussed in detail with reference to FIG. 2A. The computing entity 22 includes a control module 30 and a chamber database 34 to facilitate storage of history of operation, desired operations, and other aspects of the system.

In an example of operation, the head unit 10-1 controls motion of the object 12-1 and includes the chamber 16 filled at least in part with the shear thickening fluid 42, the piston 36 housed at least partially radially within the chamber 16, and the piston 36 is configured to exert pressure against the shear thickening fluid 42 in response to movement of the piston 36 from a force applied to the piston from the object 12-1. The movement of the piston 36 includes one of traveling through the chamber 16 in an inward direction or traveling through the chamber 16 in an outward direction. The STF is configured to have a decreasing viscosity in response to a first range of shear rates and an increasing viscosity in response to a second range of shear rates.

The shear thickening fluid 42 (e.g., dilatant non-Newtonian fluid) has nanoparticles of a specific dimension that are mixed in a carrier fluid or solvent. Force applied to the shear thickening fluid 42 results in these nanoparticles stacking up, thus stiffening and acting more like a solid than a flowable liquid when a shear threshold is reached. In particular, viscosity of the shear thickening fluid 42 rises significantly when shear rate is increased to a point of the shear threshold. The relationship between viscosity and shear rates is discussed in greater detail with reference to FIGS. 1A and 1B.

In another example of operation, the object 12-1 applies an inward motion force on the plunger 28 which moves the piston 36 in words within the chamber 16. As the piston moves inward, shear rate of the shear thickening fluid 42 changes. A sensor 116-1-1 associated with the chamber 16 of the head unit 10-1 outputs chamber I/O 160 to the computing entity 20-1, where the chamber I/O 160 includes a movement data associated with the STF 42 as a result of the piston 36 moving inwards. Having received the chamber I/O 160, the computing entity 20-1 interprets the chamber I/O 160 to reproduce the movement data.

The computing entity 20-1 outputs the movement data as a system message 162 to the computing entity 22. The control module 30 stores the movement data in the chamber database 34 and interprets the movement data to determine whether to dynamically adjust the viscosity of the shear thickening fluid. Dynamic adjustment of the viscosity results in dynamic control of the movement of the piston 36, the plunger 28, and ultimately the object 12-1. Adjustment of the viscosity affects velocity, acceleration, and position of the piston 36.

The control module 30 determines whether to adjust the viscosity based on one or more desired controls of the object 12-1. The desired controls include accelerating, deaccelerating, abruptly stopping, continuing on a current trajectory, continuing at a constant velocity, or any other movement control. For example, the control module 30 determines to abruptly stop the movement of the object 12-1 when the object 12-1 is a door and the door is detected to be closing at a rate above a maximum closing rate threshold level and when the expected shear rate versus viscosity of the shear thickening fluid 42 requires modification (e.g., boost the viscosity now to slow the door from closing too quickly).

When determining to modify the viscosity, the control module 30 outputs a system message 162 to the computing entity 20-1, where the system message 162 includes instructions to immediately boost the viscosity beyond the expected shear rate versus viscosity of the shear thickening fluid 42. Alternatively, the system message 162 includes specific information on the relationship of viscosity versus shear rate.

Having received the system message 162, the computing entity 20-1 determines a set of adjustments to make with regards to the shear thickening fluid 42 within the chamber 16. The set of adjustments includes one or more of adjusting STF 42 flow through the chamber bypass 40, adjusting STF 42 flow through the piston bypass 38, and activating an emitter of a set of emitters 114-1-1 through 114-N-1. The flow adjustments include regulating within a flow range, stopping, starting, and allowing in one particular direction. For example, the computing entity 20-1 determines to activate emitter 114-1-1 to produce a magnetic field such as to interact with magnetic nanoparticles within the STF 42 to raise the viscosity. The computing entity 20-1 issues another chamber I/O 160 to the emitter 114-1-1 to initiate a magnetic influence process to boost the viscosity of the STF 42.

In an alternative embodiment, the computing entity 22 issues another system message 162 to two or more computing entities (e.g., 20-1 and 20-2) to boost the viscosity for corresponding head units 10-1 and 10-2 when the head unit connector 112 connects head units 10-1 and 10-2 and both head units are controlling the motion of the object 12-1. For instance, one of the head units informs the computing entity 22 that the object 12-1 is moving too quickly inward and the predicted stopping power of the expected viscosity versus shear rate of the STF 42 of the head unit, even when boosted, will not be enough to slow the object 12-1 to a desired velocity or position. When informed that one head unit, even with a modified viscosity, is not enough to control the object 12-1, the control module 30 determines how many other head units (e.g., connected via the head unit connector 112) to apply and to dynamically modify the viscosity.

In yet another alternative embodiment, the computing entity 22 issues a series of system messages 162 to a set of computing entities associated with a corresponding set of head units to produce a cascading effect of altering of the viscosity of the STF 42 of each of the chambers 16 associated with the set of head units. For example, 3 head units are controlled by 3 corresponding computing entities to adjust viscosity in a time cascaded manner. For instance, head unit 10-1 abruptly changes the viscosity to attempt to slow the object 12-1 followed seconds later by head unit 10-2 abruptly changing the viscosity to attempt to further slow the object 12-1, followed seconds later by head unit 10-1 abruptly changing the viscosity to attempt to further slow the object 12-1.

In a still further alternative embodiment, the computing entity 22 conditionally issues each message of the series of system messages 162 to the set of computing entities associated with the corresponding set of head units to produce the cascading effect of altering of the viscosity of the STF 42 of each of the chambers 16 associated with the set of head units only when a most recent adaptation of viscosity is not enough to slow the object 12-1 with desired results. For example, the 3 head units are controlled by the 3 corresponding computing entities to adjust viscosity in a conditional time cascaded manner. For instance, head unit 10-1 abruptly changes the viscosity to attempt to slow the object 12-1 followed seconds later by head unit 10-2 abruptly changing the viscosity if head unit 10-1 was unsuccessful to attempt to further slow the object 12-1, followed seconds later by head unit 10-2 abruptly changing the viscosity if head unit 10-2 was unsuccessful to attempt to further slow the object 12-1.

FIG. 1B is a graph of viscosity vs. shear rate for an aspect of an embodiment of a mechanical and computing system that includes a chamber, a shear thickening fluid, and a piston that moves through the chamber applying forces on the shear thickening fluid. The shear thickening fluid includes a non-Newtonian fluid since the relationship between shear rate and viscosity is nonlinear.

A relationship between compressive impulse (e.g., shear rate) and the viscosity of the shear thickening fluid is nonlinear and may comprise one or more inflection points as the piston travels within the chamber in response to different magnitudes of forces and different accelerations. The viscosity of the STF may also be a function of other influences, such as electric fields, acoustical waves, magnetic fields, and other similar influences. As a first example of a response of a shear thickening fluid, a first range of shear rates in zone A has a decreasing viscosity as the shear rate increases and then in a second range of shear rates in zone B the viscosity increases abruptly. As a second example of a response of a diluted shear thickening fluid, the first range of shear rates in zone A extends to a higher level of shear rates with the decreasing viscosity and then in the still higher second range of shear rates in zone B the viscosity increases abruptly similar to that of the shear thickening include.

The shear thickening fluid includes particles within a solvent. Examples of particles of the shear thickening fluid include oxides, calcium carbonate, synthetically occurring minerals, naturally occurring minerals, polymers, or a mixture thereof. Further examples of the particles of the shear thickening fluid include $SiO_2$, polystyrene, or polymethylmethacrylate.

The particles are suspended in a solvent. Example components of the solvent include water, a salt, a surfactant, and a polymer. Further example components of the solvent include ethylene glycol, polyethylene glycol, ethanol, silicon oils, phenyltrimethicone or a mixture thereof. Example particle diameters range from less than 100 μm to less than 1 millimeter. In an instance, the shear thickening fluid is made of silica particles suspended in polyethylene glycol at a volume fraction of approximately 0.57 with the silica particles having an average particle diameter of approximately 446 nm. As a result, the shear thickening fluid exhibits a shear thickening transition at a shear rate of approximately $10^2$-$10^3$ s−1.

A volume fraction of particles dispersed within the solvent distinguishes the viscosity versus shear rate of different shear thickening fluids. The viscosity of the STF changes in response to the applied shear stress. At rest and under weak applied shear stress, a STF may have a fairly constant or even slightly decreasing viscosity because the random distribution of particles causes the particles to frequently collide. However, as a greater shear stress is applied so that the shear rate increases, the particles flow in a more streamlined manner. However, as an even greater shear stress is applied so that the shear rate increases further, a hydrodynamic coupling between the particles may overcome the interparticle forces responsible for Brownian motion. The particles may be driven closer together, and the microstructure of the colloidal dispersion may change, so that particles cluster together in hydroclusters.

The viscosity curve of the STF can be fine-tuned through changes in the characteristics of the particles suspended in the solvent. For example, the particles shape, surface chemistry, ionic strength, and size affect the various interparticle forces involved, as does the properties of the solvent. However, in general, hydrodynamic forces dominate at a high shear stress, which also makes the addition of a polymer attached to the particle surface effective in limiting clumping in hydroclusters. Various factors influence this clumping behavior, including, fluid slip, adsorbed ions, surfactants, polymers, surface roughness, graft density (e.g., of a grafted polymer), molecular weight, and solvent, so that the onset of shear thickening can be modified. In general, the onset of shear thickening can be slowed by the introduction of techniques to prevent the clumping of particles. For example, influencing the STF with emissions from an emitter in proximal location to the chamber.

FIG. 1C is a graph of piston velocity vs. force applied to the piston for an aspect of an embodiment of a mechanical and computing system that includes a chamber, a shear thickening fluid, and a piston that moves through the chamber applying forces on the shear thickening fluid. The shear thickening fluid includes a non-Newtonian fluid since the relationship between shear rate and viscosity is nonlinear.

An example curve for a shear thickening fluid indicates that as more force is applied to the piston in zone A, a higher piston velocity is realized until the corresponding transition to zone B occurs where the shear threshold affect takes hold and the viscosity abruptly increases significantly. When the viscosity increases abruptly, the piston velocity slows back down and may even stop.

Another example curve for a diluted shear thickening fluid indicates that as more force is applied to the piston in zone A, an even higher piston velocity is realized until the corresponding transition to zone B occurs where the shear threshold affect takes hold and the viscosity abruptly increases significantly. When the viscosity increases abruptly, the piston velocity slows back down and may even stop.

Figure 2A:
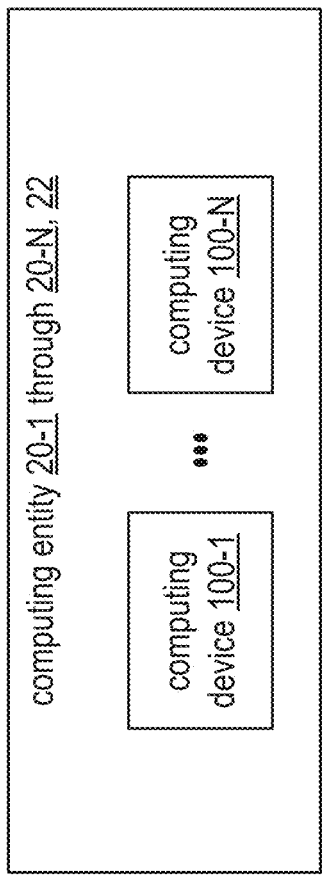
FIG. 2A is a schematic block diagram of an embodiment of a computing entity of a computing system in accordance with the present invention.

FIG. 2A is a schematic block diagram of an embodiment of the computing entity (e.g., 20-1 through 20-N; and 22) of the mechanical and computing system of FIG. 1. The computing entity includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
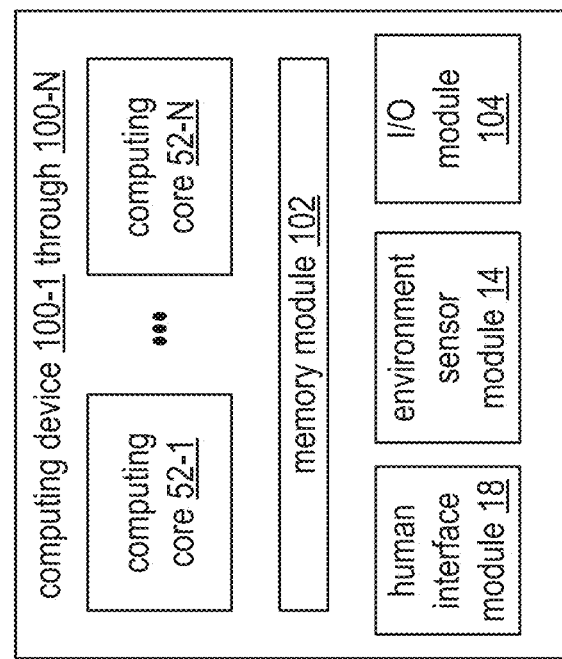
FIG. 2B is a schematic block diagram of an embodiment of a computing device of a computing system in accordance with the present invention.

FIG. 2B is a schematic block diagram of an embodiment of a computing device (e.g., 100-1 through 100-N) of the computing entity of FIG. 2A that includes one or more computing cores 52-1 through 52-N, a memory module 102, a human interface module 18, an environment sensor module 14, and an input/output (I/O) module 104. In alternative embodiments, the human interface module 18, the environment sensor module 14, the I/O module 104, and the memory module 102 may be standalone (e.g., external to the computing device). An embodiment of the computing device is discussed in greater detail with reference to FIG. 3.

Figure 3:
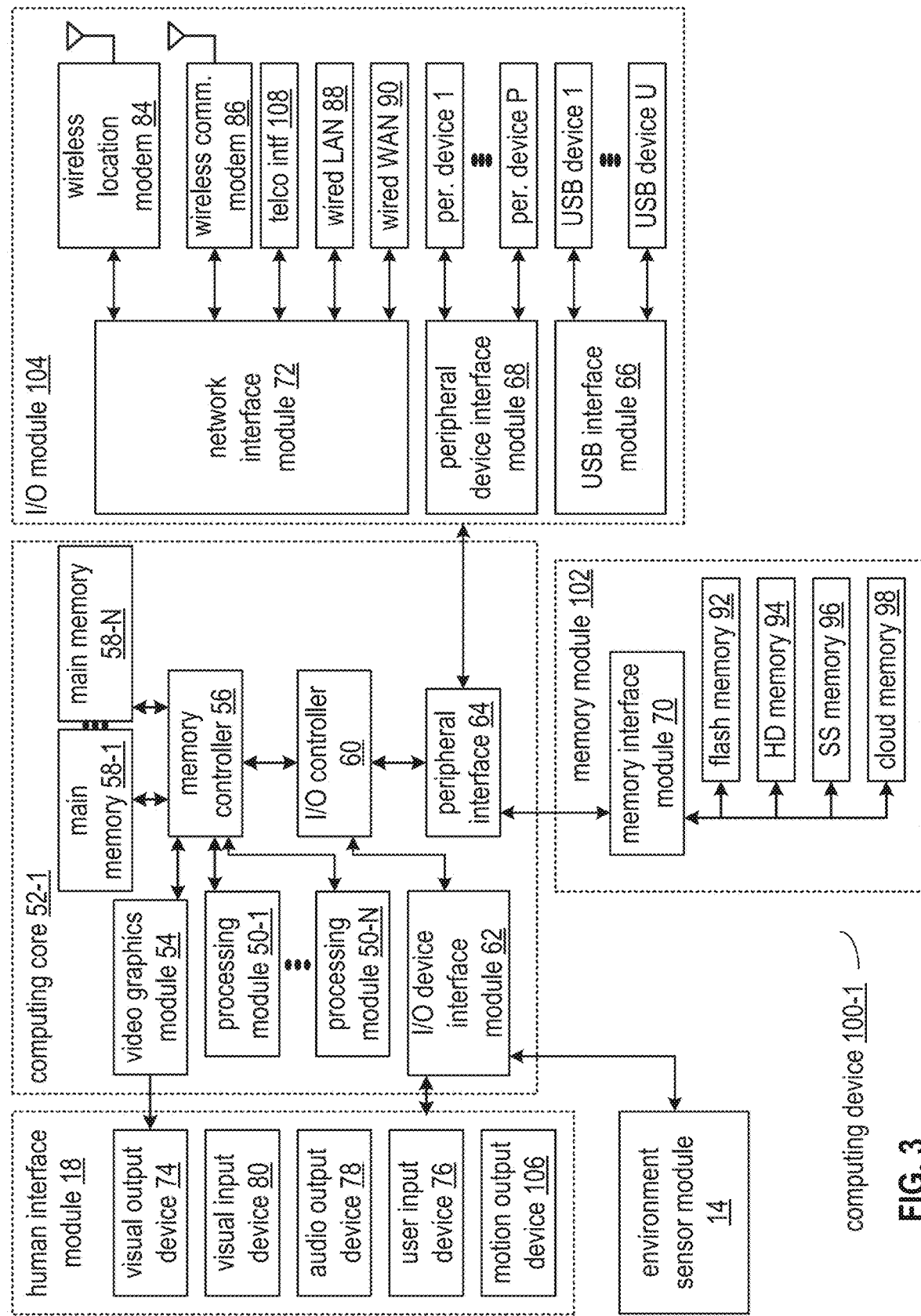
FIG. 3 is a schematic block diagram of another embodiment of a computing device of a computing system in accordance with the present invention.

FIG. 3 is a schematic block diagram of another embodiment of the computing device 100-1 of the mechanical and computing system of FIG. 1 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100-1 may include more or less devices and modules than shown in this example embodiment.

Figure 4:
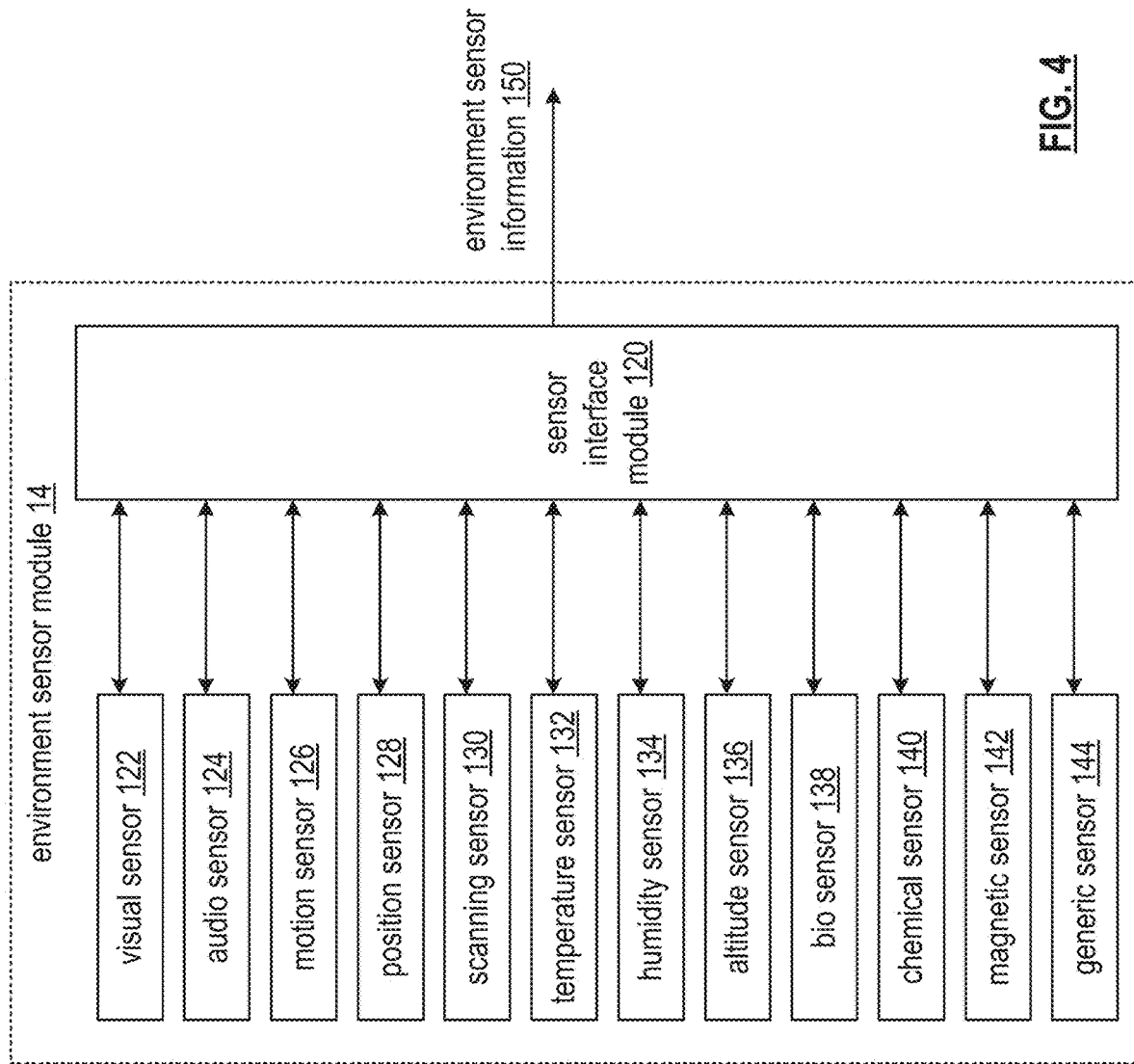
FIG. 4 is a schematic block diagram of an embodiment of an environment sensor module of a computing system in accordance with the present invention.

FIG. 4 is a schematic block diagram of an embodiment of the environment sensor module 14 of the computing device of FIG. 2B that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, MRI, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
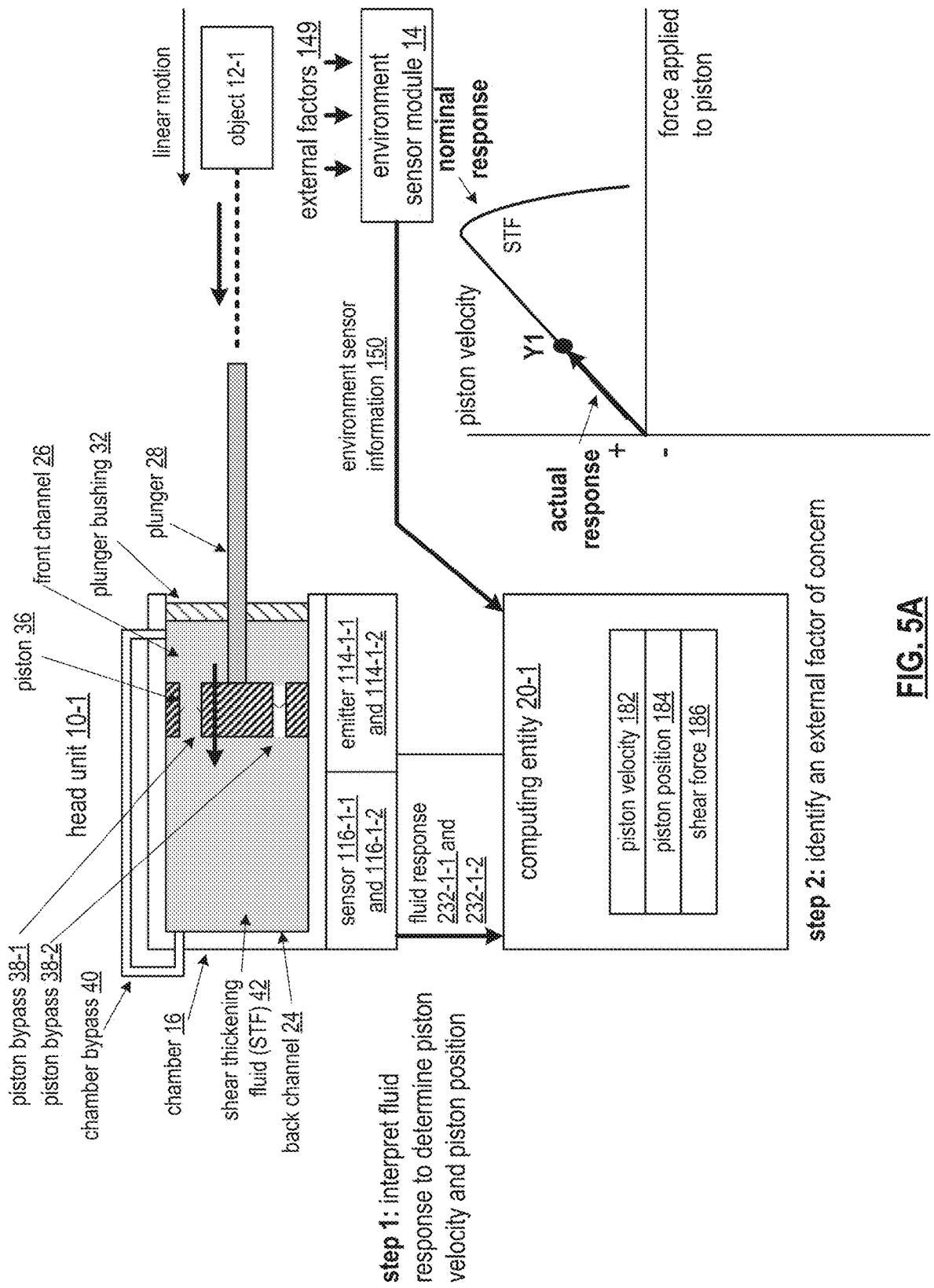
FIGS. 5A-5B are schematic block diagrams of another embodiment of a mechanical and computing system illustrating an example of controlling operational aspects in accordance with the present invention.
Figure 5B:
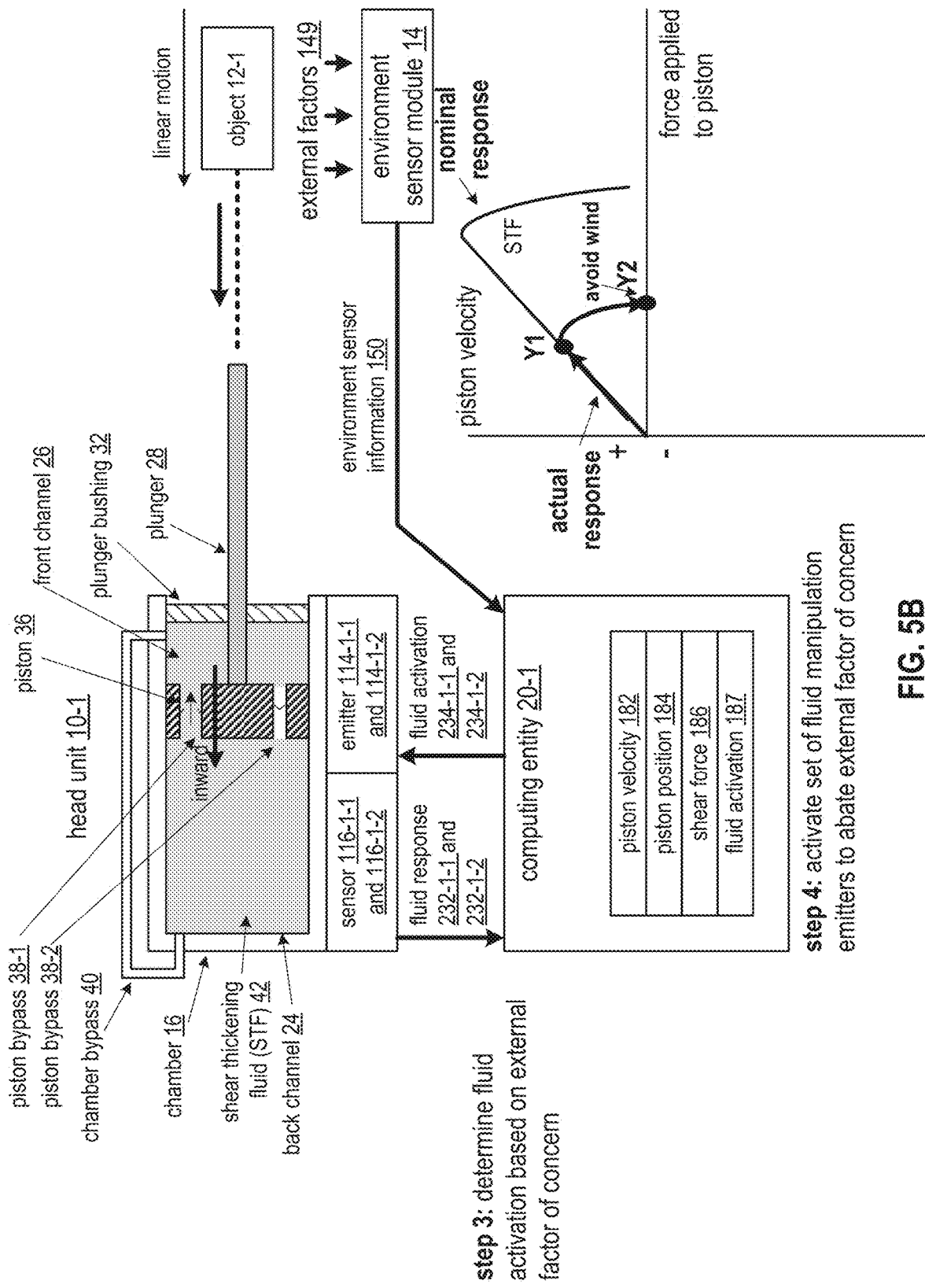

FIGS. 5A-5B are schematic block diagrams of another embodiment of a mechanical and computing system illustrating an example of controlling operational aspects. The mechanical and computing system includes a head unit system that includes the head unit 10-1 of FIG. 1, the object 12-1 of FIG. 1, the environment sensor module 14 of FIG. 2B, and the computing entity 20-1 of FIG. 1.

The head unit system further includes an environment sensor (e.g., environment sensor module 14 of FIG. 2B). The environment sensor is associated with an external environment that is external (e.g., outdoors) to an internal environment associated with the object. For example, the internal environment includes facilities inside a building and the external environment includes the environment outside the building.

The head unit 10-1 includes a shear thickening fluid (STF) 42. The STF is configured to have a decreasing viscosity in response to a first range of shear rates and an increasing viscosity in response to a second range of shear rates as discussed with reference to FIG. 1B. The second range of shear rates are greater than the first range of shear rates.

The head unit further includes a chamber 16. The chamber is configured to contain a portion of the STF and includes a front channel 26 and a back channel 24.

The head unit further includes a piston 36 housed at least partially radially within the chamber 16 and separating the back channel 24 and the front channel 26. The piston configured to exert pressure against the shear thickening fluid in response to movement of the piston from a force applied to the piston from the object 12-1. The movement of the piston includes one of traveling through the chamber in an inward direction or traveling through the chamber in an outward direction. The piston travels toward the back channel and away from the front channel when traveling in the inward direction. The piston travels toward the front channel and away from the back channel when traveling in the outward direction.

The piston 36 includes a first piston bypass 38-1 between opposite sides of the piston that controls flow of the STF 42 between the opposite sides of the piston from the back channel to the front channel when the piston is traveling through the chamber in the inward direction to cause the STF to react with a first shear threshold effect.

The piston 36 further includes a second piston bypass 38-2 between the opposite sides of the piston that controls flow of the STF between the opposite sides of the piston from the front channel to the back channel when the piston is traveling through the chamber in the outward direction to cause the STF to react with a second shear threshold effect.

The head unit 10-1 further includes a set of fluid flow sensors 116-1-1 and 116-1-2 positioned proximal to the chamber 16. The set of fluid flow sensors provide the fluid response 232-1-1 and 232-1-2 respectively from the STF 42.

The head unit 10-1 further includes set of fluid manipulation emitters 114-1-1 and 114-1-2 positioned proximal to the chamber 16. The set of fluid manipulation emitters provide a fluid activation to at least one of the STF 42 (e.g., shifting the shear rate versus viscosity curve), the first piston bypass 38-1 (e.g., to block or allow flow of the STF), and the second piston bypass 38-2 to control the motion of the object 12-1.

FIG. 5A illustrates an example of operation of a method for the controlling the operational aspects that includes the piston 36 moving inward towards the head unit 10-1 when the object 12-1 exerts the force on the plunger 28 that transfers the force to the piston 36. As a result, the piston 36 exerts the force on the STF 42 within the back channel 24.

A first step of the example of operation includes the computing entity 20-1 interpreting a fluid response from the set of fluid flow sensors to produce a piston velocity 182 and a piston position 184 of the piston 36 associated with the head unit device of the head unit system. The set of fluid flow sensors are positioned proximal to the head unit device for controlling motion of the object 12-1 within the internal environment. For example, the computing entity 20-1 interprets fluid responses 232-1-1 and 232-1-2 from the STF 42 in response to varying responsiveness of particles of the STF to produce the piston velocity and the piston position.

The interpreting the fluid response from the set of fluid flow sensors to produce the piston velocity and the piston position of the piston includes a series of sub-steps. A first sub-step includes inputting, from one or more fluid flow sensors of the set of fluid flow sensors, a set of fluid flow signals over a time range. For example, the computing entity 20-1 receives fluid responses 232-1-1 and 232-1-2 over the time range, where the fluid responses include the fluid flow signals.

A second sub-step includes determining the fluid flow response of the set of fluid flow sensors based on the set of fluid flow signals. For example, the computing entity 20-1 interprets the fluid flow signals to produce the fluid flow response.

A third sub-step includes determining the piston velocity based on the fluid flow response of the set of fluid flow sensors over the time range. For example, the computing entity 20-1 calculates piston velocity based on changes in the fluid flow response over the time range.

A fourth sub-step includes determining the piston position based on the piston velocity and a real-time reference. For example, the computing entity 20-1 calculates the piston position based on time in the piston velocity as the piston moves through the chamber.

As yet another example of interpreting the fluid response 232-1-1 and 232-1-2, the computing entity 20-1 compares the fluid response 232-1-1 and 232-1-2 to previous measurements of fluid flow versus piston velocity and piston position to produce the piston velocity 182 and piston position 184. As a still further example of the interpreting the fluid response 232-1-1 and 232-1-2, the computing entity 20-1 extracts the piston velocity 182 and the piston position 184 directly from the fluid response 232-1-1 and/or 232-1-2 when the sensors 116-1-1 and 116-1-2 generate the piston velocity and piston position directly.

The first step of the example of operation further includes the computing entity 20-1 determining a shear force 186 based on the piston velocity 182 and the piston position 184. The determining the shear force based on the piston velocity and the piston position includes one approach of a variety of approaches. A first approach includes extracting the shear force directly from the fluid flow response when one or more fluid flow sensors of the set of fluid flow sensors outputs a shear force encoded signal. For example, the computing entity 20-1 extracts the shear force 186 directly from the fluid responses 232-1-1 and 232-1-2. In an instance, the shear force 186 reveals the piston velocity versus force applied to the piston curve as illustrated in FIG. 5A, where at a current time of interpreting the fluid flow response, the force and piston velocity are at a point Y1.

A second approach includes determining the shear force utilizing the piston velocity and stored data for piston velocity versus shear force for the STF. For example, the computing entity 20-1 compares the velocity and position to stored data for instantaneous velocity and position versus shear force for the STF 42.

A third approach includes determining the shear force utilizing the piston position and stored data for piston position and a piston bypass versus shear force for the STF within the chamber. For example, the computing entity 20-1 compares the velocity and position to stored data for instantaneous velocity and position versus shear force for the STF 42 based on an actual valve opening status of the first piston bypass 38-1 (e.g., which allows flow of the STF from the back channel 24 to the front channel 26 when the piston is moving in the inward direction of the example).

Having determined the piston velocity and the piston position, a second step of the example of operation includes the computing entity 20-1 interpreting an output of the environment sensor to identify an external factor of concern associated with the external environment that is likely to affect the internal environment. The external factor 149 of concern is associated with one or more of a wind gust, wind from a particular direction, rain, snow, humidity, air pressure, temperature, an air pollutant, and/or any other factor of concern. The interpreting the output of the environment sensor to identify the external factor of concern associated with the external environment that is likely to affect the internal environment includes a series of sub-steps.

A first sub-step includes the computing entity 20-1 obtaining environment sensor information 150 from the environment sensor 14 for a set of timeframes (e.g., every second for 5 minutes). A second sub-step includes the computing entity 20-1 identifying an external factor of external factors 149 from the environment sensor information 150 for the set of timeframes. For example, periodic wind directions and/or periodic external temperatures.

A third sub-step includes the computing entity 20-1 determining whether an amplitude of the external factor for the set of timeframes is greater than a maximum amplitude threshold level. For example, the computing entity 20-1 interprets environment sensor information 150 to identify external wind direction from the northwest with a wind speed of 75 miles an hour and determining that the wind speed is greater than a maximum wind speed threshold level (e.g., 40 mph).

A fourth sub-step includes the computing entity 20-1 indicating the external factor of concern associated with the external environment that is likely to affect the internal environment when the amplitude of the external factor for the set of timeframes is greater than the maximum amplitude threshold level. For example, the computing entity 20-1 indicates a low external temperature as external factor of concern when interpreting the environment sensor information 150 to identify an external temperature of 20° below zero Fahrenheit and then determining that the external temperature is less than a minimum external temperature threshold level (e.g., 10° above zero Fahrenheit). The FIG. 5B further illustrates the example of operation, where having detected the external factor of concern, in a third step the computing entity 20-1 determines the fluid activation 187 for the head unit based on the external factor of concern and one or more of the piston velocity, the piston position, and the shear force 186. The determining the fluid activation for the head unit device based on the external factor of concern and one or more of the piston velocity and the piston position includes one or more of a variety of approaches.

A first approach includes the computing entity 20-1 interpreting a request associated with modifying one or more of object velocity and object position. For example, the computing entity 20-1 receives the request from another computing entity with superior information with regards to the external environment and effects on the internal environment.

A second approach includes the computing entity 20-1 interpreting guidance from a chamber database based on the external factor of concern. For example, the computing entity 20-1 accesses the chamber database 34 FIG. 1A to recover the guidance for high winds and low temperatures with regards to controlling internal environment objects (e.g., doors).

A third approach includes the computing entity 20-1 establishing the fluid activation to include facilitating the second range of shear rates to slow down the object when detecting that the external factor of concern includes an external factor that indicates an abatement of the effect on the internal environment from the external factor of concern includes slowing down the object. For example, the computing entity 20-1 establishes the fluid activation 187 to facilitate closing of an external door more slowly when the external factor indicates an abundance of desirable fresh air.

A fourth approach includes the computing entity 20-1 establishing the fluid activation to include facilitating the first range of shear rates to speed up the object when detecting that the external factor of concern includes another external factor that indicates the abatement of the effect on the internal environment from the external factor of concern includes speeding up the object. For example, the computing entity 20-1 establishes the fluid activation 187 to facilitate closing of an external door more quickly, yet safely, when the external factor is the wind speed and direction and the object 12-1 includes the external door. As another example, the computing entity 20-1 establishes the fluid activation 187 to facilitate closing of the external door more quickly, yet safely, when external factor is low ambient temperature.

The third step further includes the computing entity 20-1 interpreting the output of the environment sensor to update the external factor of concern associated with the external environment to produce updated external factor of concern associated with the external environment. For example, the computing entity 20-1 reestablishes the external factor of concern 30 minutes later. Having updated the external factor of concern, the computing entity 20-1 updates the fluid activation for the head unit device based on the updated external factor of concern associated with the external environment and one or more of the piston velocity and the piston position. For example, the computing entity 20-1 reestablishes the fluid activation to adapt to the most recent external factor of concern.

Having determined the fluid activation, a fourth step of the example method of operation includes the computing entity 20-1 activating the set of fluid manipulation emitters in accordance with the fluid activation to control the motion of the object to abate the effect on the internal environment from the external factor of concern. The control of the motion includes one or more of direct manipulation of the STF, facilitation of the first shear threshold effect associated with the first piston bypass, and facilitation of the second shear threshold effect associated with the second piston bypass.

The activating the set of fluid manipulation emitters in accordance with the fluid activation to control the motion of the object to abate the effect on the internal environment from the external factor of concern includes a variety of approaches. When the piston is traveling through the chamber in the inward direction and when the STF is to have the decreasing viscosity, a first sub-approach includes the computing entity 20-1 issuing the fluid activation 234-1-1 to the set of fluid manipulation emitters 114-1-1 to cause one of the first piston bypass 38-1 to facilitate the first shear threshold effect to include the first range of shear rates, and the direct manipulation of the STF 42 to facilitate the first range of shear rates (e.g., lowering viscosity to speed up opening or closing of the door, raising viscosity to slow down the opening or the closing of the door).

When the piston is traveling through the chamber in the inward direction and when the STF is to have the increasing viscosity, a second sub-approach includes the computing entity 20-1 issuing the fluid activation 234-1-2 to the set of fluid manipulation emitters 114-1-2 to cause one of the first piston bypass 38-1 to facilitate the first shear threshold effect to include the second range of shear rates, and the direct manipulation of the STF 42 to facilitate the second range of shear rates. For example, when the object 12-1 includes the external door closing (e.g., piston moving in the inward direction) in a high wind situation, the computing entity 20-1 outputs the fluid activation 234-1-1 to the piston bypass 38-1 to facilitate closing down the one-way check valve to prevent STF from moving from the back channel 24 to the front channel 26 thusly selecting the second range of shear rates and a higher viscosity the STF to slow down the door to close safely moving from the point Y1 to the point Y2 (e.g., at a dead stop when closed) as illustrated in FIG. 5B.

When the piston is traveling through the chamber in the outward direction and when the STF is to have the decreasing viscosity a third sub-approach includes the computing entity 20-1 issuing the fluid activation 234-1-1 to the set of fluid manipulation emitters 114-1-1 to cause one of the second piston bypass 38-2 to facilitate the second shear threshold effect to include the first range of shear rates, and the direct manipulation of the STF 42 to facilitate the first range of shear rates.

When the piston is traveling through the chamber in the outward direction and when the STF is to have the increasing viscosity a fourth sub-approach includes the computing entity 20-1 issuing the fluid activation 234-1-2 to the set of fluid manipulation emitters 114-1-2 to cause one of the second piston bypass 38-2 to facilitate the second shear threshold effect to include the second range of shear rates, and the direct manipulation of the STF 42 to facilitate the second range of shear rates.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

Figure 6B:
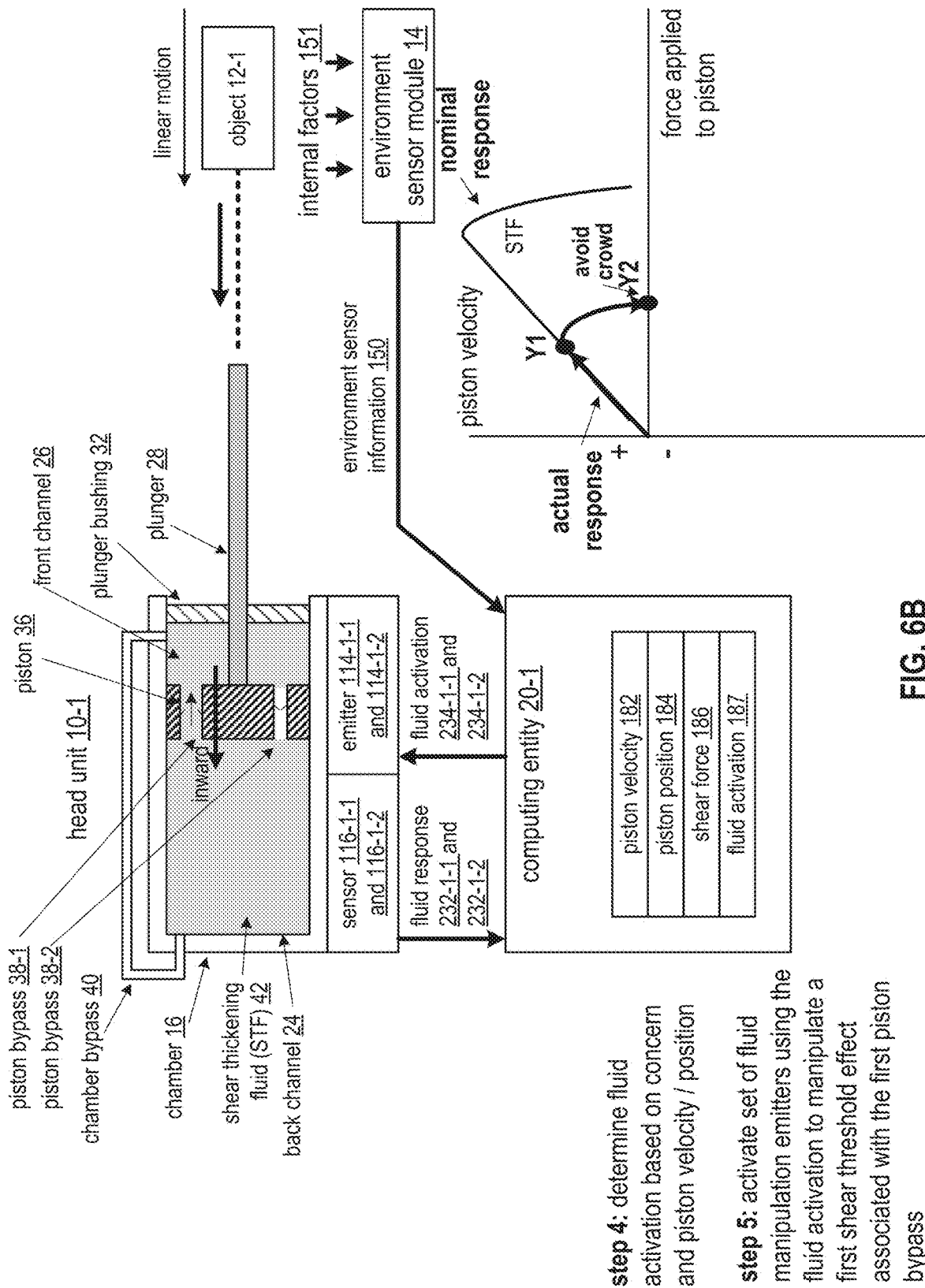

FIGS. 6A-6B are schematic block diagrams of another embodiment of a mechanical and computing system illustrating an example of controlling operational aspects. The mechanical and computing system includes the head unit 10-1 of FIG. 1, the object 12-1 of FIG. 1, and the computing entity 20-1 of FIG. 1.

The head unit system includes an environment sensor (e.g., environment sensor module 14 of FIG. 2B). The environment sensor is associated with an internal environment that is internal to an external environment associated with the object. For example, the internal environment includes facilities inside a building and the external environment includes the environment outside the building.

The head unit 10-1 includes a shear thickening fluid (STF) 42. The STF is configured to have a decreasing viscosity in response to a first range of shear rates and an increasing viscosity in response to a second range of shear rates as discussed with reference to FIG. 1B. The second range of shear rates are greater than the first range of shear rates.

The head unit further includes a chamber 16. The chamber is configured to contain a portion of the STF and includes a front channel 26 and a back channel 24.

The head unit further includes a piston 36 housed at least partially radially within the chamber 16 and separating the back channel 24 and the front channel 26. The piston configured to exert pressure against the shear thickening fluid in response to movement of the piston from a force applied to the piston from the object 12-1. The movement of the piston includes one of traveling through the chamber in an inward direction or traveling through the chamber in an outward direction. The piston travels toward the back channel and away from the front channel when traveling in the inward direction. The piston travels toward the front channel and away from the back channel when traveling in the outward direction.

The piston 36 includes a first piston bypass 38-1 between opposite sides of the piston that controls flow of the STF 42 between the opposite sides of the piston from the back channel to the front channel when the piston is traveling through the chamber in the inward direction to cause the STF to react with a first shear threshold effect.

The piston 36 further includes a second piston bypass 38-2 between the opposite sides of the piston that controls flow of the STF between the opposite sides of the piston from the front channel to the back channel when the piston is traveling through the chamber in the outward direction to cause the STF to react with a second shear threshold effect.

The head unit 10-1 further includes a set of fluid flow sensors 116-1-1 and 116-1-2 positioned proximal to the chamber 16. The set of fluid flow sensors provide the fluid response 232-1-1 and 232-1-2 respectively from the STF 42.

The head unit 10-1 further includes set of fluid manipulation emitters 114-1-1 and 114-1-2 positioned proximal to the chamber 16. The set of fluid manipulation emitters provide a fluid activation to at least one of the STF 42 (e.g., shifting the shear rate versus viscosity curve), the first piston bypass 38-1 (e.g., to block or allow flow of the STF), and the second piston bypass 38-2 to control the motion of the object 12-1.

FIG. 6A illustrates an example of operation of a method for the controlling the operational aspects. A first step of the example of operation includes the piston 36 moving inward towards the head unit 10-1 when the object 12-1 exerts the force on the plunger 28 that transfers the force to the piston 36. As a result, the piston 36 exerts the force on the STF 42 within the back channel 24.

A second step of the example of operation includes the computing entity 20-1 interpreting a fluid response from the set of fluid flow sensors to produce a piston velocity 182 and a piston position 184 of the piston 36 associated with a head unit device of a head unit system. The set of fluid flow sensors are positioned proximal to the head unit device for controlling motion of the object 12-1 within the internal environment. For example, the computing entity 20-1 interprets fluid responses 232-1-1 and 232-1-2 from the STF 42 in response to varying responsiveness of particles of the STF to produce the piston velocity and the piston position.

The interpreting the fluid response from the set of fluid flow sensors to produce the piston velocity and the piston position of the piston includes a series of sub-steps. A first sub-step includes inputting, from one or more fluid flow sensors of the set of fluid flow sensors, a set of fluid flow signals over a time range. For example, the computing entity 20-1 receives fluid responses 232-1-1 and 232-1-2 over the time range, where the fluid responses include the fluid flow signals.

A second sub-step includes determining the fluid flow response of the set of fluid flow sensors based on the set of fluid flow signals. For example, the computing entity 20-1 interprets the fluid flow signals to produce the fluid flow response.

A third sub-step includes determining the piston velocity based on the fluid flow response of the set of fluid flow sensors over the time range. For example, the computing entity 20-1 calculates piston velocity based on changes in the fluid flow response over the time range.

A fourth sub-step includes determining the piston position based on the piston velocity and a real-time reference. For example, the computing entity 20-1 calculates the piston position based on time in the piston velocity as the piston moves through the chamber.

As yet another example of interpreting the fluid response 232-1-1 and 232-1-2, the computing entity 20-1 compares the fluid response 232-1-1 and 232-1-2 to previous measurements of fluid flow versus piston velocity and piston position to produce the piston velocity 182 and piston position 184. As a still further example of the interpreting the fluid response 232-1-1 and 232-1-2, the computing entity 20-1 extracts the piston velocity 182 and the piston position 184 directly from the fluid response 232-1-1 and/or 232-1-2 when the sensors 116-1-1 and 116-1-2 generate the piston velocity and piston position directly.

The second step of the example of operation further includes the computing entity 20-1 determining a shear force 186 based on the piston velocity 182 and the piston position 184. The determining the shear force based on the piston velocity and the piston position includes one approach of a variety of approaches. A first approach includes extracting the shear force directly from the fluid flow response when one or more fluid flow sensors of the set of fluid flow sensors outputs a shear force encoded signal. For example, the computing entity 20-1 extracts the shear force 186 directly from the fluid responses 232-1-1 and 232-1-2. In an instance, the shear force 186 reveals the piston velocity versus force applied to the piston curve as illustrated in FIG. 6A, where at a current time of interpreting the fluid flow response, the force and piston velocity are at a point Y1.

A second approach includes determining the shear force utilizing the piston velocity and stored data for piston velocity versus shear force for the STF. For example, the computing entity 20-1 compares the velocity and position to stored data for instantaneous velocity and position versus shear force for the STF 42.

A third approach includes determining the shear force utilizing the piston position and stored data for piston position and a piston bypass versus shear force for the STF within the chamber. For example, the computing entity 20-1 compares the velocity and position to stored data for instantaneous velocity and position versus shear force for the STF 42 based on an actual valve opening status of the first piston bypass 38-1 (e.g., which allows flow of the STF from the back channel 24 to the front channel 26 when the piston is moving in the inward direction of the example).

A third step of the example of operation includes the computing entity 20-1 interpreting an output of the environment sensor to identify an internal factor 151 of concern associated with the internal environment. The internal factor 151 of concern is associated with one or more of internal air quality, an internal smoke level, date, time of day, a building activity schedule, internal humidity, internal air pressure, internal temperature, fire alarm status, intrusion alarm status, building lockdown status, a building occupancy level, a maximum building occupancy threshold level, building power status, a solar array status, a heating-ventilation-and-cooling (HVAC) status, and/or any other factor of concern. For example, the computing entity 20-1 interprets environment sensor information 150 to identify smoke in a storage room. As another example, the computing entity 20-1 interprets the environment sensor information 150 to identify a scheduled lunch time building activity (e.g., where more than average number of people are moving about within the building).

FIG. 6B further illustrates the example of operation, where having detected the internal factor of concern, in a fourth step the computing entity 20-1 determines the fluid activation 187 for the head unit based on the internal factor of concern and one or more of the piston velocity, the piston position, and the shear force 186. For example, the computing entity 20-1 establishes the fluid activation 187 to facilitate closing of an internal door associated with the storage room more quickly when the internal factor is the smoke detected in the storage room and the object 12-1 includes the internal door to the storage room. As another example, the computing entity 20-1 establishes the fluid activation 187 to facilitate closing of the external door slower than average, and safely, when the scheduled lunch time building activity is detected as the internal factor of concern.

In particular, the computing entity 20-1 determines the fluid activation 187 to adjust the viscosity of the STF to facilitate movement of the piston and hence door in a more desirable fashion based on the identified internal factor of concern. The determining the fluid activation 187 includes a variety of approaches. A first approach includes opening of either of the piston bypass 38-1 and piston bypass 38-2 allow the STF to move between the back channel 24 and the front channel 26 to lower the shear rate and thus select a lower viscosity which in turn allows more rapid movement of the piston in the chamber and hence speeds up the door. A second approach includes opening of the chamber bypass 40 to lower the viscosity the STF. A third approach includes activating the set of emitters to directly alter the viscosity of the STF in a desired fashion (e.g., lowering viscosity to speed up opening or closing of the door, raising viscosity to slow down the opening or the closing of the door).

A fifth step of the example method of operation includes the computing entity 20-1 activating the set of fluid manipulation emitters 114-1-1 and 114-1-2 in accordance with the fluid activation 187 to manipulate one of the first shear threshold effect associated with the first piston bypass 38-1 and the second shear threshold effect associated with the second piston bypass 38-2 to control the motion of the object 12-1 to abate the effect on the internal environment from the internal factor of concern. For example, when the object 12-1 includes the internal door to the storage room and is closing when moving in the inward direction, the computing entity 20-1 outputs the fluid activation 234-1-1 to the piston bypass 38-1 to facilitate further opening of a one-way check valve to allow more of the STF to move from the back channel 24 to the front channel 26 thusly selecting the first range of shear rates and a lower viscosity of the STF to speed up the door to close when the internal factor of concern is the detected smoke in the storage room.

As another example, when the object 12-1 includes the external door closing (e.g., piston moving in the inward direction) in a high-traffic lunchtime situation, the computing entity 20-1 outputs the fluid activation 234-1-1 to the piston bypass 38-1 to facilitate closing down the one-way check valve to prevent STF from moving from the back channel 24 to the front channel 26 thusly selecting the second range of shear rates and a higher viscosity the STF to slow down the door to close safely moving from the point Y1 to the point Y2 (e.g., at a dead stop when closed and no one is coming through the door) as illustrated in FIG. 6B.

In yet another embodiment, the computing entity 20-1 detects both an external factor of concern and the internal factor of concern to produce the fluid activation 187. For example, even when the external temperature is very low, the computing entity 20-1 controls the head unit system to close the door slowly when a higher than normal traffic pattern of people going through that door is detected.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

Figure 7A:
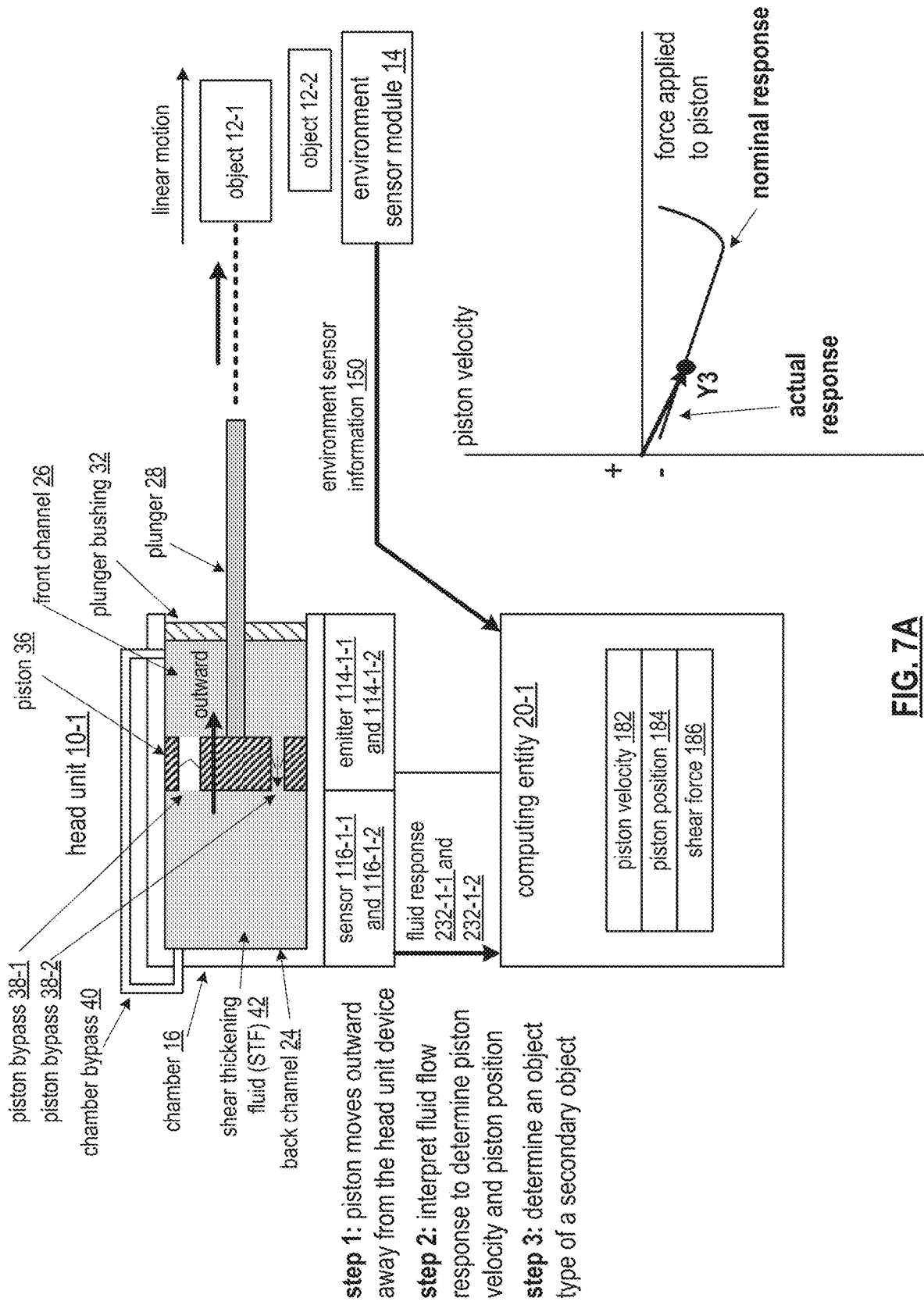
FIGS. 7A-7B are schematic block diagrams of another embodiment of a mechanical and computing system illustrating an example of controlling operational aspects in accordance with the present invention.
Figure 7B:
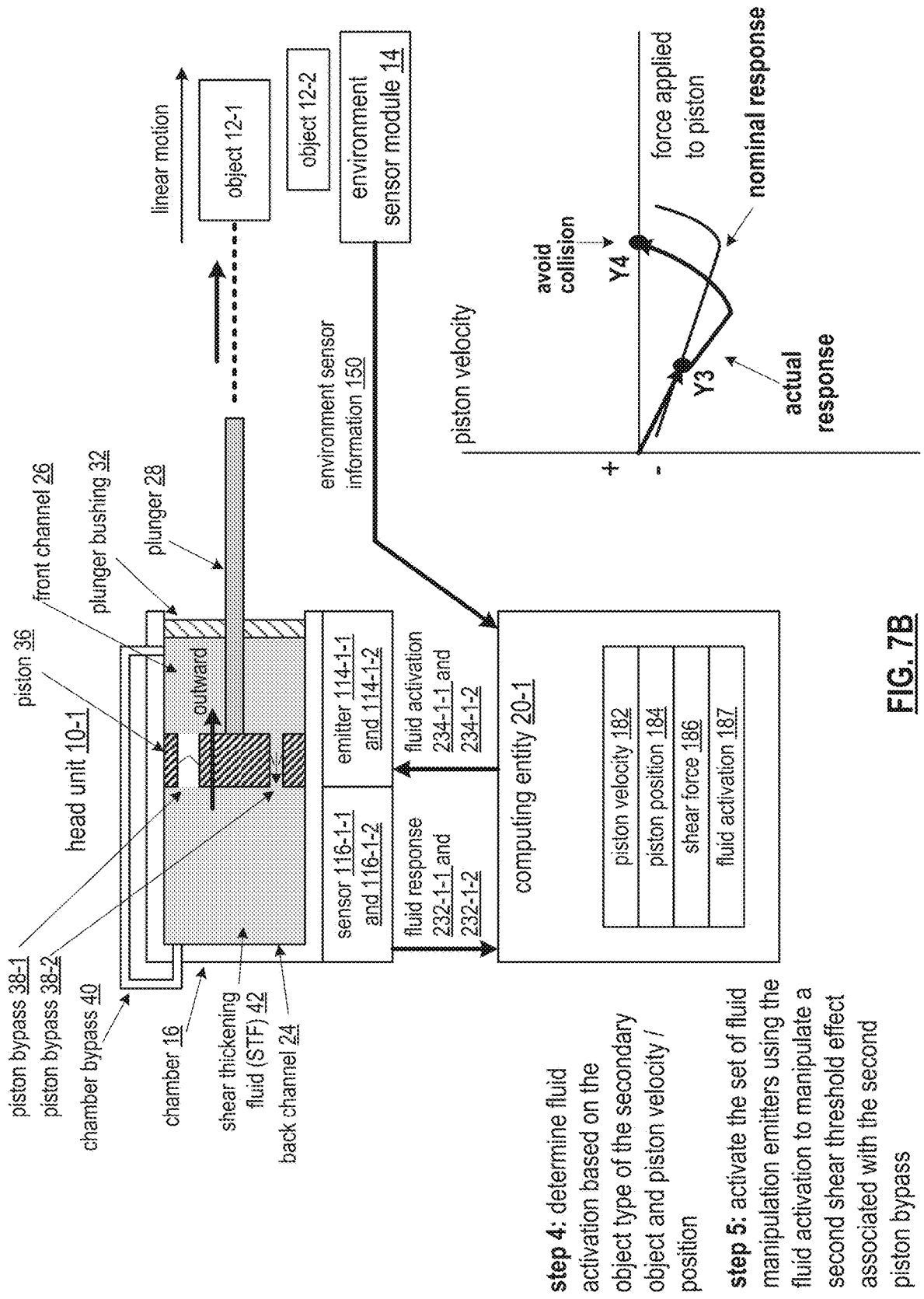

FIGS. 7A-7B are schematic block diagrams of another embodiment of a mechanical and computing system illustrating an example of controlling operational aspects. The mechanical and computing system includes the head unit 10-1 of FIG. 1, the object 12-1 of FIG. 1 (e.g., a door), a secondary object 12-2 (e.g., a person), and the computing entity 20-1 of FIG. 1.

The head unit system includes a secondary object sensor (e.g., environment sensor module 14 of FIG. 2B). The secondary object is associated with the object (e.g., the person goes through the door).

The head unit 10-1 includes a shear thickening fluid (STF) 42. The STF is configured to have a decreasing viscosity in response to a first range of shear rates and an increasing viscosity in response to a second range of shear rates as discussed with reference to FIG. 1B. The second range of shear rates are greater than the first range of shear rates.

The head unit further includes a chamber 16. The chamber is configured to contain a portion of the STF and includes a front channel 26 and a back channel 24.

The head unit further includes a piston 36 housed at least partially radially within the chamber 16 and separating the back channel 24 and the front channel 26. The piston configured to exert pressure against the shear thickening fluid in response to movement of the piston from a force applied to the piston from the object 12-1. The movement of the piston includes one of traveling through the chamber in an inward direction or traveling through the chamber in an outward direction. The piston travels toward the back channel and away from the front channel when traveling in the inward direction. The piston travels toward the front channel and away from the back channel when traveling in the outward direction.

The piston 36 includes a first piston bypass 38-1 between opposite sides of the piston that controls flow of the STF 42 between the opposite sides of the piston from the back channel to the front channel when the piston is traveling through the chamber in the inward direction to cause the STF to react with a first shear threshold effect.

The piston 36 further includes a second piston bypass 38-2 between the opposite sides of the piston that controls flow of the STF between the opposite sides of the piston from the front channel to the back channel when the piston is traveling through the chamber in the outward direction to cause the STF to react with a second shear threshold effect.

The head unit 10-1 further includes a set of fluid flow sensors 116-1-1 and 116-1-2 positioned proximal to the chamber 16. The set of fluid flow sensors provide the fluid response 232-1-1 and 232-1-2 respectively from the STF 42.

The head unit 10-1 further includes set of fluid manipulation emitters 114-1-1 and 114-1-2 positioned proximal to the chamber 16. The set of fluid manipulation emitters provide a fluid activation to at least one of the STF 42 (e.g., shifting the shear rate versus viscosity curve), the first piston bypass 38-1 (e.g., to block or allow flow of the STF), and the second piston bypass 38-2 to control the motion of the object 12-1 with regards to the secondary object (e.g., avoiding a collision between the door and the person).

FIG. 7A illustrates an example of operation of a method for the controlling the operational aspects. A first step of the example of operation includes the piston 36 moving outward away from the head unit 10-1 when the object 12-1 exerts a pulling force on the plunger 28 that transfers the force to the piston 36. As a result, the piston 36 exerts the force on the STF 42 within the front channel 26.

A second step of the example of operation includes the computing entity 20-1 interpreting a fluid response from the set of fluid flow sensors to produce a piston velocity 182 and a piston position 184 of the piston 36 associated with a head unit device of a head unit system. The set of fluid flow sensors are positioned proximal to the head unit device for controlling motion of the object 12-1 within the internal environment. For example, the computing entity 20-1 interprets fluid responses 232-1-1 and 232-1-2 from the STF 42 in response to varying responsiveness of particles of the STF to produce the piston velocity and the piston position.

The interpreting the fluid response from the set of fluid flow sensors to produce the piston velocity and the piston position of the piston includes a series of sub-steps. A first sub-step includes inputting, from one or more fluid flow sensors of the set of fluid flow sensors, a set of fluid flow signals over a time range. For example, the computing entity 20-1 receives fluid responses 232-1-1 and 232-1-2 over the time range, where the fluid responses include the fluid flow signals.

A second sub-step includes determining the fluid flow response of the set of fluid flow sensors based on the set of fluid flow signals. For example, the computing entity 20-1 interprets the fluid flow signals to produce the fluid response.

A third sub-step includes determining the piston velocity based on the fluid response of the set of fluid flow sensors over the time range. For example, the computing entity 20-1 calculates piston velocity based on changes in the fluid response over the time range.

A fourth sub-step includes determining the piston position based on the piston velocity and a real-time reference. For example, the computing entity 20-1 calculates the piston position based on time in the piston velocity as the piston moves through the chamber.

As yet another example of interpreting the fluid response 232-1-1 and 232-1-2, the computing entity 20-1 compares the fluid response 232-1-1 and 232-1-2 to previous measurements of fluid flow versus piston velocity and piston position to produce the piston velocity 182 and piston position 184. As a still further example of the interpreting the fluid response 232-1-1 and 232-1-2, the computing entity 20-1 extracts the piston velocity 182 and the piston position 184 directly from the fluid response 232-1-1 and/or 232-1-2 when the sensors 116-1-1 and 116-1-2 generate the piston velocity and piston position directly.

The second step of the example of operation further includes the computing entity 20-1 determining a shear force 186 based on the piston velocity 182 and the piston position 184. The determining the shear force based on the piston velocity and the piston position includes one approach of a variety of approaches. A first approach includes extracting the shear force directly from the fluid response when one or more fluid flow sensors of the set of fluid flow sensors outputs a shear force encoded signal. For example, the computing entity 20-1 extracts the shear force 186 directly from the fluid responses 232-1-1 and 232-1-2. In an instance, the shear force 186 reveals the piston velocity versus force applied to the piston curve as illustrated in FIG. 7A, where at a current time of interpreting the fluid flow response, the force and piston velocity are at a point Y3 (e.g., a negative velocity since moving in the outward direction).

A second approach includes determining the shear force utilizing the piston velocity and stored data for piston velocity versus shear force for the STF. For example, the computing entity 20-1 compares the velocity and position to stored data for instantaneous velocity and position versus shear force for the STF 42.

A third approach includes determining the shear force utilizing the piston position and stored data for piston position and a piston bypass versus shear force for the STF within the chamber. For example, the computing entity 20-1 compares the velocity and position to stored data for instantaneous velocity and position versus shear force for the STF 42 based on an actual valve opening status of the first piston bypass 38-1 (e.g., which allows flow of the STF from the front channel 26 to the back channel 24 when the piston is moving in the outward direction of the example).

A third step of the example of operation includes the computing entity 20-1 interpreting an output of the secondary object sensor to produce an object type of the secondary object. The object type includes a person, a child, an elderly person, a group of people, a patient transport gurney, a cart, a short cart, a long cart, a cart train, a motor scooter, a vehicle, a jack truck, a pallet hauler, a 2 wheel hauler, a set of animals, and/or type of anything that can move through a door. The interpreting includes interpreting environment sensor information 150 from the secondary object sensor (e.g., from the environment sensor module 14), comparing the environment sensor information 150 to previously stored information for each of the object types, and selecting the object type when a match is detected. For example, the computing entity 20-1 compares an image of the environment sensor information 152 a stored image of a cart and identifies the secondary object as the cart when matching the image of the environment sensor information 150 to the stored image.

FIG. 7B further illustrates the example of operation, where having determined the object type, in a fourth step the computing entity 20-1 determines the fluid activation 187 for the head unit based on the object type and one or more of the piston velocity, the piston position, and the shear force 186. For example, the computing entity 20-1 establishes the fluid activation 187 to facilitate closing of an external door more quickly, yet safely, when the object type is a short cart. As another example, the computing entity 20-1 establishes the fluid activation 187 to facilitate closing of the external door more slowly when the object type is an elderly person.

In particular, the computing entity 20-1 determines the fluid activation 187 to adjust the viscosity of the STF to facilitate movement of the piston and hence door in a more desirable fashion based on the identified object type. The determining the fluid activation 187 includes a variety of approaches. A first approach includes opening of either of the piston bypass 38-1 and piston bypass 38-2 allow the STF to move between the back channel 24 and the front channel 26 to lower the shear rate and thus select a lower viscosity which in turn allows more rapid movement of the piston in the chamber and hence speeds up the door. A second approach includes opening of the chamber bypass 40 to lower the viscosity the STF. A third approach includes activating the set of emitters to directly alter the viscosity of the STF in a desired fashion (e.g., lowering viscosity to speed up opening or closing of the door, raising viscosity to slow down the opening or the closing of the door).

A fifth step of the example method of operation includes the computing entity 20-1 activating the set of fluid manipulation emitters 114-1-1 and 114-1-2 in accordance with the fluid activation 187 to manipulate one of the first shear threshold effect associated with the first piston bypass 38-1 and the second shear threshold effect associated with the second piston bypass 38-2 to control the motion of the object 12-1 to control the motion of the object with regards to the secondary object. For example, when the object 12-1 includes an operating room door and is opening when moving in the outward direction, the computing entity 20-1 outputs the fluid activation 234-1-1 to the piston bypass 38-2 to facilitate further opening of a one-way check valve to allow more of the STF to move from the front channel 26 to the back channel 24 thusly selecting the first range of shear rates and a lower viscosity of the STF to speed up the door to open when the detected secondary object is a patient transport gurney entering the operating room.

As another example, when the object 12-2 includes the group of people, the computing entity 20-1 outputs the fluid activation 234-1-1 to the piston bypass 38-1 to facilitate closing down the one-way check valve to prevent STF from moving from the back channel 24 to the front channel 26 thusly selecting the second range of shear rates and a higher viscosity the STF to slow down the door to close safely moving from the point Y3 to the point Y4 (e.g., when the piston is moving in the outward direction) as illustrated in FIG. 7B.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

Figure 8A:
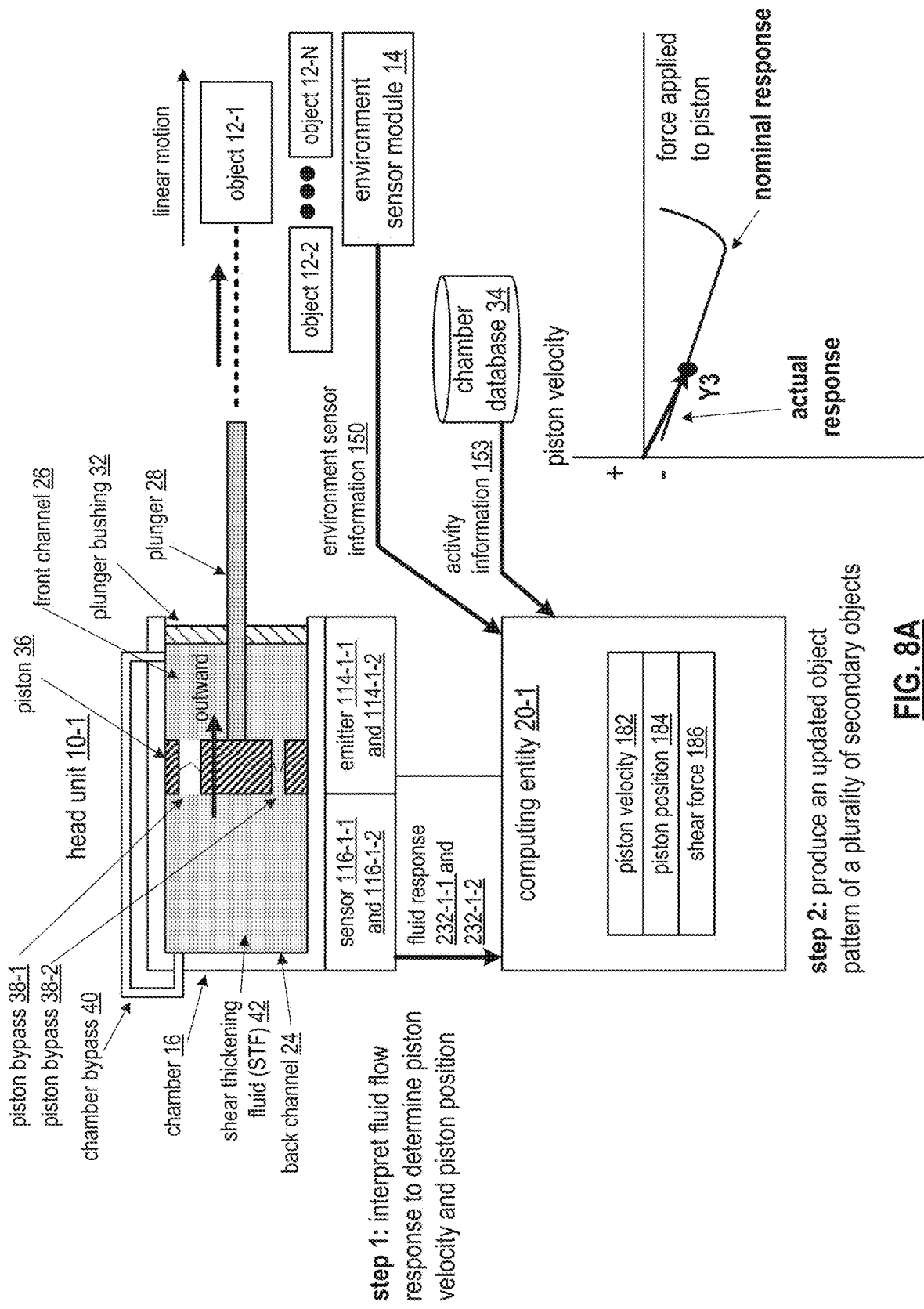
FIGS. 8A-8B are schematic block diagrams of another embodiment of a mechanical and computing system illustrating an example of controlling operational aspects in accordance with the present invention.
Figure 8B:
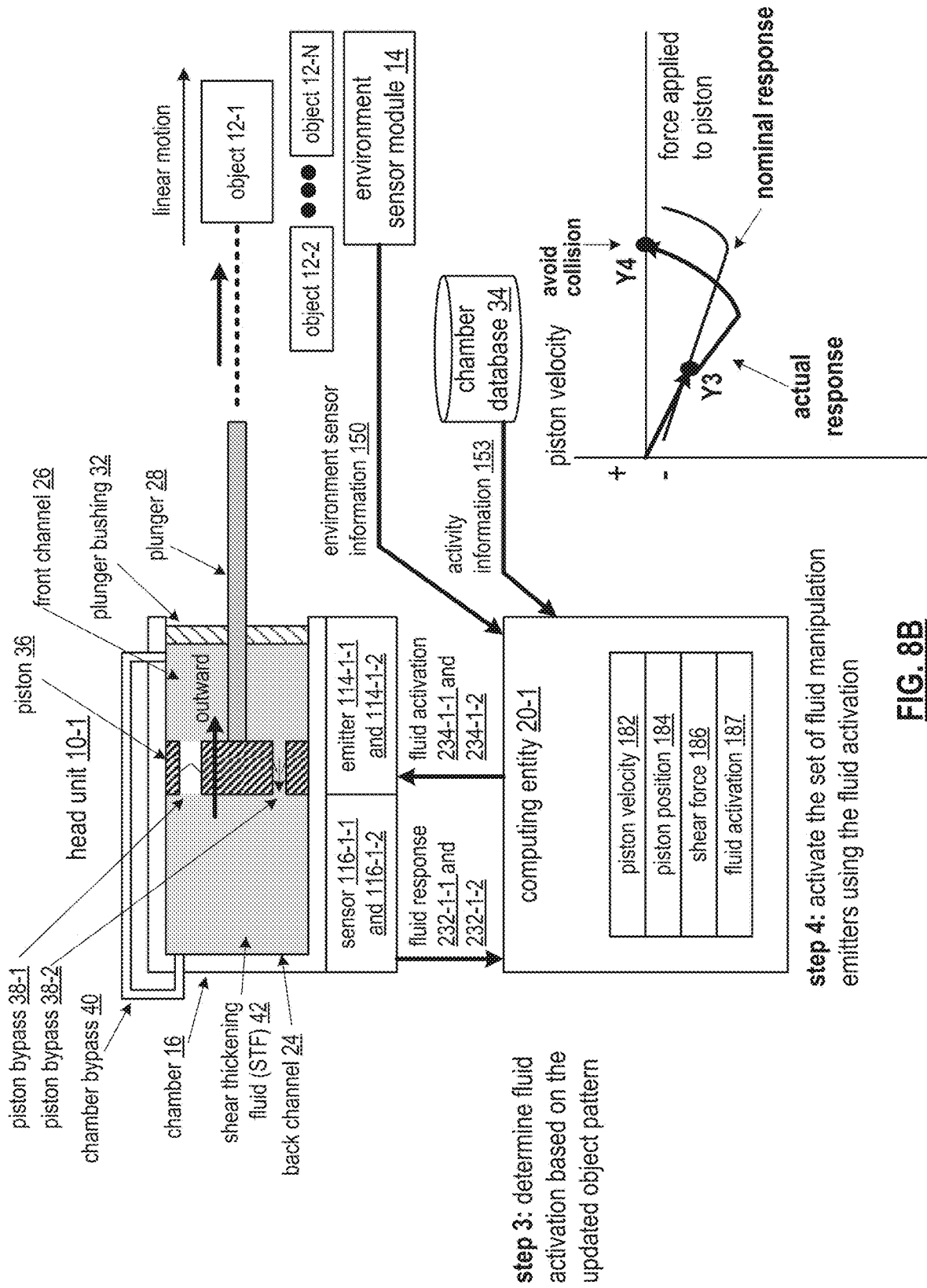

FIGS. 8A-8B are schematic block diagrams of another embodiment of a mechanical and computing system illustrating an example of controlling operational aspects. The mechanical and computing system provides a head unit system that includes the head unit 10-1 of FIG. 1, the object 12-1 of FIG. 1 (e.g., a door), a plurality of secondary objects 12-2 through 12-N, a secondary object sensor (e.g., the environment sensor module 14 of FIG. 2B to detect the secondary objects), and the computing entity 20-1 of FIG. 1. The secondary object sensor is associated with the object 12-1 and the secondary objects are associated with the object.

The head unit system includes the secondary object sensor. The plurality of secondary objects is associated with the object (e.g., a group of people go through the door).

The head unit 10-1 includes a shear thickening fluid (STF) 42. The STF is configured to have a decreasing viscosity in response to a first range of shear rates and an increasing viscosity in response to a second range of shear rates as discussed with reference to FIG. 1B. The second range of shear rates are greater than the first range of shear rates.

The head unit further includes a chamber 16. The chamber is configured to contain a portion of the STF and includes a front channel 26 and a back channel 24.

The head unit further includes a piston 36 housed at least partially radially within the chamber 16 and separating the back channel 24 and the front channel 26. The piston configured to exert pressure against the shear thickening fluid in response to movement of the piston from a force applied to the piston from the object 12-1. The movement of the piston includes one of traveling through the chamber in an inward direction or traveling through the chamber in an outward direction. The piston travels toward the back channel and away from the front channel when traveling in the inward direction. The piston travels toward the front channel and away from the back channel when traveling in the outward direction.

The piston 36 includes a first piston bypass 38-1 between opposite sides of the piston that controls flow of the STF 42 between the opposite sides of the piston from the back channel to the front channel when the piston is traveling through the chamber in the inward direction to cause the STF to react with a first shear threshold effect.

The piston 36 further includes a second piston bypass 38-2 between the opposite sides of the piston that controls flow of the STF between the opposite sides of the piston from the front channel to the back channel when the piston is traveling through the chamber in the outward direction to cause the STF to react with a second shear threshold effect.

The head unit 10-1 further includes a set of fluid flow sensors 116-1-1 and 116-1-2 positioned proximal to the chamber 16. The set of fluid flow sensors provide the fluid response 232-1-1 and 232-1-2 respectively from the STF 42.

The head unit 10-1 further includes set of fluid manipulation emitters 114-1-1 and 114-1-2 positioned proximal to the chamber 16. The set of fluid manipulation emitters provide a fluid activation to at least one of the STF 42 (e.g., shifting the shear rate versus viscosity curve), the first piston bypass 38-1 (e.g., to block or allow flow of the STF), and the second piston bypass 38-2 to control the motion of the object 12-1 with regards to the set of secondary objects (e.g., avoiding a collision between the door and the group people).

FIG. 8A illustrates an example of operation of a method for the controlling the operational aspects. In the example of operation, the piston 36 moves outward away from the head unit 10-1 when the object 12-1 exerts a pulling force on the plunger 28 that transfers the force to the piston 36. As a result, the piston 36 exerts the force on the STF 42 within the front channel 26.

A first step of the example of operation includes the computing entity 20-1 interpreting a fluid response from the set of fluid flow sensors to produce a piston velocity 182 and a piston position 184 of the piston 36 associated with a head unit device of a head unit system. The set of fluid flow sensors are positioned proximal to the head unit device for controlling motion of the object 12-1. For example, the computing entity 20-1 interprets fluid responses 232-1-1 and 232-1-2 from the STF 42 in response to varying responsiveness of particles of the STF to produce the piston velocity and the piston position.

The interpreting the fluid response from the set of fluid flow sensors to produce the piston velocity and the piston position of the piston includes a series of sub-steps. A first sub-step includes inputting, from one or more fluid flow sensors of the set of fluid flow sensors, a set of fluid flow signals over a time range. For example, the computing entity 20-1 receives fluid responses 232-1-1 and 232-1-2 over the time range, where the fluid responses include the fluid flow signals.

A second sub-step includes determining the fluid flow response of the set of fluid flow sensors based on the set of fluid flow signals. For example, the computing entity 20-1 interprets the fluid flow signals to produce the fluid response.

A third sub-step includes determining the piston velocity based on the fluid response of the set of fluid flow sensors over the time range. For example, the computing entity 20-1 calculates piston velocity based on changes in the fluid response over the time range.

A fourth sub-step includes determining the piston position based on the piston velocity and a real-time reference. For example, the computing entity 20-1 calculates the piston position based on time in the piston velocity as the piston moves through the chamber.

As yet another example of interpreting the fluid response 232-1-1 and 232-1-2, the computing entity 20-1 compares the fluid response 232-1-1 and 232-1-2 to previous measurements of fluid flow versus piston velocity and piston position to produce the piston velocity 182 and piston position 184. As a still further example of the interpreting the fluid response 232-1-1 and 232-1-2, the computing entity 20-1 extracts the piston velocity 182 and the piston position 184 directly from the fluid response 232-1-1 and/or 232-1-2 when the sensors 116-1-1 and 116-1-2 generate the piston velocity and piston position directly.

The first step of the example of operation further includes the computing entity 20-1 determining a shear force 186 based on the piston velocity 182 and the piston position 184. The determining the shear force based on the piston velocity and the piston position includes one approach of a variety of approaches. A first approach includes extracting the shear force directly from the fluid response when one or more fluid flow sensors of the set of fluid flow sensors outputs a shear force encoded signal. For example, the computing entity 20-1 extracts the shear force 186 directly from the fluid responses 232-1-1 and 232-1-2. In an instance, the shear force 186 reveals the piston velocity versus force applied to the piston curve as illustrated in FIG. 8A, where at a current time of interpreting the fluid flow response, the force and piston velocity are at a point Y3 (e.g., a negative velocity since moving in the outward direction).

A second approach includes determining the shear force utilizing the piston velocity and stored data for piston velocity versus shear force for the STF. For example, the computing entity 20-1 compares the velocity and position to stored data for instantaneous velocity and position versus shear force for the STF 42.

A third approach includes determining the shear force utilizing the piston position and stored data for piston position and a piston bypass versus shear force for the STF within the chamber. For example, the computing entity 20-1 compares the velocity and position to stored data for instantaneous velocity and position versus shear force for the STF 42 based on an actual valve opening status of the second piston bypass 38-2 (e.g., which allows flow of the STF from the front channel 26 to the back channel 24 when the piston is moving in the outward direction of the example).

A second step of the example of operation includes the computing entity 20-1 interpreting an output of the secondary object sensor to update an object pattern of the plurality of secondary objects. The object pattern includes the object type as previously discussed and activity parameters associated with objects of the object type. The activity parameters includes a person walking, a person running, a group of people walking, a group of people running, a set of secondary objects moving towards the object, the set of second area objects moving away from the object, and/or any other possible activity type associated with one or more of the secondary objects.

The interpreting the output of the secondary object sensor to update the object pattern of the plurality of secondary objects to produce the updated object pattern of the plurality of secondary objects includes a series of sub-steps. A first sub-step includes the computing entity 20-1 obtaining environment sensor information 150 from the secondary object sensor (e.g., environment sensor module 14) for a subset of secondary objects of the plurality of secondary objects (e.g., 12-2 through 12-N).

A second sub-step includes the computing entity 20-1 identifying activity parameters from the environment sensor information for the subset of secondary objects. For example, the computing entity 20-1 compares a video clip of the environment sensor information 150 to a stored video clip of a group of people walking towards a door and identifies the object pattern as a group of people walking when matching the video clip of the environment sensor information 150 to the stored video clip of the person walking. As another example, the computing entity 20-1 further determines walking velocities for the group of people from the video clip from the video clip.

A third sub-step includes the computing entity 20-1 obtaining the object pattern of the plurality of secondary objects. For example, the computing entity 20-1 recovers the object pattern from a local memory of the computing entity 20-1. As another example, the computing entity 20-1 extracts the object pattern from activity information 153 recovered from the chamber database 34.

A fourth sub-step includes the computing entity 20-1 modifying the object pattern of the plurality of secondary objects based on the activity parameters for the subset of secondary objects to produce the updated object pattern of the plurality of secondary objects. For example, the computing entity 20-1 modifies the walking velocities for the group of people based on the recently extracted walking velocities for the group of people.

FIG. 8B further illustrates the example of operation, where having determined the updated object pattern for the plurality of secondary objects, a third step includes the computing entity 20-1 determining fluid activation 187 for the head unit based on the updated object pattern of the plurality of secondary objects and one or more of activity information 153, the piston velocity 182, the piston position 184, and the shear force 186. The activity information 153 includes historical records and schedules for future activities associated with the set of secondary objects. For example, the activity information 153 includes a work schedule, a class schedule, timeclock punching information indicating which employees are present at an area of employment, invoicing information associated with product flow, manufacturing process information, inventory control information, and/or any other information that assists in identifying the object pattern for the set of secondary objects.

The determining the fluid activation for the head unit device based on the updated object pattern of the plurality of secondary objects and one or more of the piston velocity and the piston position includes one or more sub-steps. A first sub-step includes the computing entity 20-1 interpreting a request associated with modifying one or more of object velocity and object position. For example, the computing entity 20-1 receives the request from another computing entity. A second sub-step includes the computing entity interpreting fluid activation guidance from the chamber database 34 based on the updated object pattern of the plurality of secondary objects. For example, the computing entity 20-1 accesses the chamber database 34 based on the updated object pattern to locate the fluid activation guidance.

A third sub step includes the computing entity 20-1 interpreting activity information 153 from the chamber database 34 based on the updated object pattern of the plurality of secondary objects to produce an object movement recommendation. A correlation between the activity information and the updated object pattern of the plurality of secondary objects suggests an expected movement behavior of the secondary object. For example, analysis of one hundred plus instances of groups of people walking through doors is summarized in the chamber database as the activity information 153 such that one more instance of the group of people walking through a particular door is expected to be similar.

A fourth sub-step includes the computing entity 20-1 determining a position for the secondary object based the updated object pattern of the plurality of secondary objects. For example, the computing entity 20-1 estimates a next position for a person walking through the door based on the pattern of the groups of people walking through the doors.

A fifth sub-step includes the computing entity 20-1 determining an object position for the object based on the piston velocity and the piston position. For example, the computing entity 20-1 estimates the object position for the object (e.g., a door with regards to the secondary object, a person) based on historical data of piston velocity and piston position verses position of the object (e.g., the door).

A sixth sub-step includes the computing entity 20-1 establishing the fluid activation to include facilitating the first range of shear rates when the object movement recommendation includes increasing velocity of the object. For example, when the piston is traveling in the outward direction to open the door, the first range of shear rates is selected when the object movement recommendation includes opening the door more quickly to avoid a collision between the person and the door.

A seventh sub-step includes the computing entity 20-1 establishing the fluid activation to include facilitating the second range of shear rates when the object movement recommendation includes decreasing the velocity of the object. For example, when the piston is traveling in the outward direction to close the door, the second range of shear rates is selected when the object movement recommendation includes closing the door more slowly to avoid the collision between the person and the door. As another example of the determining of the fluid activation 187, the computing entity 20-1 establishes the fluid activation 187 to facilitate opening of a large door more quickly, yet safely, when the object pattern is the group of people approaching the door and the activity information 153 indicates that a current time frame is a lunch. When large groups of people are expected to be moving through the door. As a still further example, the computing entity 20-1 establishes the fluid activation 187 to facilitate closing of the large door more slowly when the object pattern is the group of people passing through the door.

In particular, the computing entity 20-1 determines the fluid activation 187 to produce a mechanism to adjust the viscosity of the STF to facilitate movement of the piston and hence door in a more desirable fashion based on the identified object type. The mechanism to adjust the viscosity includes a variety of approaches. A first approach includes opening of either of the piston bypass 38-1 and piston bypass 38-2 allow the STF to move between the back channel 24 and the front channel 26 to lower the shear rate and thus select a lower viscosity which in turn allows more rapid movement of the piston in the chamber and hence speeds up the door. A second approach includes opening of the chamber bypass 40 to lower the viscosity the STF. A third approach includes activating the set of emitters to directly alter the viscosity of the STF in a desired fashion (e.g., lowering viscosity to speed up opening or closing of the door, raising viscosity to slow down the opening or the closing of the door).

The determining the fluid activation further includes interpreting the output of the secondary object sensor to further update the object pattern of the plurality of secondary objects to produce a further updated object pattern of the plurality of secondary objects. For example, the computing entity 20-1 further analyzes environment sensor information 150 from the environment sensor module 14 to update the object pattern. Having produced the further updated object pattern, the computing entity 20-1 updates the fluid activation for the head unit device based on the further updated object pattern of the plurality of secondary objects and one or more of the piston velocity and the piston position as previously discussed.

A fourth step of the example method of operation includes the computing entity 20-1 activating the set of fluid manipulation emitters 114-1-1 and 114-1-2 in accordance with the fluid activation 187 to manipulate one of the first shear threshold effect associated with the first piston bypass 38-1 and the second shear threshold effect associated with the second piston bypass 38-2 to control the motion of the object 12-1 to control the motion of the object with regards to the secondary object. For example, when the object 12-1 includes a large lunchroom door and is opening when moving in the outward direction, the computing entity 20-1 outputs the fluid activation 234-1-1 to the piston bypass 38-2 to facilitate further opening of a one-way check valve to allow more of the STF to move from the front channel 26 to the back channel 24 thusly selecting the first range of shear rates and a lower viscosity of the STF to speed up the door to open when the detected set of secondary objects is a group of people passing through the lunch room door during the lunch period.

As another example, when the set of secondary objects 12-2 through 12-N includes the group of people, the computing entity 20-1 outputs the fluid activation 234-1-1 to the piston bypass 38-2 to facilitate closing down the one-way check valve to prevent STF from moving from the front channel 26 to the back channel 24 thusly selecting the second range of shear rates and a higher viscosity the STF to slow down the door to close safely moving from the point Y3 to the point Y4 (e.g., when the piston is moving in the outward direction) as illustrated in FIG. 8B.

The activating the set of fluid manipulation emitters in accordance with the fluid activation to control the motion of the object includes a variety of approaches. When the piston is traveling through the chamber in the inward direction and when the STF is to have the decreasing viscosity, a first sub-approach includes the computing entity 20-1 issuing the fluid activation 234-1-1 to the set of fluid manipulation emitters 114-1-1 to cause one of the first piston bypass 38-1 to facilitate the first shear threshold effect to include the first range of shear rates, and the direct manipulation of the STF 42 to facilitate the first range of shear rates (e.g., lowering viscosity to speed up opening or closing of the door, raising viscosity to slow down the opening or the closing of the door).

When the piston is traveling through the chamber in the inward direction and when the STF is to have the increasing viscosity, a second sub-approach includes the computing entity 20-1 issuing the fluid activation 234-1-2 to the set of fluid manipulation emitters 114-1-2 to cause one of the first piston bypass 38-1 to facilitate the first shear threshold effect to include the second range of shear rates, and the direct manipulation of the STF 42 to facilitate the second range of shear rates.

When the piston is traveling through the chamber in the outward direction and when the STF is to have the decreasing viscosity a third sub-approach includes the computing entity 20-1 issuing the fluid activation 234-1-1 to the set of fluid manipulation emitters 114-1-1 to cause one of the second piston bypass 38-2 to facilitate the second shear threshold effect to include the first range of shear rates, and the direct manipulation of the STF 42 to facilitate the first range of shear rates.

When the piston is traveling through the chamber in the outward direction and when the STF is to have the increasing viscosity a fourth sub-approach includes the computing entity 20-1 issuing the fluid activation 234-1-2 to the set of fluid manipulation emitters 114-1-2 to cause one of the second piston bypass 38-2 to facilitate the second shear threshold effect to include the second range of shear rates, and the direct manipulation of the STF 42 to facilitate the second range of shear rates.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

Figure 9A:
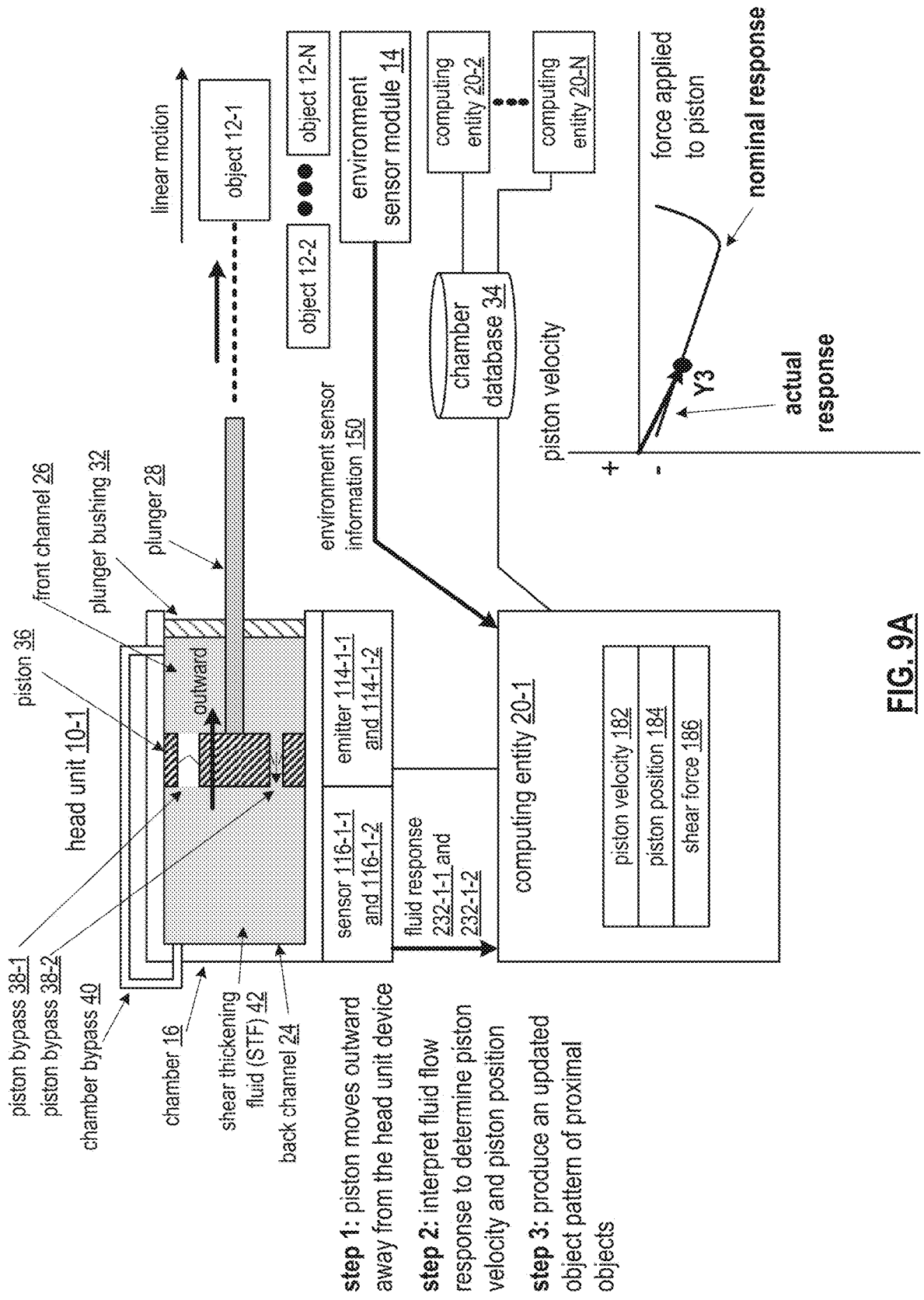
FIGS. 9A-9B are schematic block diagrams of another embodiment of a mechanical and computing system illustrating an example of controlling operational aspects in accordance with the present invention.
Figure 9B:
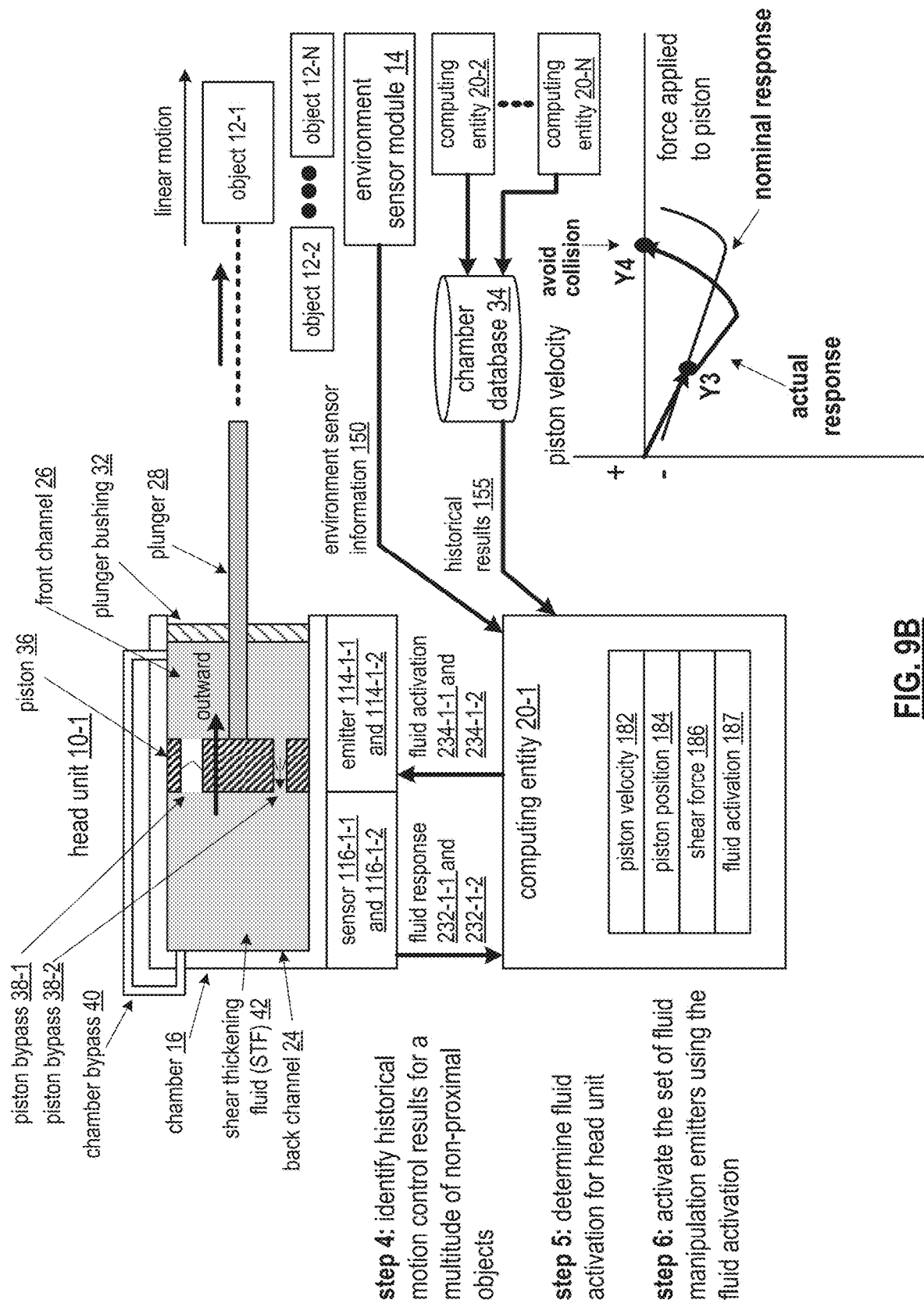

FIGS. 9A-9B are schematic block diagrams of another embodiment of a mechanical and computing system illustrating an example of controlling operational aspects. The mechanical and computing system provides a head unit system that includes the head unit 10-1 of FIG. 1, the object 12-1 of FIG. 1 (e.g., a first door, interchangeable referred to as a first object), a set of objects 12-2 through 12-N (e.g., people proximal to the first door of a first building passing through the first door), a secondary object sensor (e.g., the environment sensor module 14 of FIG. 2B to detect the people), the chamber database 34 FIG. 1, and the computing entities 20-1 through 20-N (e.g., associated with multiple other non-proximal areas of a large building, associated with a multitude of non-proximal buildings of a large geographic area such as worldwide).

The head unit 10-1 (e.g., interchangeably referred to as the head unit device) is configured to control motion of the first object (e.g., object 12-1) with regards to a second object of a plurality of proximal objects (e.g., the objects 12-2 through 12-N). The plurality of proximal objects are line-of-sight spatially associated with the first object from time to time. For example, a group of people or other objects that are in an immediate vicinity of the first door.

The head unit system includes the secondary object sensor for sensing the plurality of proximal objects. The head unit 10-1 includes a shear thickening fluid (STF) 42. The STF is configured to have a decreasing viscosity in response to a first range of shear rates and an increasing viscosity in response to a second range of shear rates as discussed with reference to FIG. 1B. The second range of shear rates are greater than the first range of shear rates.

The head unit further includes a chamber 16. The chamber is configured to contain a portion of the STF and includes a front channel 26 and a back channel 24.

The head unit further includes a piston 36 housed at least partially radially within the chamber 16 and separating the back channel 24 and the front channel 26. The piston configured to exert pressure against the shear thickening fluid in response to movement of the piston from a force applied to the piston from the object 12-1. The movement of the piston includes one of traveling through the chamber in an inward direction or traveling through the chamber in an outward direction. The piston travels toward the back channel and away from the front channel when traveling in the inward direction. The piston travels toward the front channel and away from the back channel when traveling in the outward direction.

The piston 36 includes a first piston bypass 38-1 between opposite sides of the piston that controls flow of the STF 42 between the opposite sides of the piston from the back channel to the front channel when the piston is traveling through the chamber in the inward direction to cause the STF to react with a first shear threshold effect.

The piston 36 further includes a second piston bypass 38-2 between the opposite sides of the piston that controls flow of the STF between the opposite sides of the piston from the front channel to the back channel when the piston is traveling through the chamber in the outward direction to cause the STF to react with a second shear threshold effect.

The head unit 10-1 further includes a set of fluid flow sensors 116-1-1 and 116-1-2 positioned proximal to the chamber 16. The set of fluid flow sensors provide the fluid response 232-1-1 and 232-1-2 respectively from the STF 42.

The head unit 10-1 further includes set of fluid manipulation emitters 114-1-1 and 114-1-2 positioned proximal to the chamber 16. The set of fluid manipulation emitters provide a fluid activation to at least one of the STF 42 (e.g., shifting the shear rate versus viscosity curve), the first piston bypass 38-1 (e.g., to block or allow flow of the STF), and the second piston bypass 38-2 to control the motion of the object 12-1 with regards to the set of secondary objects (e.g., avoiding a collision between the door and the group people).

FIG. 9A illustrates an example of operation of a method for the controlling the operational aspects. A first step of the example of operation includes the piston 36 moving outward away from the head unit 10-1 when the object 12-1 exerts a pulling force on the plunger 28 that transfers the force to the piston 36. As a result, the piston 36 exerts the force on the STF 42 within the front channel 26.

A second step of the example of operation includes the computing entity 20-1 interpreting a fluid response from the set of fluid flow sensors to produce a piston velocity 182 and a piston position 184 of the piston 36 associated with the head unit device of the head unit system. The set of fluid flow sensors are positioned proximal to the head unit device for controlling motion of the object 12-1 with regards to the second object of the plurality of proximal objects (e.g., any one of objects 12-2 through 12-N). For example, the computing entity 20-1 interprets fluid responses 232-1-1 and 232-1-2 from the STF 42 in response to varying responsiveness of particles of the STF to produce the piston velocity and the piston position.

The interpreting the fluid response from the set of fluid flow sensors to produce the piston velocity and the piston position of the piston includes a series of sub-steps. A first sub-step includes inputting, from one or more fluid flow sensors of the set of fluid flow sensors, a set of fluid flow signals over a time range. For example, the computing entity 20-1 receives fluid responses 232-1-1 and 232-1-2 over the time range, where the fluid responses include the fluid flow signals.

A second sub-step includes determining the fluid response of the set of fluid flow sensors based on the set of fluid flow signals. For example, the computing entity 20-1 interprets the fluid flow signals to produce the fluid response.

A third sub-step includes determining the piston velocity based on the fluid response of the set of fluid flow sensors over the time range. For example, the computing entity 20-1 calculates piston velocity based on changes in the fluid response over the time range.

A fourth sub-step includes determining the piston position based on the piston velocity and a real-time reference. For example, the computing entity 20-1 calculates the piston position based on time in the piston velocity as the piston moves through the chamber.

As yet another example of interpreting the fluid response 232-1-1 and 232-1-2, the computing entity 20-1 compares the fluid response 232-1-1 and 232-1-2 to previous measurements of fluid flow versus piston velocity and piston position to produce the piston velocity 182 and piston position 184. As a still further example of the interpreting the fluid response 232-1-1 and 232-1-2, the computing entity 20-1 extracts the piston velocity 182 and the piston position 184 directly from the fluid response 232-1-1 and/or 232-1-2 when the sensors 116-1-1 and 116-1-2 generate the piston velocity and piston position directly.

The second step of the example of operation further includes the computing entity 20-1 determining a shear force 186 based on the piston velocity 182 and the piston position 184. The determining the shear force based on the piston velocity and the piston position includes one approach of a variety of approaches. A first approach includes extracting the shear force directly from the fluid response when one or more fluid flow sensors of the set of fluid flow sensors outputs a shear force encoded signal. For example, the computing entity 20-1 extracts the shear force 186 directly from the fluid responses 232-1-1 and 232-1-2. In an instance, the shear force 186 reveals the piston velocity versus force applied to the piston curve as illustrated in FIG. 9A, where at a current time of interpreting the fluid flow response, the force and piston velocity are at a point Y3 (e.g., a negative velocity since moving in the outward direction).

A second approach includes determining the shear force utilizing the piston velocity and stored data for piston velocity versus shear force for the STF. For example, the computing entity 20-1 compares the velocity and position to stored data for instantaneous velocity and position versus shear force for the STF 42.

A third approach includes determining the shear force utilizing the piston position and stored data for piston position and a piston bypass versus shear force for the STF within the chamber. For example, the computing entity 20-1 compares the velocity and position to stored data for instantaneous velocity and position versus shear force for the STF 42 based on an actual valve opening status of the second piston bypass 38-2 (e.g., which allows flow of the STF from the front channel 26 to the back channel 24 when the piston is moving in the outward direction of the example).

A third step of the example of operation includes the computing entity 20-1 interpreting an output of the secondary object sensor to produce an updated object pattern of the plurality of proximal objects. The object pattern includes the object type as previously discussed and activity parameters associated with objects of the object type. The activity parameters include a person walking, a person running, a group of people walking, a group of people running, a set of secondary objects moving towards the object, the set of second area objects moving away from the object, and/or any other possible activity type associated with one or more of the secondary objects.

The interpreting the output of the secondary object sensor to produce the updated object pattern of the plurality of proximal objects includes a series of sub-steps. A first sub-step includes obtaining environment sensor information from the secondary object sensor for a subset of the plurality of proximal objects. For example, the computing entity 20-1 receives environment sensor information 150 from the environment sensor module 14 with regards to the object 12-2.

A second sub-step includes identifying activity parameters from the environment sensor information for the subset of the plurality of proximal objects. For example, the computing entity 20-1 identifies the person walking when the object 12-2 is the person.

A third sub-step includes obtaining a previous object pattern of the plurality of the plurality of proximal objects. For example, the computing entity 20-1 recovers the previous object pattern for the person walking and for other people walking from the chamber database 34.

A fourth sub-step includes modifying the previous object pattern of the plurality of proximal objects based on the activity parameters for the subset of proximal objects to produce the updated object pattern of the plurality of proximal objects. For example, the computing entity 20-1 modifies the previous object pattern to include particulars associated with the person walking.

FIG. 9B further illustrates the example the method of operation, where having produced the updated object pattern of the plurality of proximal objects, a fourth step includes the computing entity 20-1 identifying historical motion control results for a multitude of non-proximal objects with regards to a set of comparative objects (e.g., other doors) based on the updated object pattern of the plurality of proximal objects. The multitude of non-proximal objects are non-line-of-sight spatially associated with the set of comparative objects (e.g., people in other buildings across the world). The set of comparative objects share a set of common attributes with the first object (e.g., other doors in the other buildings).

For example, the computing entity 20-1 compares the updated object pattern to historical results 155 from the chamber database 34. The other computing entities 20-2 through 20-1 contribute to the historical results by generating the historical results based on other object patterns associated with the other computing entities, corresponding utilized fluid activations for those other object patterns, and actual results from the utilization of the fluid activations (e.g., unfavorable results including late door openings and early door closings; a verbal results including door openings and closings matched with actual needs).

Having identified the historical motion control results, a fifth step of the example method of operation includes the computing entity 20-1 determining the fluid activation 187 for the head unit based on the historical motion control results for the multitude of non-proximal objects and one or more of the piston velocity, the piston position, and the shear force 186. The determining the fluid activation for the head unit device based on the historical motion control results for the multitude of non-proximal objects and one or more of the piston velocity and the piston position includes a variety of one or more approaches.

A first approach includes interpreting a request associated with modifying one or more of object velocity and object position. For example, the computing entity 20-1 receives a request to slow down the door from the computing entity 20-2 when the computing entity 20-2 is associated with a similar door and has produced the request based on a desired optimization.

A second approach includes interpreting fluid activation guidance from the chamber database based on the historical motion control results for the multitude of non-proximal objects. For example, the computing entity 20-1 analyzes historical results 155 for similar patterns that lead to desired results of controlling a door similar to the first door.

A third approach includes interpreting activity information from the chamber database based on the updated object pattern of the plurality of proximal objects to produce an object movement recommendation. A correlation between the activity information and the updated object pattern of the plurality of proximal objects suggests an expected movement behavior of the second object. For example, the computing entity 20-1 produces the object movement recommendation to quickly move the door out of the way when sudden but movement behavior of the object 12-2 is expected based on the activity information.

A fourth approach includes determining a position for the second object based the updated object pattern of the plurality of proximal objects. For example, the computing entity 20-1 includes the position for the second object within the updated object pattern for most of the proximal objects.

A fifth approach includes determining an object position for the first object based on the piston velocity and the piston position. The computing entity 20-1 continuously tracks the object position for the first object based on its velocity and position over time.

A sixth approach includes establishing the fluid activation to include facilitating the first range of shear rates when the object movement recommendation includes increasing velocity of the first object. For example, the computing entity 20-1 establishes the fluid activation 187 to facilitate closing of a large exterior door more quickly, yet safely, when the object pattern of the set of secondary objects is one person approaching the door and the historical results 155 indicates that a faster closing for one person is generally favorable.

A seventh approach includes establishing the fluid activation to include facilitating the second range of shear rates when the object movement recommendation includes decreasing the velocity of the first object. For example, the computing entity 20-1 establishes the fluid activation 187 to facilitate opening of the large exterior door more slowly when the object pattern of the set of secondary objects is a group of people mulling around that could be in the way of the door opening and the historical results 155 indicates that a slower opening when people may be in the way of the opening door is generally favorable.

In particular, the computing entity 20-1 determines the fluid activation 187 to adjust the viscosity of the STF to facilitate movement of the piston and hence the first door in a more desirable fashion based on the identified object pattern for the set of proximal objects and based on the historical results. The fluid activation 187 itself includes a variety of approaches. A first approach includes opening of either of the piston bypass 38-1 and piston bypass 38-2 allow the STF to move between the back channel 24 and the front channel 26 to lower the shear rate and thus select a lower viscosity which in turn allows more rapid movement of the piston in the chamber and hence speeds up the door. A second fluid activation approach includes opening of the chamber bypass 40 to lower the viscosity the STF. A third approach includes activating the set of emitters to directly alter the viscosity of the STF in a desired fashion (e.g., lowering viscosity to speed up opening or closing of the door, raising viscosity to slow down the opening or the closing of the door).

Alternatively, or in addition to, the fifth step further includes the computing entity 20-1 interpreting the output of the secondary object sensor to further update the updated object pattern of the plurality of proximal objects to produce a further updated object pattern of the plurality of proximal objects (e.g., continued to track the group of people walking about). Having produced the further updated object pattern, the fifth step further includes the computing entity 20-1 updating the fluid activation for the head unit device based on the further updated object pattern of the plurality of proximal objects and one or more of the piston velocity and the piston position as previously discussed.

Having determined the fluid activation for the head unit, a sixth step of the example method of operation includes the activating the set of fluid manipulation emitters 114-1-1 and 114-1-2 in accordance with the fluid activation 187 to manipulate one of the first shear threshold effect associated with the first piston bypass 38-1 and the second shear threshold effect associated with the second piston bypass 38-2 to control the motion of the object 12-1 (e.g., the first object) to control the motion of the object with regards to the second object.

The activating the set of fluid manipulation emitters in accordance with the fluid activation to control the motion of the first object with regards to the second object includes a variety of approaches. A first approach includes, when the piston is traveling through the chamber in the inward direction and when the STF is to have the decreasing viscosity, issuing the fluid activation to the set of fluid manipulation emitters to cause one of: the first piston bypass to facilitate the first shear threshold effect to include the first range of shear rates, and the direct manipulation of the STF to facilitate the first range of shear rates.

Otherwise, when the STF is to have the increasing viscosity, the first approach includes issuing the fluid activation to the set of fluid manipulation emitters to cause one of: the first piston bypass to facilitate the first shear threshold effect to include the second range of shear rates, and the direct manipulation of the STF to facilitate the second range of shear rates.

A second approach includes, when the piston is traveling through the chamber in the outward direction and when the STF is to have the decreasing viscosity, issuing the fluid activation to the set of fluid manipulation emitters to cause one of: the second piston bypass to facilitate the second shear threshold effect to include the first range of shear rates, and the direct manipulation of the STF to facilitate the first range of shear rates.

Otherwise, when the STF is to have the increasing viscosity, the second approach includes issuing the fluid activation to the set of fluid manipulation emitters to cause one of: the second piston bypass to facilitate the second shear threshold effect to include the second range of shear rates, and the direct manipulation of the STF to facilitate the second range of shear rates.

As another example, when the object 12-1 includes a large garage door and is opening when moving in the outward direction, the computing entity 20-1 outputs the fluid activation 234-1-1 to the piston bypass 38-2 to facilitate further opening of a one-way check valve to allow more of the STF to move from the front channel 26 to the back channel 24 thusly selecting the first range of shear rates and a lower viscosity of the STF to speed up the door to open when the detected set of secondary objects is a large vehicle passing through the large garage door when the historical results indicate that it is favorable to open the door quickly when the vehicle is very large.

As yet another example, when the set of secondary objects 12-2 through 12-N includes a group of people, the computing entity 20-1 outputs the fluid activation 234-1-1 to the piston bypass 38-2 to facilitate closing down the one-way check valve to prevent STF from moving from the front channel 26 to the back channel 24 thusly selecting the second range of shear rates and a higher viscosity the STF to slow down a heavy door to close safely moving from the point Y3 to the point Y4 (e.g., when the piston is moving in the outward direction) as illustrated in FIG. 9B when the historical results indicate that it is favorable to slow down the closing of the heavy door.

The method described above in conjunction with a processing module of any computing entity of the mechanical and computing system of FIG. 1 can alternatively be performed by other modules of the system of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the mechanical and computing system of FIG. 1 to perform any or all of the method steps described above.

FIGS. 10A-10D are schematic block diagrams of an embodiment of a mechanical system to control an object. The mechanical system provides a head unit system that includes a head unit 10-2 and the object 12-1 of FIG. 1 (e.g., a first door, interchangeable referred to as a first object). In an embodiment, a computing system is operably coupled to the mechanical system, where the computing system includes one or more of the sensor 116-1-1 of FIG. 1A, the emitter 114-1-1 of FIG. 1A, the computing entity 20-1 of FIG. 1A, and the computing entity 22 of FIG. 1A.

The head unit 10-2 includes a shear thickening fluid (STF) 42, where the STF 42 is configured to have a decreasing viscosity in response to a first range of shear rates and an increasing viscosity in response to a second range of shear rates. The second range of shear rates are greater than the first range of shear rates.

The STF 42 includes nanoparticles. The nanoparticles includes one or more of an oxide, calcium carbonate, synthetically occurring minerals, naturally occurring minerals, polymers, SiO2, polystyrene, polymethylmethacrylate, or a mixture. The STF 42 further includes one or more of ethylene glycol, polyethylene glycol, ethanol, silicon oils, phenyltrimethicone, or a mixture.

The head unit 10-2 further includes a chamber 16 which includes two pieces that telescope. The chamber 16 is configured to contain a portion of the STF. The chamber 16 includes a front channel 26 and a back channel 24. The chamber 16 is further configured to volumetrically expand and contract (e.g., via telescoping) to provide the first and second ranges of shear rates for the STF.

The head unit 10-2 further includes a gate 41. The gate 41 is configured to separate the front channel 26 and the back channel 24 to control velocity of flow of the STF 42 between the front channel 26 and the back channel 24 by covering and uncovering an opening within the chamber 16 between the front channel 26 and the back channel 24. The gate 41 is further configured to enable the STF t42 o provide the first range of shear rates as the STF flows from the back channel 24 to the front channel 26 when the gate 41 is in an open position uncovering the opening as the chamber 16 volumetrically expands (e.g., telescopes outward). The gate 41 is further configured to enable the STF 42 to provide the second range of shear rates as the STF 42 flows from the front channel 26 to the back channel 24 when the gate 41 is in a closed position covering the opening as the chamber 16 volumetrically contracts (e.g., telescopes inward).

The head unit 10-2 further includes a piston 36 housed at least partially radially within the back channel 24 of the chamber 16. The piston 36 configured to load a spring 45 within the back channel 24 of the chamber 16 in response to the STF 42 flowing from the front channel 26 to back channel 24 when the chamber volumetrically contracts in response to a force applied to the chamber 16 from the object 12-1. The spring 45 pushes up against a piston backstop 43 at the end of the chamber 16.

The piston 36 is further configured to exert force on the STF 42 to cause the STF 42 to flow from the back channel 24 to front channel 26 in response to energy from the spring 45 unloading when the chamber 16 volumetrically expands absent the force applied to the chamber 16 from the object 12-1 (e.g., either the object 12-1 pulls the chamber outward as the object 12-1 moves away from the head unit 10-2 or the object 12-1 simply moves away from the chamber and the spring pushes the piston and the STF which telescopes the chamber outward).

The gate 41 further includes a set of bypass openings 39-1 and 39-2 between opposite sides of the gate 41. The set of bypass openings are configured to enable the STF 42 to provide the second range of shear rates as the STF 42 flows from the front channel 26 through the set of bypass openings 39-1 and/or 39-2 to the back channel 24 when the gate 41 is in the closed position covering the opening as the chamber 16 volumetrically contracts. In an embodiment, there are any number of openings of a set of openings.

The gate 41 further includes a hinge 49. The hinge 49 is configured to enable the gate 41 to swing to the open position from the closed position and to swing to the closed position from the open position. In an embodiment, a stop component of the hinge prevents the hinge from opening a full 90 degrees. For example, the stop component holds the gate open at a 45 degree maximum to help prevent the gate from sticking in the full open position.

The set of bypass openings 39-1 and 39-2 further includes one or more of a variety of configurations. A first configuration includes a first bypass opening configured with at least one cylindrical tube with substantially consistent diameter from one side of the gate to an opposite side of the gate. For example, a straight tube to enable even STF flow.

A second configuration includes a second bypass opening configured with at least one conical shaped tube with an increasing diameter from the one side of the gate to the opposite side of the gate. For example, a tapered tube.

A third configuration includes a third bypass opening configured with the at least one conical shaped tube with a decreasing diameter from the one side of the gate to the opposite side of the gate. For example, the tapered tube in an opposite direction.

A fourth configuration includes a fourth bypass opening configured with at least one venturi shaped tube from the one side of the gate to the opposite side of the gate. For example, the venturi to cause a venturi effect between sides of the gate.

In an embodiment, the head unit 10-2 further includes a chamber bypass 40 (e.g., as discussed with reference to FIG. 5A) between opposite ends of the chamber 16. The chamber bypass 40 facilitates flow of a portion of the STF between the opposite ends of the chamber 16 to facilitate equalization of pressure of the STF when the piston 36 travels through the chamber 16 in an inward or an outward direction.

In a further embodiment, the head unit system further includes the set of fluid flow sensors 116-1-1 and 116-1-2 positioned proximal to the chamber 16 as discussed with reference to FIG. 5A. The set of fluid flow sensors are configured to provide a fluid response from the STF 42. The set of fluid flow sensors includes one or more of a valve opening detector associated with a set of bypass openings, a mechanical position sensor, an image sensor, and a light sensor. The fluid flow sensors further includes an audio sensor, a microphone, an ultrasonic sound sensor, an electric field sensor, a magnetic field sensor, and a radio frequency wireless field sensor.

In a still further embodiment, the head unit system further includes the set of fluid manipulation emitters 114-1-1 and 114-1-2 positioned proximal to the chamber as discussed with reference to FIG. 5A. The set of fluid manipulation emitters provide a fluid activation to at least one of the STF 42, the gate 41, the piston 36, and the set of bypass openings 39-1 and 39-2 to provide the control of the motion of the object 12-1. The set of fluid manipulation emitters includes one or more of a variable flow valve associated with the set of bypass openings, a mechanical vibration generator, an image generator, a light emitter, an audio transducer, and a speaker. The set of fluid manipulation emitters further includes an ultrasonic sound transducer, an electric field generator, a magnetic field generator, and a radio frequency wireless field transmitter.

FIG. 10A illustrates an example of operation of the head unit system where, in a first step, the head unit system is at idle. The object 12-1 is operably coupled to the chamber 16 but, the first step, exerts no force upon the chamber 16. The chamber 16 is telescoped to a full outward position and the STF 42 is contained within the chamber in both the front channel 26 and the back channel 24 up to the piston 36.

FIG. 10B further illustrates the example of operation of the head unit system where, in a second step, the head unit system moves from the idle position to a slow movement due to STF resistance. The gate 41 starts in the closed position such that when force is applied from the object 12-1 to the chamber 16 to compress the chamber 16, the STF 42 in the front channel 26 runs up against the closed gate 41 causing higher shear forces to trigger the second range of shear rates. Some of the STF flows through the bypass 39-1 and the bypass 39-2 from the front channel 26 to the back channel 24.

The bypass openings further include one or more of a one-way check valve and a variable flow valve. When the piston 36 is traveling through the chamber 16 in the inward direction away from the gate 41, a first setting of the variable flow valve facilitates the second range of shear rates when the STF is to have the increasing viscosity.

As the STF fills the back channel 24 the piston 36 is pushed deeper into the chamber 16 causing loading of the spring 45 up against the piston backstop 43. When the piston 36 is traveling through the chamber 16 in an inward direction away from the gate 41, a second shear threshold effect includes the second range of shear rates when the STF 42 is configured to have the increasing viscosity. As such, the FIG. 10C further illustrates the example of operation of the head unit system where, in a third step, the head unit system moves from the slow movement due to STF resistance position (e.g., compressed chamber) to a fast from open gate position (e.g., the object 12-1 moves back towards a starting position). As the object 12-1 moves outward (e.g., away from the chamber 16 such that the chamber 16 expands or the object 12-1 pulls the chamber 16) the STF in the back channel 24 is pushed up against the gate 41 by the piston 36 due to the spring 45 releasing its stored energy. The gate 41 opens in response to the STF 42 moving towards the gate 41 due to the pressure exerted on the STF 42 by the piston 36.

As the gate 41 opens, the STF moves from the back channel 24 to the front channel 26 with a higher velocity as compared to the opposite direction since the STF 42 is both pushed by the piston 36 and pulled by the suction of the STF 42 within the front channel 26 as the front channel volumetrically expands as the chamber expands. When the one-way check valve is utilized and the piston 36 is traveling through the chamber 16 in the outward direction towards the gate 41, the one-way check valve is configured to prevent STF flow through the one-way check valve. The STF 42 flows through the open gate into the front channel 26.

When the piston 36 is traveling through the chamber 16 in an outward direction towards the gate 41, a first shear threshold effect includes the first range of shear rates when the STF 42 is configured to have the decreasing viscosity. As such, a lower viscosity associated with this chamber expansion enables expansion of the chamber 16 at a faster rate than the compression of the chamber 16 as previously discussed. In an embodiment, the hinge 49 is configured to limit the opening of the gate 41 to an angle between 0° and 90°. For example, the hinge 49 is configured to limit the opening of the gate 41 to 45° such that the gate 41 is less likely to not remain stuck open when it is time to compress the chamber 16.

FIG. 10D further illustrates the example of operation of the head unit system where, in a fourth step, the head unit system moves from the fast from open gate position to the stopped and idle position. The spring 45 having released all its energy, positions the piston 36 at a steady state position with regards to the force the spring applies up against the STF 42. The STF 42 stabilizes between the back channel 24 and the front channel 26 when the chamber 16 has reached its maximum expansion level. In response, the gate 41 tends towards closing over the opening between the back channel 24 and the front channel 26. In an embodiment, the hinge 49 includes a return spring to force the gate 41 closed when the pressure of the back channel 24 and the front channel 26 is substantially the same.

In another embodiment, when the sensors and emitters are utilized in conjunction with a computing entity, the rate at which the second shear threshold effect takes place is sensed and automatically adjusted for a desired rate such that the object 12-1 travels inward at a desired trajectory (e.g., a maximum speed, a maximum acceleration, a desired length of travel, etc.). In a similar fashion, the sensors and emitters in conjunction with the computing entity are utilized to automatically adjust for another desired rate with regards to outward travel of the object 12-1.

FIGS. 11A-11D are schematic block diagrams of another embodiment of a mechanical system to control an object. The mechanical system provides a head unit system that includes a head unit 10-3 and the object 12-1 of FIG. 1 (e.g., a first door, interchangeable referred to as a first object). In an embodiment, a computing system is operably coupled to the mechanical system, where the computing system includes one or more of the sensor 116-1-1 of FIG. 1A, the emitter 114-1-1 of FIG. 1A, the computing entity 20-1 of FIG. 1A, and the computing entity 22 of FIG. 1A.

The head unit 10-3 includes a shear thickening fluid (STF) 42, where the STF 42 is configured to have a decreasing viscosity in response to a first range of shear rates and an increasing viscosity in response to a second range of shear rates. The second range of shear rates are greater than the first range of shear rates.

The STF 42 includes nanoparticles. The nanoparticles include one or more of an oxide, calcium carbonate, synthetically occurring minerals, naturally occurring minerals, polymers, SiO2, polystyrene, polymethylmethacrylate, or a mixture. The STF 42 further includes one or more of ethylene glycol, polyethylene glycol, ethanol, silicon oils, phenyltrimethicone, or a mixture.

The head unit 10-3 further includes a chamber 16. The chamber 16 is configured to contain a portion of the STF 42. The chamber 16 includes a front channel 26 and a back channel 24.

The head unit 10-3 further includes a set of gates 57-1 and 57-2. Any number of gates may be utilized. The set of gates is configured to separate the front channel 26 and the back channel 24 to control velocity of flow of the STF 42 between the front channel 26 and the back channel 24. The set of gates 57-1 and 57-2 is further configured to enable the STF 42 to provide the first range of shear rates as the STF flows from the back channel 24 to the front channel 26 when the set of gates is in an open position. The set of gates 57-1 and 57-2 is further configured to enable the STF 42 to provide the second range of shear rates as the STF 42 flows from the front channel 26 to the back channel 24 when the set of gates is in a closed position. In an embodiment, the set of gates open and close in unison (e.g., closed together or open substantially the same amount simultaneously).

The set of gates 57-1 and 57-2 further includes a set of hinges 59-1 and 59-2. The set of hinges is configured to enable the set of gates 57-1 and 57-2 to swing to the open position from the closed position and to swing to the closed position from the open position. In an embodiment, the set of hinges is further configured to only allow the set of gates to open to a maximum open level. For example, the set of hinges only allow the gates to open to a maximum of 45° within a range of zero to 90°.

The head unit 10-3 further includes a cupped piston 55. The cupped piston is configured to facilitate flow of the STF 42 through a slot set 63 between the front channel 26 and the back channel 24. The slot set includes one or more varieties of slots. A first variety of the slot set is configured with at least one cylindrical tube with substantially consistent diameter from one side of the cupped piston to an opposite side of the cupped piston. For example, a uniform hole.

A second variety of slot of the slot set is configured with at least one conical shaped tube with an increasing diameter from the one side of the cupped piston to the opposite side of the cupped piston. For example, a tapered hole.

A third variety of slot of the slot set it is configured with the at least one conical shaped tube with a decreasing diameter from the one side of the cupped piston to the opposite side of the cupped piston. For example, another tapered hole in another direction.

A fourth variety of slot of the slot set is configured with at least one venturi shaped tube from the one side of the cupped piston to the opposite side of the cupped piston. For example, the venturi shaped tube to produce a venturi effect between opposite sides of the cupped piston.

The head unit 10-3 further includes a bushing 53. The bushing is configured within the chamber 16 to cause containment of the STF 42 in the back channel 24. In an embodiment, the bushing 53 is further configured with one or more seals 47 provide further containment of the STF 42 within the back channel 24. The head unit 10-3 further includes a backstop 51. The backstop is configured with the chamber 16 to cause containment of the STF 42 in the front channel 26.

The head unit 10-3 further includes a plunger 28 housed at least partially radially within the back channel 24 of the chamber 16. The plunger is configured to facilitate the set of gates to operate in the closed position to cause the STF 42 within the front channel 26 to provide the second range of shear rates in response to an inward force applied to the plunger 28 from the object 12-1 as the STF 42 flows from the front channel 26 to the back channel 24. The plunger 28 is further configured to facilitate the set of gates 57-1 and 57-2 to operate in the open position to cause the STF 42 within the back channel 24 to provide the first range of shear rates in response to an outward force applied to the plunger as the STF 42 flows from the back channel 24 to the front channel 26.

The head unit 10-3 further includes a cap 61. The cap is configured to move in unison with the plunger 28 radially within the chamber 16. In an embodiment, the 61 is operably coupled to the plunger 28 such that a force applied by the object 12-1 to the plunger 28 and the 61 causes the 61 and the plunger 28 to move in unison in the inward direction in the chamber 16. The head unit 10-3 further includes a spring 45. The spring 45 is configured to store energy when the 61 moves in the inward direction in response to a force from the object 12-1. The spring 45 is further configured to release the energy, absent the force applied by the object 12-1, such that the 61 and plunger 28 move in the outward direction quickly to reset the 61 to the idle position.

In an embodiment, the head unit 10-3 further includes a chamber bypass 40 as discussed with reference to FIG. 1A between opposite ends of the chamber 16. The chamber bypass 40 facilitates flow of a portion of the STF 42 between the opposite ends of the chamber 16 when the set of gates 57-1 and 57-2 travels through the chamber 16 in an inward or an outward direction.

In an embodiment where the head unit system further includes the set of fluid flow sensors, the set of fluid flow sensors are configured to provide a fluid response from the STF 42. The set of fluid flow sensors includes one or more of a valve opening detector associated with the slot set 63 of the cupped piston 55, a mechanical position sensor, an image sensor, a light sensor, and an audio sensor. The set of fluid flow sensors further includes a microphone, an ultrasonic sound sensor, an electric field sensor, a magnetic field sensor, and a radio frequency wireless field sensor.

In an embodiment where the head unit system further includes the set of fluid manipulation emitters, the set of fluid manipulation emitters are positioned proximal to the chamber 16. The set of fluid manipulation emitters provide a fluid activation to at least one of the STF 42, the set of gates 57-1 and 57-2, and the slot set 63 of the cupped piston 55 to provide the control of the motion of the object 12-1. The set of fluid manipulation emitters includes a variety of fluid manipulation emitters including one or more of a variable flow valve associated with the slot set 63, a mechanical vibration generator, an image generator, a light emitter, and an audio transducer. The set of fluid manipulation emitters further includes a speaker, an ultrasonic sound transducer, an electric field generator, a magnetic field generator, and a radio frequency wireless field transmitter.

FIG. 11A illustrates an example of operation of the head unit system where, in a first step, the head unit system is in an idle position. The object 12-1 is operably coupled to the plunger 28 and cap 61 ready to exert force upon the plunger and. At idle, the plunger and cap are at a full outward position such that the set of gates are in the closed position and are ready to exert force upon the STF 42 within the front channel 26.

FIG. 11B further illustrates the example of operation of the head unit system where, in a second step, the head unit system moves from the idle position to a slow compression operation due to STF resistance. For example, the object 12-1 applies the force to the cap 61 and the plunger 28 such that the set of gates 57-1 and 57-2 travels through the chamber 16 in the inward direction away from the back channel 24 to produce a second shear threshold effect as the STF 42 within the front channel 26 is compressed by the closed set of gates and the cupped piston. The second shear threshold effect includes the second range of shear rates when the STF is configured to have the increasing viscosity.

The set of gates 57-1 and 57-2 further include a bypass opening set 65. The bypass opening set 65 is configured to facilitate flow of the STF 42 from the front channel 26 through the bypass opening set 65 to the back channel 24 to cause the STF 42 within the front channel 26 to provide the second range of shear rates when the set of gates 57-1 and 57-2 is operating in the closed position. Movement of the set of gates and the cupped piston towards the front channel 26 in response to the force applied from the plunger 28 serves to facilitate closure of the set of gates. As the set of gates closes, the STF 42 flows from the front channel 26 to the back channel 24 by one or more approaches. A first approach includes traveling around the set of gates when a diameter of the set of gates is less than a diameter of the chamber 16. A second approach includes traveling through the set of gates via one or more bypass openings of the bypass opening set 65.

The cupped piston 55 is further configured to facilitate flow of the STF 42 around the set of gates between the chamber and the set of gates from the front channel through the slot set 63 of the cupped piston to the back channel to cause the STF within the front channel to provide the second range of shear rates when the set of gates is operating in the closed position. For example, a smaller diameter slot set facilitates higher shear thresholds and a higher viscosity from the second range of shear rates such that a relatively small force from the object 12-1 causes an abrupt slow down of the movement of the object 12-1.

The cupped piston 55 is further configured to facilitate flow of the STF around the set of gates between the chamber and the set of gates from the front channel through the slot set of the cupped piston to the back channel to cause the STF within the front channel to provide a sub-range of the second range of shear rates in accordance with a slot size configuration of the slot set when the set of gates is operating in the closed position. For example, a larger diameter slot set requires even more force from the object 12-1 to reach the second range of shear rates to cause the slowing down of the movement of the object 12-1.

The second step of the example of operation of the head unit 10-3 ends with the cap 61 and the plunger 28 reaching an end of travel (e.g., the cap 61 travels inward within the chamber 16 to rest when reaching the bushing 53). Soon after reaching the end of travel, the pressure of the STF within the front channel 26 equalizes with the pressure of the STF within the back channel 24. As long as a maintaining force from the object 12-1 is applied to the plunger 28 the head unit 10-3 remains in this position with resistance to the force from the object 12-1 coming from this stored energy of the spring 45 and no longer from the STF 42.

FIG. 11C further illustrates the example of operation of the head unit system where, in a third step, the head unit system moves from the slow compression operation to a fast rebounding operation absent the force applied from the object 12-1. The set of gates 57-1 and 57-2 is further configured such that, when the set of gates is traveling through the chamber in the outward direction towards the back channel, a first shear threshold effect is produced. The first shear threshold effect includes the first range of shear rates when the STF is configured to have the decreasing viscosity.

As the force from the object 12-1 is removed from the plunger 28 and the cap 61 or when the object 12-1 pulls the plunger 28 in the outward direction, the spring 45 is further configured within the chamber to have stored the energy as a result of the inward force applied to the plunger and to the cap from the object 12-1. The spring 45 is further configured to move the plunger 28, the cap 61, and set of gates 57-1 and 57-2 outward absent the inward force applied to the plunger and to the cap from the object 12-1. As the set of gates is pulled by the plunger from the front channel to the back channel, the force of the STF serves to open the set of gates.

The cupped piston 55 is further configured to facilitate the flow of the STF from the back channel 24 through the slot set 63 of the cupped piston 55 to the front channel to cause the set of gates to operate in the open position and to cause the STF within the back channel to provide the first range of shear rates when the set of gates is operating in the open position. As such, an improvement to the operation of the head unit system is provided where the cap 61 quickly rebounds to the idle position absent the force applied by the object 12-1.

FIG. 11D further illustrates the example of operation of the head unit system where, in a fourth step, the head unit system transitions from the fast rebounding operation to a stopping operation where the system finally comes to a steady-state rest absent the force applied by the object 12-1. For example, the spring 45 releases all of its energy against the cap 61 and plunger 28 thus pulling the cupped piston 55 in the set of gates 57-1 and 57-2 to a fully outward resting position. The gates 57-1 and 57-2 begin to close when the pressure of the STF equalizes between the back channel 24 and the front channel 26. As such, the head unit 10-3 is resetting to be ready for another cycle where the object 12-1 applies the force to the head unit 10-3.

FIGS. 12A-12F are schematic block diagrams of another embodiment of a mechanical system to control an object. The mechanical system provides a head unit system that includes a head unit 10-4 and the objects 12-2 and 12-3 of FIG. 1A. In an embodiment, a computing system is operably coupled to the mechanical system, where the computing system includes one or more of the sensor 116-1-1 of FIG. 1A, the emitter 114-1-1 of FIG. 1A, the computing entity 20-1 of FIG. 1A, and the computing entity 22 of FIG. 1A.

Figure 12B:
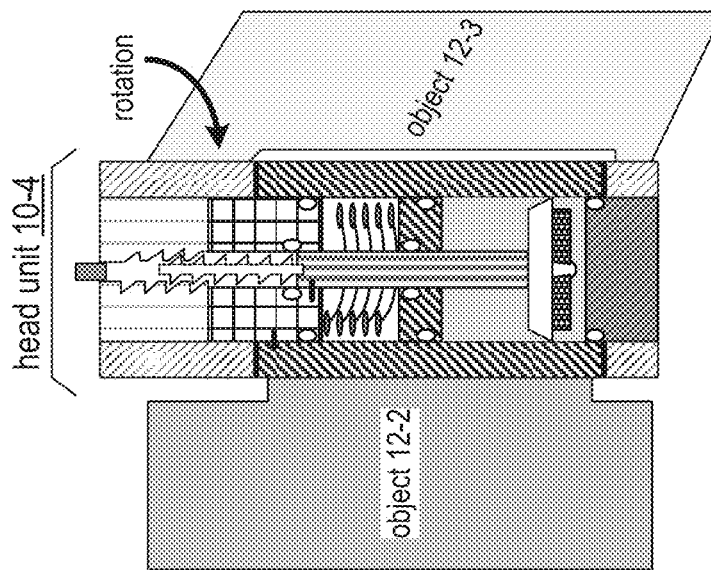
FIGS. 12A-12F are schematic block diagrams of another embodiment of a mechanical system to control an object in accordance with the present invention.
Figure 12A:
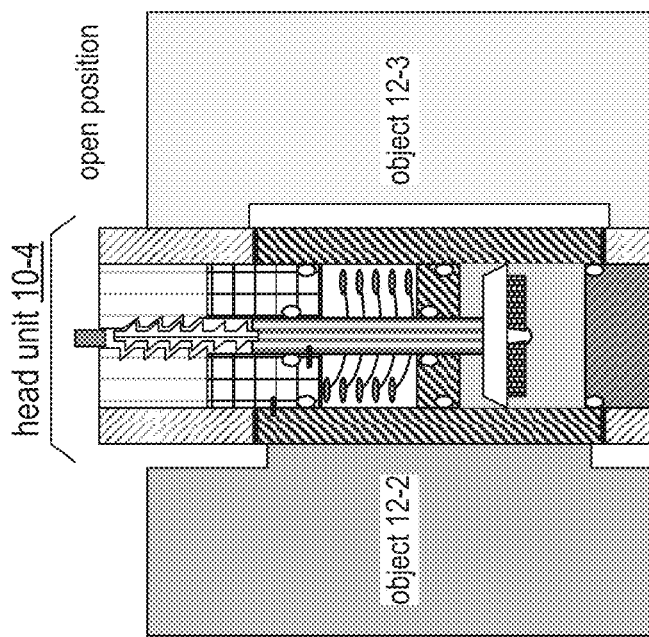

FIGS. 12A and 12B illustrates an example of operation of the mechanical system to control the object. In an embodiment, the object 12-2 includes a first portion of a hinge assembly that is associated with a doorjamb and the object 12-2 includes a remaining portion of the hinge assembly that is associated with a door that swings utilizing the hinge assembly. In particular, the object 12-3 includes both the remaining portion of the hinge assembly and the door and the object 12-2 includes the first portion of the hinge assembly and the doorjamb.

FIG. 12A illustrates a relationship between the objects 12-2 and 12-3 with regards to the head unit 10-4 where the hinge assembly is in the open position. FIG. 12B further illustrates the relationship between objects 12-2 and 12-3 with regards to the head unit 10-4 where the hinge assembly is rotating towards a closed position (e.g., as the door closes). As will be discussed below, rotation of the object 12-3 causes a portion of the head unit 10-4 to rotate which causes compression of a shear thickening fluid within the head unit 10-4 to achieve a desired viscosity of the shear thickening fluid which in turn limits acceleration and/or velocity of the closing of the door.

Figure 12D:
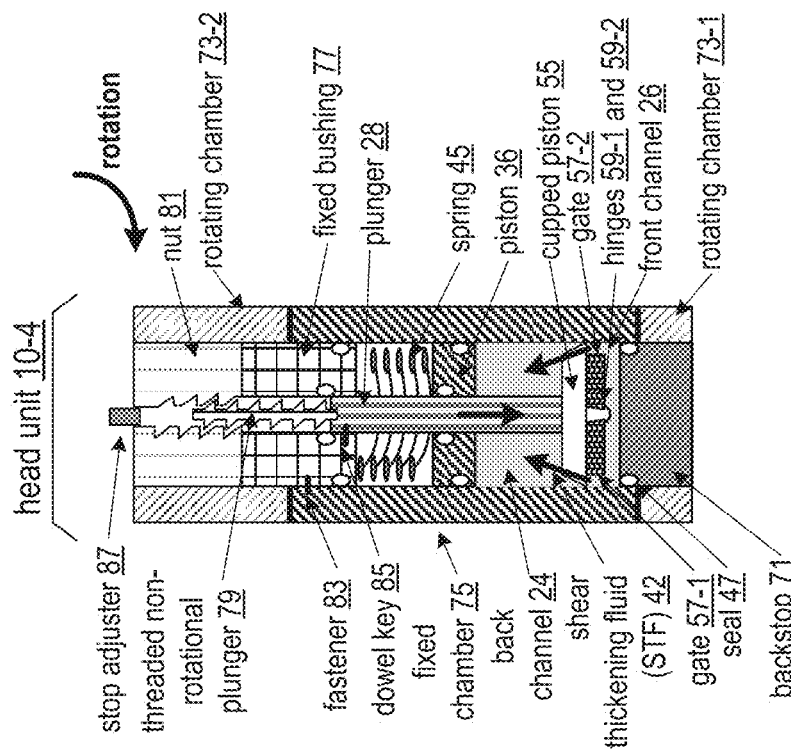
Figure 12C:
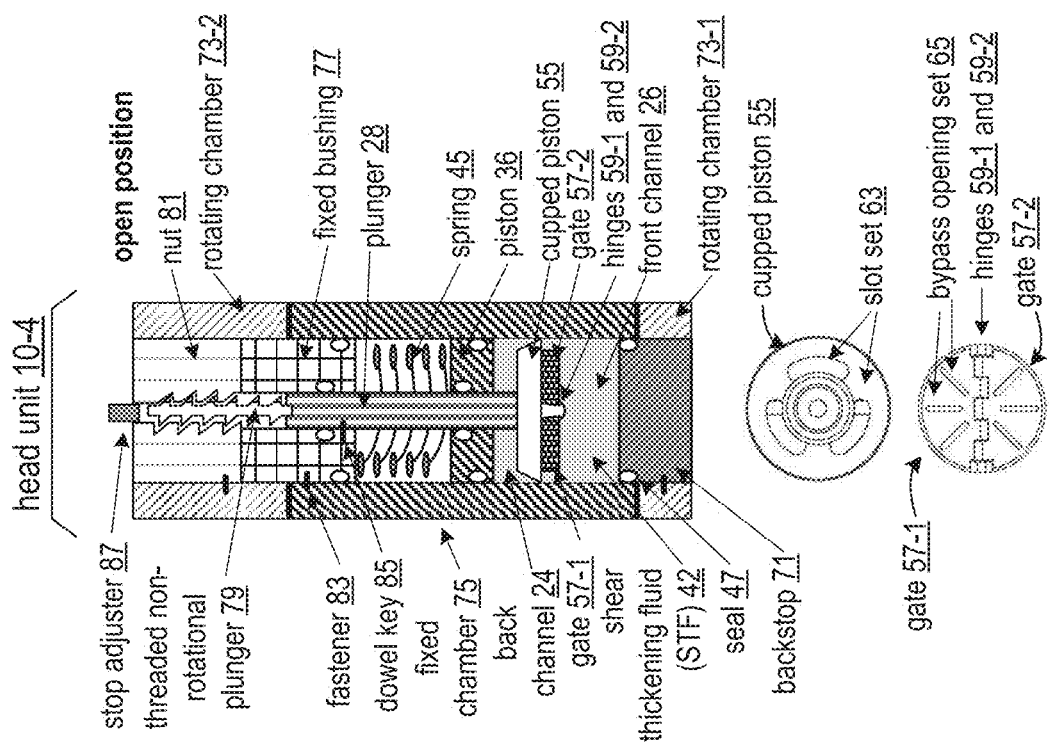

FIG. 12C illustrates an embodiment of the head unit 10-4 and a first step of an example of operation of the head unit system that includes the head unit 10-4 at a starting open position. The head unit 10-4 includes a shear thickening fluid (STF) 42, where the STF 42 is configured to have a decreasing viscosity in response to a first range of shear rates and an increasing viscosity in response to a second range of shear rates. The second range of shear rates are greater than the first range of shear rates.

The STF 42 includes nanoparticles. The nanoparticles include one or more of an oxide, calcium carbonate, synthetically occurring minerals, naturally occurring minerals, polymers, SiO2, polystyrene, polymethylmethacrylate, or a mixture. The STF 42 further includes one or more of ethylene glycol, polyethylene glycol, ethanol, silicon oils, phenyltrimethicone, or a mixture.

The head unit 10-4 further includes a chamber 75. The chamber 75 is configured to contain a portion of the STF 42. The chamber 75 includes a front channel 26 and a back channel 24. In an embodiment, the chamber 75 is associated with the object 12-2 (e.g., the doorjamb) and is considered a fixed portion of the head unit 10-4. When the chamber 75 is considered the fixed portion, a rotating portion of the head unit 10-4 includes one or more rotating chambers 73-1 and 73-2. The one or more rotating chambers are associated with the object 12-3 (e.g., the door) and are considered a moving and/or rotational portion of the head unit 10-4 relative to the chamber 75 and the object 12-2.

The head unit 10-4 further includes a set of gates 57-1 and 57-2. Any number of gates may be utilized. The set of gates is configured to separate the front channel 26 and the back channel 24 to control velocity of flow of the STF 42 between the front channel 26 and the back channel 24. The set of gates 57-1 and 57-2 is further configured to enable the STF 42 to provide the first range of shear rates as the STF flows from the back channel 24 to the front channel 26 when the set of gates is in an open position. The set of gates 57-1 and 57-2 is further configured to enable the STF 42 to provide the second range of shear rates as the STF 42 flows from the front channel 26 to the back channel 24 when the set of gates is in a closed position. In an embodiment, the set of gates open and close in unison (e.g., closed together or open substantially the same amount simultaneously). In another embodiment, the set of gates open within a first time frame and close within a second time frame. In yet another embodiment, the set of gates open sequentially. In a still further embodiment, the set of gates close sequentially.

The set of gates 57-1 and 57-2 further includes a set of hinges 59-1 and 59-2. The set of hinges is configured to enable the set of gates 57-1 and 57-2 to swing to the open position from the closed position and to swing to the closed position from the open position. In an embodiment, the set of hinges is further configured to only allow the set of gates to open to a maximum open level. For example, the set of hinges only allow the gates to open to a maximum of 45° within a range of zero to 90°.

The set of gates 57-1 and 57-2 further include a bypass opening set 65. The bypass opening set 65 is configured to facilitate flow of the STF 42 from the front channel 26 through the bypass opening set 65 to the back channel 24 to cause the STF 42 within the front channel 26 to provide the second range of shear rates when the set of gates 57-1 and 57-2 is operating in the closed position. Movement of the set of gates towards the front channel 26 in response to a force applied from the plunger 28 serves to facilitate closure of the set of gates. As the set of gates closes, the STF 42 flows from the front channel 26 to the back channel 24 by one or more approaches. A first approach includes traveling around the set of gates when a diameter of the set of gates is less than a diameter of the chamber 75. A second approach includes traveling through the set of gates via one or more bypass openings of the bypass opening set 65.

The head unit 10-4 further includes a plunger 28 housed at least partially radially within the back channel 24 of the chamber 75. The plunger is configured to facilitate the set of gates to operate in the closed position to cause the STF 42 within the front channel 26 to provide the second range of shear rates inward force applied to the plunger 28 from a rotational force of the object 12-3 as the STF 42 flows from the front channel 26 to the back channel 24. The plunger 28 is further configured to facilitate the set of gates 57-1 and 57-2 to operate in the open position to cause the STF 42 within the back channel 24 to provide the first range of shear rates in response to an outward force applied to the plunger 28 from a counter-rotational force of the object 12-3 as the STF 42 flows from the back channel 24 to the front channel 26.

The head unit 10-4 further includes a threaded plunger 79. The threaded plunger 79 configured to apply the inward force to the plunger 28 in response to the rotational force of the object 12-3. The threaded plunger 79 may also referred to as a threaded non-rotational plunger 79. The threaded plunger 79 is further configured to generate the inward force when a nut 81 rotates on threads of the threaded plunger 79 of as a result of the rotational force of the object 12-3. In an embodiment, the nut 81 is configured within a rotating chamber 73-2 that is extended beyond the chamber 75. The nut 81 is configured in a fixed position within the rotating chamber 73-2 by way of a fastener 83 between the rotating chamber 73-2 and the nut 81.

The threaded plunger 79 is further configured to apply the outward force to the plunger 28 in response to the counter-rotational force of the object 12-3. The threaded plunger 79 is further configured to generate the outward force when the nut 81 counter-rotates on the threads of the threaded plunger 79 of as a result of the counter-rotational force of the object 12-3.

In an embodiment, the head unit 10-4 further includes a stop adjuster 87. The stop adjuster 87 is configured with the nut 81 to prevent the threaded plunger from traveling beyond a stop position of the stop adjuster 87. As a result, the door can only swing open to a maximum open position.

The head unit 10-4 further includes a cupped piston 55. The cupped piston is configured to facilitate flow of the STF 42 around the set of gates between the chamber 75 and the set of gates 57-1 and 57-2 from the front channel 26 through a slot set 63 of the cupped piston 55 to the back channel 24 to cause the STF 42 within the front channel 26 to provide the second range of shear rates when the set of gates is operating in the closed position. The cupped piston 55 is further configured to facilitate flow of the STF 42 from the back channel 24 through the slot set 63 of the cupped piston 55 to the front channel 26 to cause the set of gates to operate in the open position and to cause the STF 42 within the back channel 24 to provide the first range of shear rates when the set of gates is operating in the open position.

The cupped piston is further configured to facilitate flow of the STF 42 facilitate flow of the STF through the slot set 63 between the front channel 26 and the back channel 24 utilizing one or more varieties of slots. A first variety of the slot set is configured with at least one cylindrical tube with substantially consistent diameter from one side of the cupped piston to an opposite side of the cupped piston. For example, a uniform hole.

A second variety of slot of the slot set is configured with at least one conical shaped tube with an increasing diameter from the one side of the cupped piston to the opposite side of the cupped piston. For example, a tapered hole.

A third variety of slot of the slot set it is configured with the at least one conical shaped tube with a decreasing diameter from the one side of the cupped piston to the opposite side of the cupped piston. For example, another tapered hole in another direction.

A fourth variety of slot of the slot set is configured with at least one venturi shaped tube from the one side of the cupped piston to the opposite side of the cupped piston. For example, the venturi shaped tube to produce a venturi effect between opposite sides of the cupped piston.

The head unit 10-4 further includes a fixed bushing 77. The fixed bushing is configured in a fixed position relative to the chamber 75 to cause containment of the STF 42 in the back channel 24. In an embodiment, the fixed bushing 77 is further configured with one or more seals 47 provide further containment of the STF 42 within the back channel 24. In an embodiment, the fastener 83 stabilizes the fixed bushing 77 in the fixed position with regards to the chamber 75.

In an embodiment, the fixed bushing 77 further includes a dowel key 85 2 guide the plunger 28 through the fixed bushing 77 as the plunger 28 travels longitudinally through the chamber 75 without rotation.

The head unit 10-4 further includes a backstop 71. The backstop is configured with the chamber 75 to cause containment of the STF 42 in the front channel 26. In an embodiment, the backstop 71 includes one or more seals 47 when the backstop 71 is configured within the chamber 75 to prevent flow of the STF into the rotating chamber 73-1. The backstop 71 is secured to the rotating chamber 73-1 by way of another fastener 83.

The head unit 10-4 further includes a piston 36. The piston 36 is configured to travel longitudinally within the chamber 75 to cause containment of the STF 42 in the back channel 24. The piston 36 is further configured to compress a spring 45 within the chamber 75 between the piston 36 and the fixed bushing 77 relative to the chamber 75 when the STF 42 flows from the front channel 26 to the back channel 24 in response to the inward force to the plunger 28. The piston 36 is further configured to cause flow of the STF 42 in the back channel 24 in response to de-compression of the spring 45 further causing the set of gates 57-1 and 57-2 to operate in the open position and to further cause the STF 42 within the back channel 24 to provide the first range of shear rates when the set of gates is operating in the open position when the outward force is applied to the plunger 28.

In an embodiment, the head unit 10-4 further includes a chamber bypass 40 as discussed with reference to FIG. 1A between opposite ends of the chamber 75. The chamber bypass 40 facilitates flow of a portion of the STF 42 between the opposite ends of the chamber 75 when the set of gates 57-1 and 57-2 travels through the chamber 75 in an inward or an outward direction.

In an embodiment where the head unit system further includes the set of fluid flow sensors, the set of fluid flow sensors are configured to provide a fluid response from the STF 42. The set of fluid flow sensors includes one or more of a valve opening detector associated with the slot set 63 of the cupped piston 55, a mechanical position sensor, an image sensor, a light sensor, and an audio sensor. The set of fluid flow sensors further includes a microphone, an ultrasonic sound sensor, an electric field sensor, a magnetic field sensor, and a radio frequency wireless field sensor.

In an embodiment where the head unit system further includes the set of fluid manipulation emitters, the set of fluid manipulation emitters are positioned proximal to the chamber 75. The set of fluid manipulation emitters provide a fluid activation to at least one of the STF 42, the set of gates 57-1 and 57-2, and the slot set 63 of the cupped piston 55 to provide the control of the motion of the object 12-3. The set of fluid manipulation emitters includes a variety of fluid manipulation emitters including one or more of a variable flow valve associated with the slot set 63, a mechanical vibration generator, an image generator, a light emitter, and an audio transducer. The set of fluid manipulation emitters further includes a speaker, an ultrasonic sound transducer, an electric field generator, a magnetic field generator, and a radio frequency wireless field transmitter.

FIG. 12C further illustrates an example of operation of the head unit system where, in a first step, the head unit system is in an open position. The object 12-3 is operably coupled to the rotating chamber 73-2 ready to exert the rotational force upon the rotating chamber 73-2. At idle, the threaded non-rotational plunger 79 and the plunger 28 plunger are at a full outward position such that the set of gates are in the closed position and are ready to exert force upon the STF 42 within the front channel 26. At idle, in the open position, the spring 45 is relaxed and the piston 36 is at a steady state with regards to spring pressure from the spring 45 and pressure of the STF within the back channel 24.

FIG. 12D further illustrates the example of operation of the head unit system where, in a second step, the head unit system moves from the open position to a rotational operation due to the rotational force from the object 12-3 applied to the rotating chamber 73-2. For example, the object 12-3 applies the rotational force to the rotating chamber 73-2 which turns the nut 81 causing the threaded non-rotation plunger 79 2 travel inward through the fixed bushing 77 exerting force on the operably coupled plunger 28 causing the plunger 28 to exert force on the cupped piston 55 and set of gates 57-1 and 57-2. When set of gates 57-1 and 57-2 travels through the chamber 75 in the inward direction away from the back channel 24 that produces a second shear threshold effect as the STF 42 within the front channel 26 is compressed by the closed set of gates and the cupped piston 55. The second shear threshold effect includes the second range of shear rates when the STF is configured to have the increasing viscosity.

The cupped piston 55 is further configured to facilitate flow of the STF 42 around the set of gates between the chamber and the set of gates from the front channel through the slot set 63 of the cupped piston to the back channel to cause the STF within the front channel to provide the second range of shear rates when the set of gates is operating in the closed position. For example, a smaller diameter slot set facilitates higher shear thresholds and a higher viscosity from the second range of shear rates such that a relatively small force from the object 12-3 causes an abrupt slow down of the movement of the object 12-3 (e.g., stops the door from slamming the door jamb).

The cupped piston 55 is further configured to facilitate flow of the STF around the set of gates between the chamber and the set of gates from the front channel through the slot set of the cupped piston to the back channel to cause the STF within the front channel to provide a sub-range of the second range of shear rates in accordance with a slot size configuration of the slot set when the set of gates is operating in the closed position. For example, a larger diameter slot set requires even more rotational force from the object 12-3 to reach the second range of shear rates to cause the slowing down of the movement of the object 12-3.

The second step of the example of operation of the head unit 10-4 ends with the nut 81 causing an end of travel of the threaded non-rotational plunger 79. Soon after reaching the end of travel, the pressure of the STF within the front channel 26 equalizes with the pressure of the STF within the back channel 24. As long as a maintaining force from the object 12-3 (e.g., the doors closed and latched by a doorknob) is applied to the plunger 28 the head unit 10-4 remains in this position with resistance to the force from the object 12-3 coming from this stored energy of the spring 45 and no longer from the STF 42.

Figure 12E:
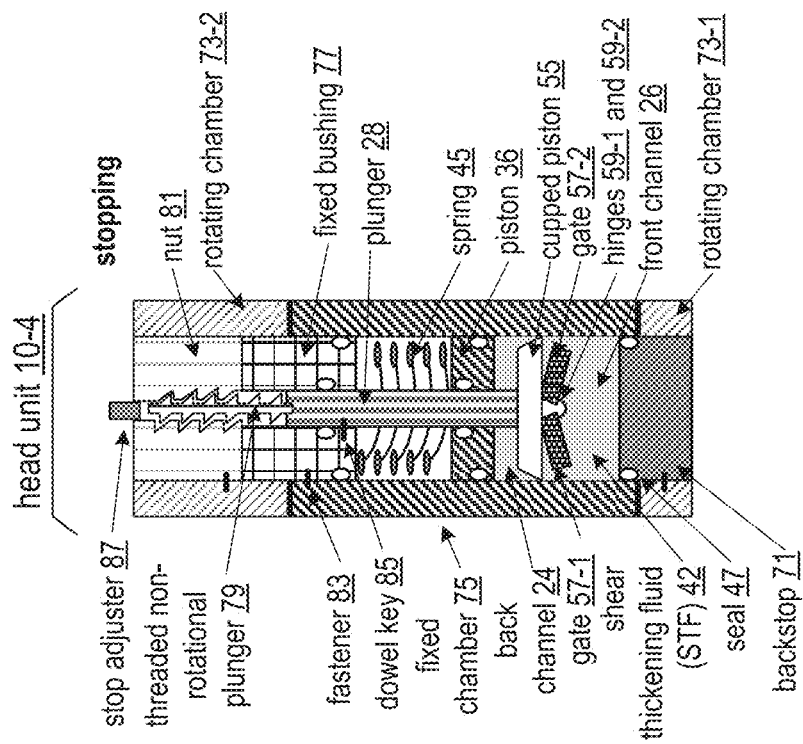

FIG. 12E further illustrates the example of operation of the head unit system where, in a third step, the head unit system moves from the rotation operation (e.g., and idling with the cupped piston 55 fully extended within the front channel 26) to a counter-rotation operation as counter-rotation force applied from the object 12-3 (e.g., the doors opened). The set of gates 57-1 and 57-2 is further configured such that, when the set of gates is traveling through the chamber in the outward direction towards the back channel, a first shear threshold effect is produced. The first shear threshold effect includes the first range of shear rates when the STF is configured to have the decreasing viscosity.

As the counter-rotational force from the object 12-3 counter-rotates the nut 81 causing the threaded non-rotational plunger 79 to move outward within the rotating chamber 73-2 thus pulling the plunger 28 and the cupped piston 55 along with the gates 57-1 and 57-2 in the outward direction, the spring 45 is further configured within the chamber 75 to release the stored energy as a result of the STF 42 flowing from the back channel 24 through the cupped piston 55 and the open gates 57-1 and 57-2 into the front channel 26. The spring 45 is further configured to assist moving the STF 42 from the back channel 24 to the front channel 26 as the cupped piston 55 is drawn outward by the counter-rotation movement. As the set of gates 57-1 and 57-2 is pulled inward by the plunger 28 from the front channel 26 to the back channel 24, the force of the STF 42 serves to open the set of gates 57-1 and 57-2 causing even more STF 42 to flow through the cupped piston 55 with less resistance thus speeding up the counter-rotation movement of the object 12-3 (e.g., the door opens quickly.

The cupped piston 55 is further configured to facilitate the flow of the STF from the back channel 24 through the slot set 63 of the cupped piston 55 to the front channel 26 to cause the set of gates 57-1 and 57-2 to operate in the open position and to cause the STF 42 within the back channel to provide the first range of shear rates when the set of gates is operating in the open position. As such, an improvement to the operation of the head unit system is provided where the rotating chamber 73-2 quickly rebounds enabling the object 12-3 to counter-rotate back to the open position.

Figure 12F:
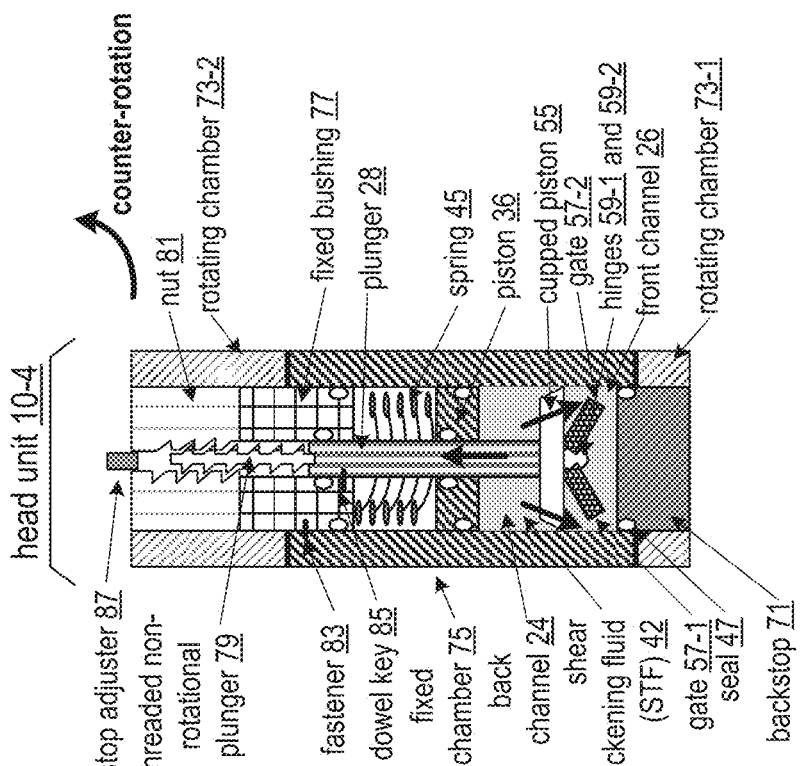

FIG. 12F further illustrates the example of operation of the head unit system where, in a fourth step, the head unit system transitions from the counter-rotation operation to a stopping operation where the system finally comes to a steady-state rest as the object 12-3 returns to the open an idle position. For example, the spring 45 releases all of its energy against the piston 36 thus pushing the STF 42 through the set of gates 57-1 and 57-2 to a fully inward resting position where pressure of the STF equalizes between the back channel 24 and the front channel 26. The gates 57-1 and 57-2 begin to close when that pressure of the STF equalizes. As such, the head unit 10-4 is resetting to be ready for another cycle where the object 12-3 applies the rotational force to the rotating chamber 73-2.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A head unit system for controlling motion of an object, the head unit system comprising:
    a head unit device, wherein the head unit device includes:
    a shear thickening fluid (STF), wherein the STF is configured to have a decreasing viscosity in response to a first range of shear rates and an increasing viscosity in response to a second range of shear rates, wherein the second range of shear rates are greater than the first range of shear rates;
    a chamber, the chamber configured to contain a portion of the STF, wherein the chamber includes a front channel and a back channel, wherein the chamber is further configured to volumetrically expand and contract to provide the first and second ranges of shear rates for the STF;
    a gate, the gate configured to separate the front channel and the back channel to control velocity of flow of the STF between the front channel and the back channel by covering and uncovering an opening within the chamber between the front channel and the back channel, wherein the gate is further configured to enable the STF to provide the first range of shear rates as the STF flows from the back channel to the front channel when the gate is in an open position uncovering the opening as the chamber volumetrically expands, wherein the gate is further configured to enable the STF to provide the second range of shear rates as the STF flows from the front channel to the back channel when the gate is in a closed position covering the opening as the chamber volumetrically contracts; and
    a piston housed at least partially radially within the back channel of the chamber, the piston configured to load a spring within the back channel of the chamber in response to the STF flowing from the front channel to back channel when the chamber volumetrically contracts in response to a force applied to the chamber from the object, wherein the piston is further configured to exert force on the STF to cause the STF to flow from the back channel to front channel in response to energy from the spring unloading when the chamber volumetrically expands absent the force applied to the chamber from the object.

2. The head unit system of claim 1, wherein the head unit device further comprises:
    the gate further includes:
    a set of bypass openings between opposite sides of the gate, the set of bypass openings configured to enable the STF to provide the second range of shear rates as the STF flows from the front channel through the set of bypass openings to the back channel when the gate is in the closed position covering the opening as the chamber volumetrically contracts; and
    a hinge, the hinge configured to enable the gate to swing to the open position from the closed position and to swing to the closed position from the open position.

3. The head unit system of claim 2, wherein the set of bypass openings comprises:
    one or more of a one-way check valve and a variable flow valve;
    when the piston is traveling through the chamber in an inward direction away from the gate:
    a first setting of the variable flow valve facilitates the second range of shear rates when the STF is to have the increasing viscosity; and
    when the piston is traveling through the chamber an outward direction towards the gate:
    the one-way check valve is configured to prevent STF flow through the one-way check valve.

4. The head unit system of claim 2, wherein the set of bypass openings further comprises:
    a first bypass opening configured with at least one cylindrical tube with substantially consistent diameter from one side of the gate to an opposite side of the gate;
    a second bypass opening configured with at least one conical shaped tube with an increasing diameter from the one side of the gate to the opposite side of the gate;
    a third bypass opening configured with the at least one conical shaped tube with a decreasing diameter from the one side of the gate to the opposite side of the gate; and
    a fourth bypass opening configured with at least one venturi shaped tube from the one side of the gate to the opposite side of the gate.

5. The head unit system of claim 1, wherein the STF comprises:

a plurality of nanoparticles, wherein the plurality of nanoparticles includes one or more of an oxide, calcium carbonate, synthetically occurring minerals, naturally occurring minerals, polymers, SiO2, polystyrene, polymethylmethacrylate, or a mixture thereof.

6. The head unit system of claim 1, wherein the STF further comprises:
one or more of ethylene glycol, polyethylene glycol, ethanol, silicon oils, phenyltrimethicone, or a mixture thereof.

7. The head unit system of claim 1, wherein the head unit device further comprises:
a chamber bypass between opposite ends of the chamber, wherein the chamber bypass facilitates flow of a portion of the STF between the opposite ends of the chamber when the piston travels through the chamber in an inward or an outward direction.

8. The head unit system of claim 1, wherein the head unit device further comprises:
the gate is further configured to:
when the piston is traveling through the chamber in an outward direction towards the gate, a first shear threshold effect includes:
the first range of shear rates when the STF is configured to have the decreasing viscosity; and
when the piston is traveling through the chamber in an inward direction away from the gate, a second shear threshold effect includes:
the second range of shear rates when the STF is configured to have the increasing viscosity.

9. The head unit system of claim 1 further comprises:
a set of fluid flow sensors positioned proximal to the chamber, wherein the set of fluid flow sensors are configured to provide a fluid response from the STF, wherein the set of fluid flow sensors includes one or more of:
a valve opening detector associated with a set of bypass openings,
a mechanical position sensor,
an image sensor,
a light sensor,
an audio sensor,
a microphone,
an ultrasonic sound sensor,
an electric field sensor,
a magnetic field sensor, and
a radio frequency wireless field sensor.

10. The head unit system of claim 1 further comprises:
a set of fluid manipulation emitters positioned proximal to the chamber, wherein the set of fluid manipulation emitters provide a fluid activation to at least one of the STF, the gate, the piston, and
a set of bypass openings of the gate to provide the control of the motion of the object, wherein the set of fluid manipulation emitters includes one or more of:
a variable flow valve associated with the set of bypass openings of the gate,
a mechanical vibration generator,
an image generator,
a light emitter,
an audio transducer,
a speaker,
an ultrasonic sound transducer,
an electric field generator,
a magnetic field generator, and
a radio frequency wireless field transmitter.

* * * * *